(12) United States Patent
Fujisawa et al.

(10) Patent No.: US 7,016,707 B2
(45) Date of Patent: Mar. 21, 2006

(54) MOBILE TELEPHONE AND RADIO COMMUNICATION DEVICE COOPERATIVELY PROCESSING INCOMING CALL

(75) Inventors: Teruhiko Fujisawa, Shiojiri (JP); Hiroyuki Chihara, Okaya (JP); Hideo Fukuchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 746 days.

(21) Appl. No.: 10/049,531

(22) PCT Filed: Jun. 21, 2001

(86) PCT No.: PCT/JP01/05303

§ 371 (c)(1),
(2), (4) Date: Feb. 13, 2002

(87) PCT Pub. No.: WO01/99392

PCT Pub. Date: Dec. 27, 2001

(65) Prior Publication Data

US 2002/0115478 A1 Aug. 22, 2002

(30) Foreign Application Priority Data

| Jun. 21, 2000 | (JP) | ......................................... | 2000-186929 |
| Mar. 2, 2001 | (JP) | ......................................... | 2001-058954 |
| Mar. 7, 2001 | (JP) | ......................................... | 2001-063974 |
| Jun. 20, 2001 | (JP) | ......................................... | 2001-187275 |
| Jun. 20, 2001 | (JP) | ......................................... | 2001-187277 |
| Jun. 20, 2001 | (JP) | ......................................... | 2001-187278 |

(51) Int. Cl.
*H04B 1/38* (2006.01)

(52) U.S. Cl. ........................ 455/567; 455/567; 455/11.1; 455/41; 455/461; 455/552; 455/556; 455/557; 340/511.1; 340/825.44; 340/573.1

(58) Field of Classification Search ................. 455/567, 455/11.1, 41, 66, 88, 566, 574, 575; 340/825.44, 340/573.1, 511.1
See application file for complete search history.

(56) References Cited

U.S. PATENT DOCUMENTS

| 5,878,354 A | 3/1999 | Hasegawa |
| 5,960,367 A | 9/1999 | Kita |
| 5,966,656 A | 10/1999 | Elkin et al. |
| 6,216,017 B1 | 4/2001 | Lee et al. |

FOREIGN PATENT DOCUMENTS

| EP | 0 740 449 | 10/1996 |
| EP | 0 840 465 | 5/1998 |
| EP | 0 634 859 | 1/2000 |
| EP | 1 009 178 | 6/2000 |
| JP | 08-321859 | 12/1996 |
| JP | 9-327007 | 12/1997 |
| JP | 10-032651 | 2/1998 |
| JP | 10-163917 | 6/1998 |
| JP | 10-173767 | 6/1998 |
| JP | 10-200953 | 7/1998 |
| JP | 10-243059 | 9/1998 |
| JP | 11-205443 | 7/1999 |
| JP | 11-262065 | 9/1999 |
| JP | 2000-069561 | 3/2000 |

*Primary Examiner*—David Hudspeth
*Assistant Examiner*—Julio Perez

(57) ABSTRACT

When there is an incoming call to a mobile telephone, it sends an incoming call notification signal to a watch-shaped information processing device. When the watch-shaped information processing device receives the incoming call notification signal, it notifies its user of the incoming call. The watch-shaped information processing device can also sends user's instructions to the mobile telephone. The instructions cause the mobile telephone to conduct processing for incoming call such as processing for asking the caller to wait, or asking the caller to leave a message.

45 Claims, 35 Drawing Sheets

| MESSAGE TYPE | MEMORY ADDRESS |
|---|---|
| PLEASE WAIT MESSAGE | ad0001~ad0010 |
| CALL RESPONSE MESSAGE | ad0011~ad0020 |
| CALLER'S MESSAGE No1 | ad0021~ad0030 |
| CALLER'S MESSAGE No2 | ad0031~ad0040 |
| CALLER'S MESSAGE No3 | ad0041~ad0050 |
| CALLER'S MESSAGE No4 | ad0051~ad0060 |
| ......... | ......... |
| ......... | ......... |
| CALLER'S MESSAGE No10 | ad0111~ad0120 |

| BLUETOOTH ADDRESS | NUMBER OF FAILURES OF RECEIVING OF INQUIRY RESPONSE SIGNAL |
|---|---|
| ad0001 | 0 |
| ad0002 | 2 |
| ad0003 | 5 |
| ad0004 | 0 |
| ad0005 | 1 |
| ad0006 | ...... |
| ad0007 | ...... |

| BLUETOOTH ADDRESS | DEVICE NAME | COMMUNICATION QUALITY FLAG | | | POWER OFF FLAG | NOTIFICATION REQUIREMENT FLAG |
|---|---|---|---|---|---|---|
| | | OK | Caution | NG | | |
| ad0001 | NOTEBOOK PC | 1 | 0 | 0 | 0 | 1 |
| ad0002 | PDA | 1 | 0 | 0 | 1 | 1 |
| ad0003 | MOBILE TELEPHONE | 0 | 0 | 1 | 0 | 1 |
| ad0004 | MP3 PLAYER | 1 | 0 | 0 | 0 | 1 |
| ad0005 | DIGITAL CAMERA | 1 | 0 | 0 | 0 | 1 |
| ad0006 | ...... | ...... | ...... | ...... | ...... | ...... |
| ad0007 | ...... | ...... | ...... | ...... | ...... | ...... |

| NOTIFICATION DEVICE FOR CAUTION | | | | NOTIFICATION DEVICE FOR NG | | | |
|---|---|---|---|---|---|---|---|
| DISPLAY UNIT | LIGHT EMITTING UNIT | ELECTRONIC SOUND UNIT | VIBRATOR | DISPLAY UNIT | LIGHT EMITTING UNIT | ELECTRONIC SOUND UNIT | VIBRATOR |
| 1 | 0 | 0 | 1 | 1 | 1 | 1 | 1 |
| 1 | 0 | 0 | 1 | 1 | 0 | 0 | 1 |
| 1 | 1 | 0 | 0 | 1 | 1 | 1 | 1 |
| 1 | 0 | 0 | 0 | 1 | 0 | 0 | 1 |
| 0 | 1 | 0 | 0 | 1 | 0 | 1 | 1 |
| ...... | ...... | ...... | ...... | ...... | ...... | ...... | ...... |
| ...... | ...... | ...... | ...... | ...... | ...... | ...... | ...... |

MOBILE TELEPHONE AND RADIO COMMUNICATION DEVICE COOPERATIVELY PROCESSING INCOMING CALL

TECHNICAL FIELD

The present invention relates to a mobile telephone and to a radio communication device that can carry out local and bidirectional radio communication with the mobile telephone.

Recently, small and lightweight mobile telephones are widely used, and they are often put in bags when carried by their users. In that case, users have to take the mobile telephone from the bag to answer the telephone. This takes time, and sometimes the calling can end before answering.

DISCLOSURE OF INVENTION

An object of the present invention is to allow users of mobile telephones to quickly deal with an incoming call. In order to achieve this objection, the present invention provides a radio communication device and a mobile telephone that, by conducting radio communication with each other, cooperatively process the incoming call.

The present invention provides a radio communication device comprising: a transmitter-receiver unit that carries out local and bidirectional communication with a mobile telephone; an incoming call notification unit that, when the radio communication device receives from the mobile telephone an incoming call notification signal that indicates that there is an incoming call to the mobile telephone, carries out a notification; and a control unit that, by using the transmitter-receiver unit, sends an instruction signal to the mobile telephone to make the mobile telephone respond to the caller by using voice.

By this invention, when there is an incoming call, a notification is made by the radio communication device. Therefore, the user of the radio communication device can notice the incoming call even when the device is in the user's bag. The radio communication device also sends to the mobile telephone to make the mobile telephone send an instruction signal to make the mobile telephone respond to the caller by using voice, so the user does not need to operate the mobile telephone to answer the incoming call.

The radio communication device may have a watch-shape that fits to its user's arm.

The local and bidirectional communication may be a bluetooth communication.

The incoming call signal may include an identification signal for identifying radio communication device.

The incoming call signal may also include a telephone number or a mobile telephone identification information.

The incoming call signal may include a caller identification signal.

As an incoming call notification unit, an incoming call notification vibration unit may be possible. In this case, when the incoming call notification signal specifies to use a vibration to conduct an incoming call notification, the incoming call notification vibration unit is used to conduct an incoming call notification.

The radio communication device may be equipped with a time display unit for displaying time.

The control unit may establish synchronization of transmission-receiving operation by making intermittently communication with the mobile telephone by using the transmitter-receiver unit.

The radio communication device may be equipped with a signal strength indicator that tells signal strength of received signal from the mobile telephone.

In one preferred aspect of the present invention, the radio communication device further has an external input unit and the control unit, in response to an operation to the external input unit, sends an instruction signal to the mobile telephone to make the mobile telephone conduct operations for the incoming call.

In another preferred aspect of the present invention, the radio communication device further has an external input unit and the control unit, when a prescribed time period has passed without any operation to the external input terminal after the notification of the incoming call is carried out, sends an instruction signal to the mobile telephone the mobile telephone to make the mobile telephone conduct operations for the incoming call.

In another preferred aspect of the present invention, the control unit of the radio communication device, when an incoming call auto-response mode is preset to the radio communication device and the radio communication device receives the incoming call notification signal, sends an instruction signal to the mobile telephone to make the mobile telephone conduct operations for the incoming call.

In yet another preferred aspect of the present invention, the radio communication device further has a display. And the control unit, when there is a telephone number, a mobile telephone identification information, or a caller identification signal of the mobile telephone in the incoming call notification signal received by the mobile telephone, displays them on the display.

In this case, the control unit, by using the transmitter-receiver unit, may send to the mobile telephone, as the instruction signal, a signal that instructs the mobile telephone to send to the caller a message that asks the caller to wait for a moment.

Or the control unit, by using the transmitter-receiver unit, may send to the mobile telephone, as the instruction signal, a signal that instructs the mobile telephone to send to the caller a message that asks the caller to leave a message.

Or the control unit may, by using the transmitter-receiver unit, sends to the mobile telephone, as the instruction signal, a signal that instructs the mobile telephone to make a communication link between the radio communication device and the caller's communication device via the mobile telephone.

The present invention also provide a radio communication device, which is equipped with: a transmitter-receiver unit that carries out local and bidirectional communication with a mobile telephone; an incoming call notification unit that carries out a notification when the radio communication device receives from the mobile telephone an incoming call notification signal that indicates that there is an incoming call to the mobile telephone; and a control unit that sends, by using the transmitter-receiver unit, to the mobile telephone a message to be sent to a caller's communication device from the mobile.

The present invention also provide a radio communication device, which is equipped with: a transmitter-receiver unit that carries out local and bidirectional communication with a mobile telephone; an incoming call notification unit that carries out a notification when the radio communication device receives from the mobile telephone an incoming call notification signal that indicates that there is an incoming call to the mobile telephone; and a control unit that sends, by using the transmitter-receiver unit, to the mobile telephone a message to be sent to a caller's communication device from the mobile telephone and an instruction signal that instruct the mobile telephone to conduct operations for the incoming call.

In this case, the radio communication device may further include a storage unit that stores a message to be sent to a caller's communication device, and the control unit may, during the information exchange, sends the stored message to the mobile telephone.

Also, the radio communication device may further include an input unit that receives the message to be sent to a caller's communication device, and then the control unit may store in the storage unit the message that is input by using the input unit.

The input unit may be a microphone, and the message to be sent to a caller's communication device may be input by using this microphone.

The message may be a message that tells the caller to wait for a moment, or may be a message that tells the caller to leave a message.

The radio communication device may be further equipped with a storage unit that, after sending the message when a caller-sent information is received through the mobile telephone, stores the caller-sent information.

The caller-sent information may be a message the caller sends.

The radio communication device may be further equipped with an output unit that outputs the caller-sent information that is stored in the storage unit.

The output unit may be a voice output unit that outputs voice after reading the caller's message from the storage unit.

The outputting of voice may be carried out when a certain operation is made on the radio communication device.

The radio communication device may be further equipped with an external input unit and a display unit. The storage unit of the radio communication device may store messages and their information received via the mobile telephone. The control unit of the radio communication device, in response to operation to the external input unit, displays information of the messages. Then again, in response to operation to the external input unit to specify a message, the control unit of the radio communication device reads the specified message from the storage unit to output to the display unit.

In a preferred aspect, the control unit, after sending to the mobile telephone the message to be sent to the caller, as the instruction signal, sends to the mobile telephone a record instruction that instructs the mobile telephone to record information sent from the caller's communication device in response to the message to be sent to the caller.

In another aspect of the present invention, the control unit, after sending to the mobile telephone the message to be sent to the caller, as the instruction signal, sends to the mobile telephone a change order that instructs the mobile telephone to let another device on a network as a substitute of the mobile telephone carry out a communication with the communication device of the caller.

In this case, message to be sent to the caller is for example a message that asks the caller to leave a message. The change order is an instruction that lets an external message storage device receive and store message sent from the caller.

In yet another preferable aspect of the present invention, the radio communication device is further equipped with an operating mode synchronization unit that conducts intermittently communication with the mobile telephone and, when the operating mode of the mobile telephone shifts, shifts the operating mode of the radio communication device to the operating mode of the mobile telephone.

The present invention also provides a radio communication device that has a transmitter-receiver unit that carries out local and bidirectional communication with a mobile telephone; an incoming call notification unit that, when the radio communication device receives from the mobile telephone an incoming call notification signal that indicates that there is an incoming call to the mobile telephone, carries out a notification; and a control unit that, by using the transmitter-receiver unit, sends, in response to the incoming call, a change order that instructs the mobile telephone to let another device on a network as a substitute of the mobile telephone carry out a communication with the communication device of the caller.

The change order in this case may be a signal that lets another server on a network receive and store a message that is sent from the caller.

The present invention provide a mobile telephone that has a transmitter-receiver unit that carries out local and bidirectional communication with a radio communication device; and a control unit that, after receiving an incoming call from a network, sends an incoming call notification signal to the radio communication device; and, based on instruction signal received from the radio communication device by the transmitter-receiver unit, responds to the caller by using voice.

The incoming call notification signal may include a telephone number of the mobile telephone or a mobile telephone identification information that corresponds to the telephone number, or may include a caller's identification number.

The control unit may establish a synchronization with a radio communication device by making an intermittently communication with a transmitter-receiver unit.

In a preferable aspect of the present invention, an incoming call notification unit is provided. And the control unit, when there is an incoming call to the mobile telephone, sends the incoming call notification signal in a case when there is a communication link between the mobile telephone and the radio communication device and carries out notification by using the incoming call notification unit in a case when there is a communication link between the mobile telephone and the radio communication device.

Also, during the processing for the incoming call, the control unit sends a connection request to a network, makes a communication link between the mobile telephone and the caller's communication device, and sends to the caller's communication device a message for the caller via the communication link.

The control unit may, during the processing for the incoming call, sends to the radio communication device, by the transmitter-receiver unit, information about the caller sent in response to the message to be sent to the caller.

In another aspect of the present invention, a mobile telephone further has a storage unit. And the control unit stores information sent by the caller received via the network after sending message to be sent to the caller.

In this case, when the control unit receives an instruction signal that asks for receiving and storing a message, the control unit sends to a caller's communication device a message that asks for sending message, and stores the message in a storage unit.

The mobile telephone may also be equipped with a voice outputting unit that outputs sound of the stored message in the storage unit.

The present invention provide a mobile telephone that has a transmitter-receiver unit that carries out local and bidirectional communication with a radio communication device; and a control unit that, after receiving an incoming call from a network, sends an incoming call notification signal to the radio communication device, and forwards a message that is received, device by the transmitter-receiver unit, from the radio communication device to the caller.

In a preferred aspect of the present invention, a mobile telephone intermittently conducts a communication with the radio communication device and, when the operating mode of the mobile telephone is shifted, sends to the radio communication device an operating mode shifting information that tells the operating mode of the mobile telephone after shifting.

In another aspect of the present invention, a mobile telephone has a transmitter-receiver unit that can carry out local and bidirectional communication with a radio communication device; and a control unit that, when the mobile telephone receives an incoming call, sends to the radio communication device an incoming call signal by using the transmitter-receiver unit, and when the mobile telephone receives a change order by using the transmitter-receiver unit, request to the network to change the connection from between the mobile telephone and the caller's device to between a device on the network and the caller's device.

A method provided by this invention for controlling a radio communication device with a transmitter-receiver unit that carries out local and bidirectional communication with a mobile telephone carrys out a notification when the transmitter-receiver unit receives an incoming call notification signal that indicates that there is an incoming call to the mobile telephone; and sends, by using the transmitter-receiver unit, an instruction signal that makes the mobile telephone respond to the caller by using voice in response to the incoming call.

Also a control method is provided for a radio communication device with a transmitter-receiver unit that is able to carry out local and bidirectional radio communication with a mobile telephone, the method comprising: notifying, when the transmitter-receiver unit receives an incoming call signal, of incoming signal by using a notification unit; and sending a message to be sent to the caller and an instruction signal that makes the mobile telephone respond to the caller by using the message.

Also there is provided a control method for answering an incoming call to a mobile telephone in a system with the mobile telephone that can carry out local and bidirectional communication with a radio communication device, the method comprising: transmitting an incoming call notification signal by the mobile telephone to the radio communication device when the mobile telephone receives an incoming call; receiving the incoming call notification signal by the radio communication device; notifying the incoming call by the radio communication device; and sending an instruction signal that make the mobile telephone respond to the caller by using voice.

Further, there is provided a control method for answering an incoming call to a mobile telephone in a system with the mobile telephone that can carry out local and bidirectional communication with a radio communication device, the method comprising: transmitting an incoming call notification signal by the mobile telephone to the radio communication device when the mobile telephone receives an incoming call; receiving the incoming call notification signal by the radio communication device; notifying the incoming call by the radio communication device; and sending a message to be sent to the caller and an instruction signal that makes the mobile telephone respond to the caller by using the message.

Yet another program is provided for controlling a radio communication device that can carry out local and bidirectional radio communication with a mobile telephone, the program comprising: a program that makes a control unit of the radio communication device conduct controlling for an incoming call notification when a transmitter-receiver unit of the radio communication device receives an incoming call notification signal that tells the mobile telephone receives an incoming call; and a program that makes a control unit of the radio communication device send an instruction signal that makes the mobile telephone respond to the caller by using voice.

A program is also provided for controlling a radio communication device that is able to carry out local and bidirectional radio communication with a mobile telephone, the program comprising: a program that makes a control unit of the radio communication device conduct controlling for an incoming call when a transmitter-receiver unit of the radio communication device receives an incoming call notification signal that indicates that the mobile telephone receives an incoming call; and a program that makes the control unit of the radio communication device send an instruction signal that makes the mobile telephone send a message to be sent to the caller and respond to the caller by using the message.

A control method is also provided for a mobile telephone that can carry out local and bidirectional radio communication with a radio communication device, the method comprising: making a control unit of the mobile telephone conduct controlling to send to the radio communication device an incoming call notification signal when the mobile telephone receives an incoming call; and making a control unit of the mobile telephone respond to the caller by using voice based on the instruction signal received from the radio communication device.

A control method is also provided for a mobile telephone that can carry out local and bidirectional communication with a radio communication device, the method comprising: making, when the mobile telephone receives an incoming call, a control unit of the mobile telephone send an incoming call notification signal to the radio communication device; and making, when the mobile telephone receives a message to be sent to the caller and an instruction signal that instructs the mobile telephone to forward the message, the control unit of the mobile telephone conduct processing for forwarding the message.

There is also provided a program for controlling a mobile telephone that can carry out local and bidirectional radio communication with a radio communication device, the program comprising: a program that makes a control unit of the mobile telephone conduct controlling to send to the radio communication device an incoming call notification signal when the mobile telephone receives an incoming call; and a program that makes a control unit of the mobile telephone respond to the caller by using voice based on the instruction signal received from the radio communication device.

Further a control program is provided for a mobile telephone that can carry out local and bidirectional communication with a radio communication device, the program comprising: a program that, when the mobile telephone receives an incoming call, makes a control unit of the mobile telephone send an incoming call notification signal to the radio communication device; and a program that, when the mobile telephone receives a message to be sent to the caller and an instruction signal that instructs the mobile telephone to forward the message, makes the control unit of the mobile telephone conduct processing for forwarding the message.

A computer readable storage media is provided that stores a control program for a mobile telephone which can carry out local and bidirectional radio communication with a radio communication device, the control program comprising: a program that, when the mobile telephone receives an incoming call, makes a control unit of the mobile telephone conduct a processing for sending an incoming call notification signal; and a program that, based on an instruction signal sent by the radio communication device, makes the control unit of the mobile telephone conduct processing for responding for the incoming call and for responding to the caller by using voice.

Also there is provided a computer readable storage media that stores a control program for a mobile telephone which can carry out local and bidirectional radio communication with a radio communication device, the control program comprising: a program that, when the mobile telephone receives an incoming call, makes a control unit of the mobile telephone conduct a processing for sending an incoming call notification signal; and a program that, when the mobile telephone receives from the radio communication device a message to be sent to the caller and an instruction signal that instructs to forward the message, makes the control unit of the mobile telephone conduct processing for responding to the incoming call and for forwarding the message to be sent to the caller.

A radio communication device is provided by the present invention that has a transmitter-receiver unit that carries out local and bidirectional communication with another radio communication device; a communication state judgement unit that measures and makes a judgement of state of the bidirectional communication; and a notification unit that tells information about the state of the bidirectional communication measured by the communication state judgement unit.

This radio communication device may further be equipped with a notification requirement judgement unit that, based on the judgement of the state done by the communication state judgement unit, makes a judgement whether or not to tell a user of the radio communication device information about the state of the bidirectional communication; wherein the notification unit, when the notification requirement judgement unit judges the user should be notified, sends information about the state of communication.

By this configuration, because state of bidirectional communication with another radio communication device is judged, and also judgement is made whether or not to sends information about the bidirectional communication, and when judgement is made to send information to the user, the user gets information about communication state. Therefore, the user can know the state of the communication.

In this case, when the communication state judgement unit makes a judgement that communication state has declined or communication is impossible, the notification requirement judgement unit may judge that it is necessary to notify the user of information.

Also, the notification unit can make various notification operations. And the radio communication device may be equipped with a notification judgement unit that makes a judgement about which notification operation should be used, when the notification requirement judgement unit makes a judgement to make a notification. Then the notification unit may conduct notification operation specified by the notification judgement unit.

There are a plurality of the above radio communication devices. The communication state judgement unit judges state of bidirectional radio communication conducted between each of the radio communication device, and the notification requirement judgement unit, based on the communication state judged by the communication state judgement unit, judges whether or not to notify its user of information about communication with each radio communication device. The notification judgement unit may make a judgement to each bidirectional radio communication.

Also, the state of the communication may be divided into several steps. So the communication state judgement unit makes a judgement on which steps the communication is in. Based on this judgement, the notification requirement judgement unit makes a judgement whether or not to notify the user of information about the radio communication. Then the notification judgement unit makes a judgement about notification operation to be used.

Also the notification unit may be equipped with at least two of among a display that makes notification operation by displaying, an electronic sound unit that makes notification operation by outputting electronic sound, a light emitting unit that makes notification operation by blinking, and a vibrator that makes a notification operation by vibrating. Then the notification judgement unit makes a judgement which unit to use for notification.

Or the notification unit may be equipped with at least one of among a display that makes notification operation by displaying, an electronic sound unit that makes notification operation by outputting electronic sound, a light emitting unit that makes notification operation by blinking, and a vibrator that makes a notification operation by vibrating. Then the notification judgement unit makes a judgement which unit to use for notification.

Also, the mobile telephone may be equipped with a power-off detection unit that detects if the radio communication device is powered off. The notification requirement judgement unit does not make notification about the bidirectional communication with the radio communication device that is powered off.

Also, notification unnecessary storage unit may be provided that pre-stores identification information of the radio communication device, notification of which is not necessary. The notification requirement judgement unit does not make notification about bidirectional communication with the radio communication device whose identification information is stored in the notification unnecessary storage unit.

The notification requirement judgement unit may make a judgement based on condition of received signal that is received periodically from the radio communication device.

Also the notification requirement judgement unit may make a judgement based on electric field strength of the received signal from the radio communication device Also the radio communication device may be worn by its user, and may have a shape of watch and be worn on the wrist.

Further, the bidirectional radio communication may be radio communication that is based on a bluetooth technique.

The bidirectional radio communication may be based on the bluetooth technique and signal received periodically from the radio communication device may be an inquiry signal that slave unit receives from the master unit or an inquiry response signal that the master unit receives from the slave unit. These signals are defined by bluetooth specification.

A method of the present invention for controlling a radio communication device is characterized by comprising the steps: a transmit-receive step that carries out local and bidirectional radio communication with another radio communication device; a communication judgement step that judges state of the bidirectional radio communication with the other communication device; and a notification step that notifies the user of information about the state of the bidirectional radio communication.

By this, state of bidirectional radio communication with a radio communication device is judged. Then, the user is notified of the state of the communication. Hence, the user can know the state of the communication with the radio communication device.

In a preferred aspect of the present invention, this control method may comprise a notification requirement judgement step that judges, based on the judgement for state of the bidirectional radio communication, whether or not to notify a user of the radio communication device of information about the state of the bidirectional radio communication.

In this case, when the communication state judgement step makes a judgement that communication quality has declined or the communication become impossible, the notification requirement judgement step may makes a judgement to notify.

The notification step may carries out various notification operations. When the notification requirement judgement step judges that notification is necessary, a notification judgement step judges which notification operation should be used. Then the notification step carries out the specified notification operation.

Also there may be several radio communication devices. In this case, the communication state judgement step may judge states of bidirectional communications with these radio communication devices, the notification requirement judgement step judges whether or not to tell user of information about the bidirectional communication for each radio communication device based on the judgement done by the communication state judgement step, and the notification judgement step may make a judgement about what notification operation to use.

Communication state may be divided into several steps. The communication state judgement step judges which state the bidirectional radio communication is in with the radio communication device. The notification requirement judgement step judges whether or not to tell user of information about communication based on judgement done by the communication state judgement step. The notification judgement step judges which notification operation should be used based on the judgement done by the notification requirement judgement step.

Also there may be a power-off detection step that detects when the radio communication device is powered off. The notification requirement judgement step does not carry out notification operation for the radio communication device that is detected to be powered off.

There also may be a notification unnecessary storage step that stores identification information of the radio communication device to which notification operation is not carried out. The notification requirement judgement step may make a judgement that notification operation is not done to the communication device whose identification information is stored in the notification unnecessary storage step.

The present invention further provides a control program comprising: a program that makes a control unit of a radio communication device carry out local and bidirectional radio communication between the radio communication device and a radio communication device; a program that makes the control unit of the radio communication device judge state of bidirectional radio communication; and a program that makes the control unit of the radio communication device notify the user of information about the state of the bidirectional radio communication.

The present invention also provides a computer readable storage medium that stores a control program, the control program comprising: a program that makes a control unit of a radio communication device carry out local and bidirectional radio communication between the radio communication device and a radio communication device; a program that makes the control unit of the radio communication device judge state of the bidirectional radio communication; and a program that makes the control unit of the radio communication device notify the user of information about the state of the bidirectional radio communication.

BRIEF DESCRIPTION OF THE DRAWINGS

FIG. 36 is a notification table of the fourth embodiment.

BEST MODE OF CARRYING OUT THE INVENTION

With reference to the drawings, preferred embodiments of the present invention will be described.

A. First Embodiment

Figure 1:
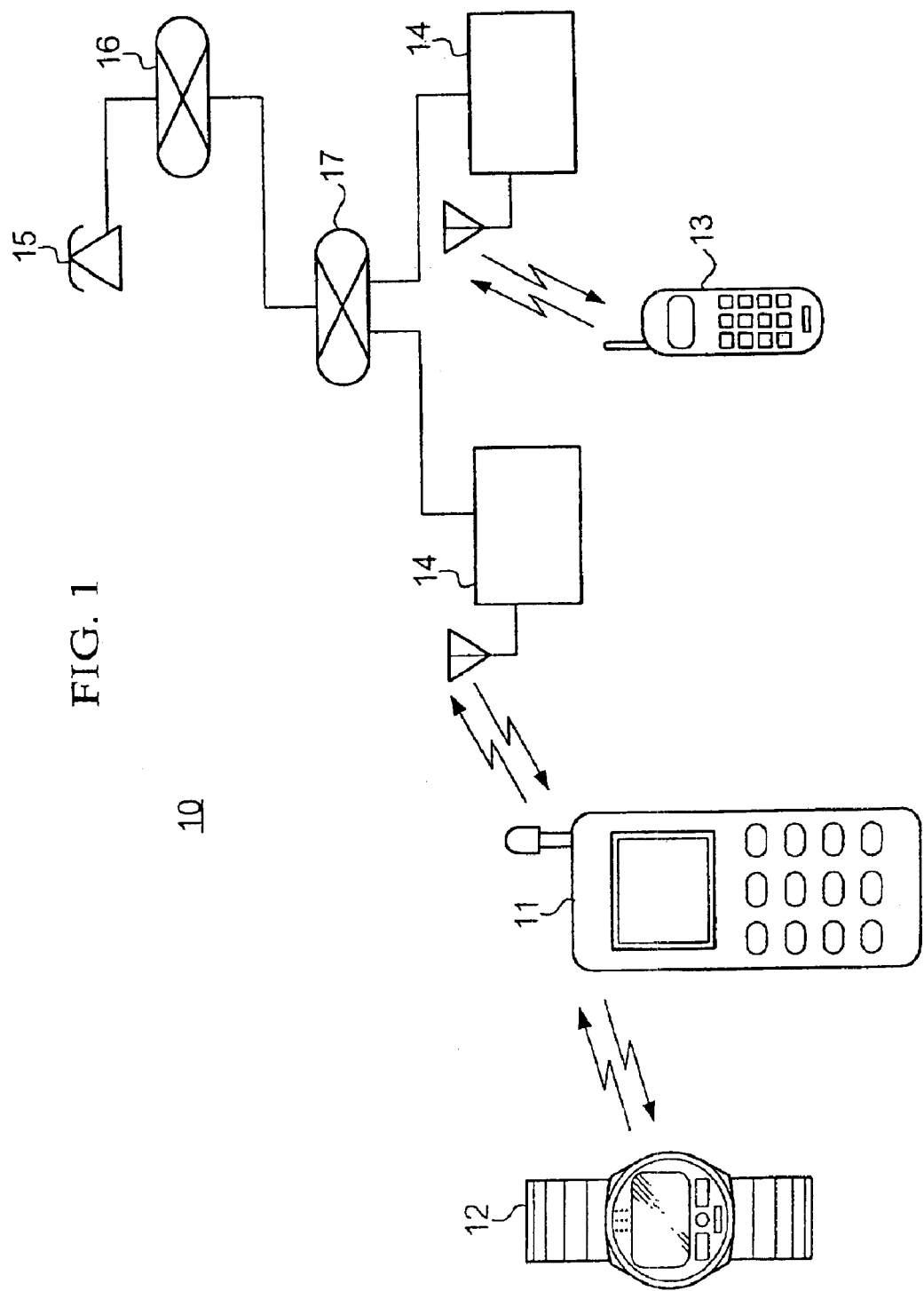
FIG. 1 shows a configuration of a mobile telephone system of the first embodiment of the present invention.

FIG. 1 shows a configuration of a mobile telephone system 10 of the first embodiment of the present invention. The service of this mobile telephone system is available to a number of mobile telephones. But, in order to simplify explanations, only mobile telephones 11 and 13 are shown in FIG. 1, and explanations will be given of the service that the two mobile telephones receive.

The mobile telephone system 10 includes a watch-shaped information processing device 12 that is used together with the mobile telephone 11. The watch-shaped information processing device 12 is one example of the radio communication devices of the present invention, and the mobile telephone 11 is one example of mobile telephones of the present invention. The watch-shaped information processing device 12 performs bidirectional radio communication with the mobile telephone 11. The mobile telephone system 10 also has a mobile network 17 and a plurality of radio base stations 14 that are connected with the mobile network 17. The radio base station 14 established a radio communication line with the mobile telephone 11 or 13. The mobile network 17 is connected with a public switched telephone network (PSTN) 16. Fixed telephones 15 and other equipment are connected with the PSTN 16. The mobile telephones 11 and 13 are able to communicate with each other via the mobile network 17. Also, the mobile telephones 11 and 13 are able to communicate with the fixed telephone 15 via the mobile network 17 and the PSTN 16.

Figure 2:
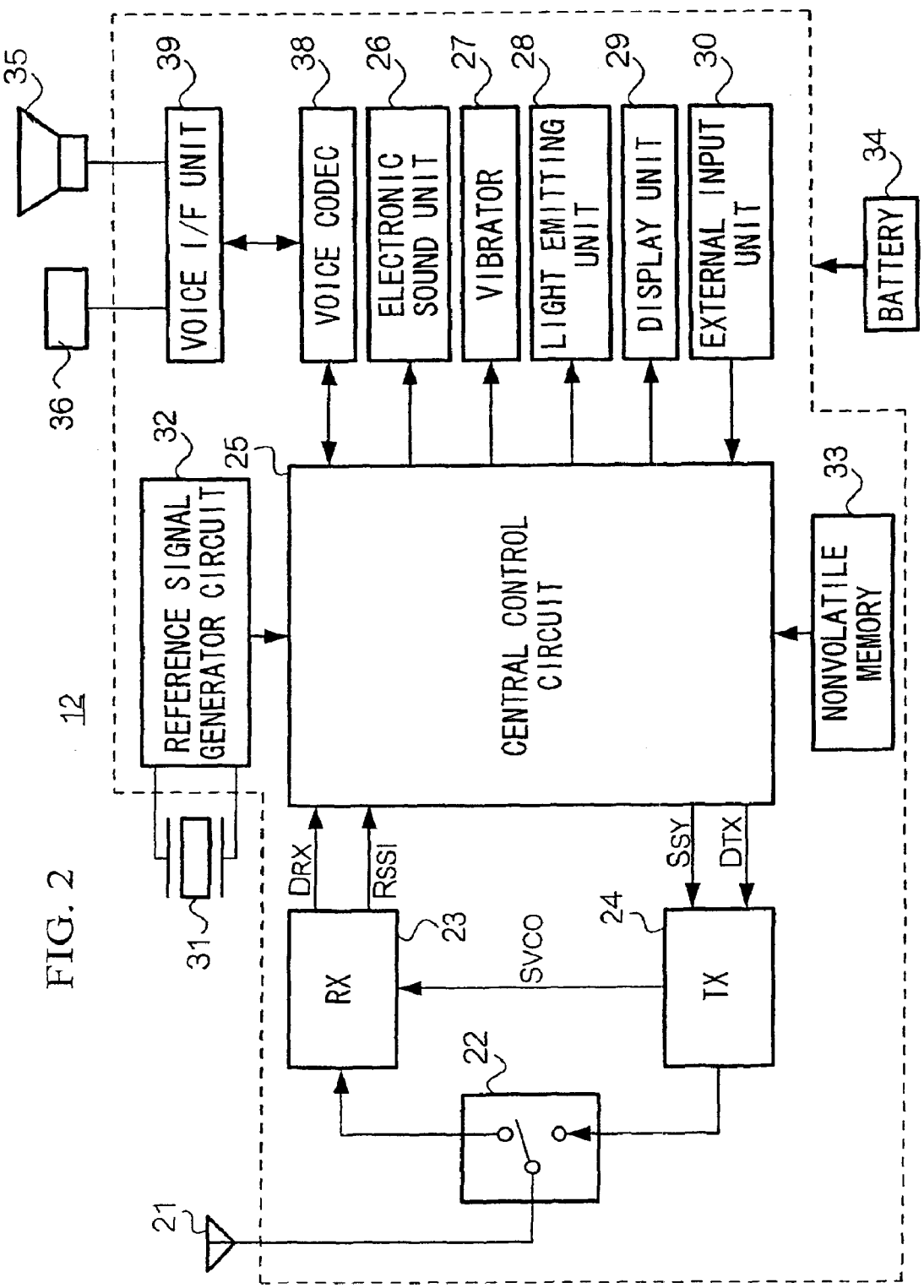
FIG. 2 shows a configuration of a watch-shaped information processing device of the first embodiment.

FIG. 2 shows a configuration of a watch-shaped information processing device 12 of the first embodiment. A transmitter circuit 24 in FIG. 2 conducts signal transmitting operation to the mobile telephone 11. A receiver circuit 23 in FIG. 2 conducts signal receiving operation from the mobile telephone 11. The transmitter circuit 24 (described later) has a circuit for generating oscillation signal SVCO. The oscillation signal SVCO is used for signal transmitting operation in the transmitter circuit 24 and also is provided to the receiver circuit 23 for receiving operation. The frequency of the oscillation signal SVCO is defined by synthesizer control signal SSY output from a central control circuit 25. A switching circuit 22 switches an antenna unit 21 between to an input terminal of the receiver circuit 23 and to an output terminal of the transmitter circuit 24.

In order for the watch-shaped information processing device 12 to receive signals, the antenna unit 21 is connected to the input terminal of the receiver circuit 23 by the switching circuit 22. Then the receiver circuit 23 receives signals from the mobile telephone 11 via the antenna unit 21. Then, the receiver circuit 23 demodulates these signals into a received data DRX by using the oscillation signal SVCO to output to the central control circuit 25.

On the other hand, in order for the watch-shaped information processing device 12 to transmit signals, the antenna unit 21 is connected to the output terminal of the transmitter circuit 24. Then the transmitter circuit 24 receives a transmission data DTX from the central control circuit 25. The transmitter circuit 24 produces high frequency signal with a frequency designated by the synthesizer control signal SSY. The modulation of the high frequency signal is done based on the transmission data DTX. The transmitter circuit 24 sends the high frequency signal to the mobile telephone 11 via the antenna unit 21.

The central control circuit 25 controls components of the watch-shaped information processing device 12, but detailed description of these controls will be given later.

Under the control of the central control unit 25, an electronic sound unit 26 produces electronic sound or buzzer sound to notify the user of states of the mobile telephone 11 or the watch-shaped information processing device 12. These states may be, for example, a device state such as calling state, call-receiving state, or error state. A vibrator 27 vibrates also under the control of the central control circuit 25 to notify the user of states of the mobile telephone 11 or the watch-shaped information processing device 12. A light emitting unit 28 has an LED or other light emitting device, and emits light under the control of the central control circuit to notify the user of states of the mobile telephone 11 or the watch-shaped information processing device 12. A display unit 29 is equipped with a liquid crystal display or an organic electroluminescence display, and displays information on states of the mobile telephone 11 or the watch-shaped information processing device 12 under the control of the central control circuit 25.

An external input unit 30 is equipped with buttons, a touch panel, and so on. Operating state of the external input unit 30 is checked by the central control circuit 25.

A reference signal generator circuit 32 is connected with an oscillator 31, which generates a source oscillation signal having a reference frequency. The reference signal generator circuit 32 generates various reference signals to output to the central control circuit 25.

A nonvolatile memory 33 stores various data and programs. These data and programs are not lost even when power to the nonvolatile memory 33 is lost. The data stored in the nonvolatile memory 33 include a unique ID number NID for the watch-shaped information processing device 12 and another unique ID number NIDT for the mobile telephone 11 that. is associated with the watch-shaped information processing device 12. The programs stored in the nonvolatile memory 33 include a control program that controls the watch-shaped information processing device 12 when, for example, there is an incoming call to the mobile telephone 11. A central processing unit (CPU) in the central control circuit 25 functions as a controller unit of the radio communication devices of the present invention by executing the control programs stored in the nonvolatile memory 33.

A battery 34 supplies power to components of the watch-shaped information processing device 12.

A voice codec 38 decodes output signals of the central control circuit 25 to output voice data to a voice interface unit (voice I/F unit) 39. Also, the voice codec 38 encodes voice data from the voice interface unit 39 to output to the central control circuit 25.

The voice interface unit 39 performs digital-to-analog conversion on the voice data that is output by the voice codec 38 to output analog voice signal, then a speaker 35 outputs it. Also, the voice interface unit 39 performs analog-to-digital conversion on analog voice signals that are input via a microphone 36 to output voice data to the voice codec 38.

In this configuration, the receiver circuit 23 and the transmitter circuit 24 function as a transmitter-receiver unit of the radio communication device of the present invention. The central control circuit 25, the electronic sound unit 26, the vibrator 27, the light emitter unit 28, and the display unit 29 function as an incoming-call-notification unit of the radio communication device of the present invention.

Figure 3:
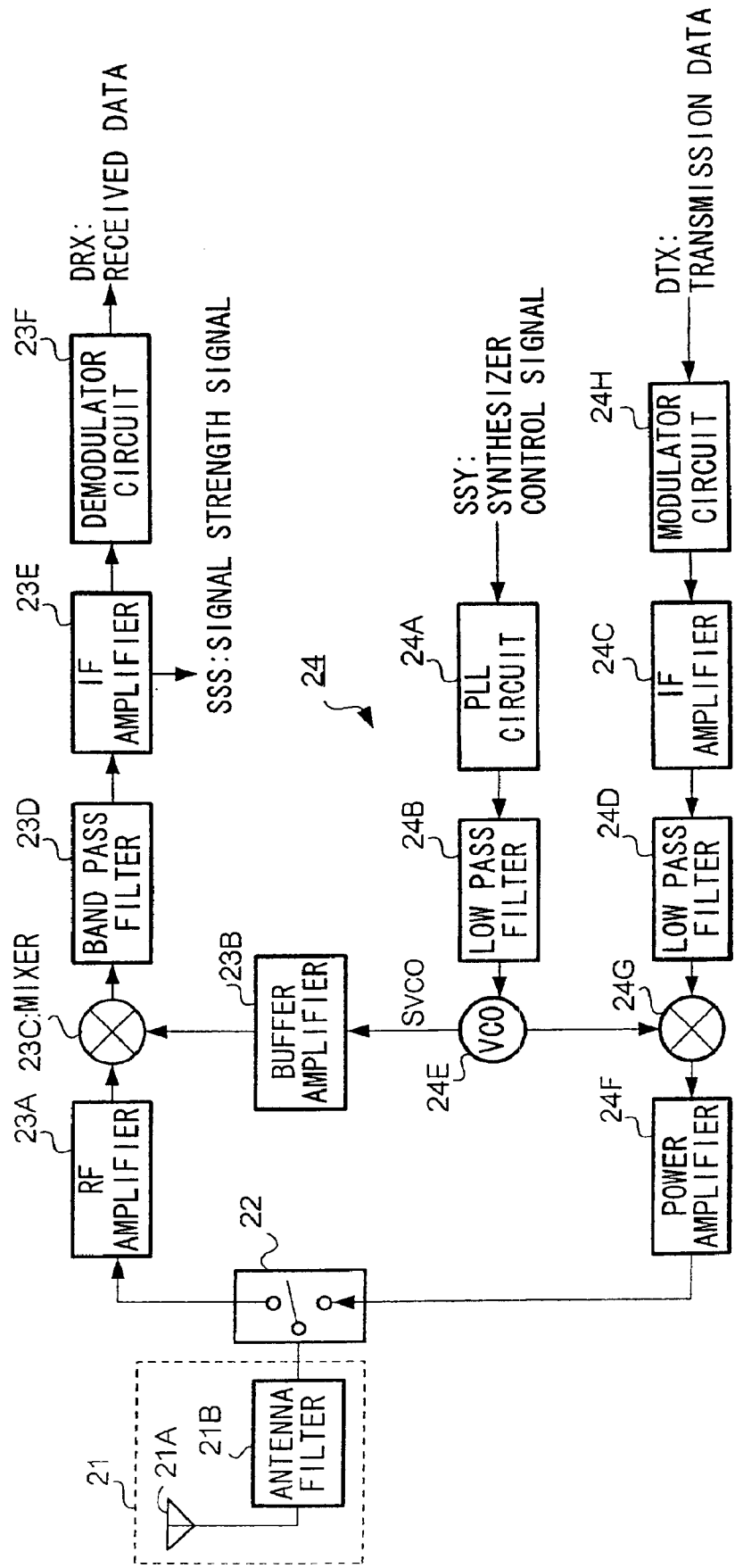
FIG. 3 shows a configuration of an antenna unit, a switching circuit, a receiver circuit, and a transmitter circuit of the watch-shaped information processing device.

FIG. 3 shows a configuration of the antenna unit 21, the switching circuit 22, the receiver circuit 23, and the transmitter circuit 24 of the watch-shaped information processing device 12. As shown in FIG. 3, the antenna unit 21 is equipped with an antenna 21A and an antenna filter 21B. The antenna filter 21B eliminates unnecessary signal that may exist on the incoming signal and outputs only necessary signal to the receiver circuit 23. The antenna filter 23 B also eliminates unnecessary signal that may exist on the output signal of the transmitter circuit 24 and outputs only necessary signal to the antenna 21A.

In the receiver circuit 23, an RF amplifier 23A amplifies the received signal of the antenna unit 21 to output to a mixer 23C. The mixer 23C is also provided with the oscillation signal SVCO from the transmitter circuit 24 via a buffer amplifier 23B. The mixer 23C then mixes these two signals and outputs to a bandpass filter 23D.

The bandpass filter 23D selects signal which has Intermediate Frequency (IF) from the output signals of the mixer 23C to output to an IF amplifier 23E. The IF amplifier 23E amplifies the signal with the IF to output to a demodulator circuit 23F. While outputting the signal with the IF, the IF amplifier 23E outputs to the central control circuit 25 a signal strength signal SSS that indicates intensity of the received signal. The demodulator circuit 23F demodulates the signal with the IF into the received data DRX to the central control circuit 25.

In the transmitter circuit 24, a PLL circuit 24A, a low pass filter 24B, and a voltage controlled oscillator (VCO) 24E cooperate to generate the oscillation signal SVCO. The frequency of the oscillation signal SVCO is defined by the synthesizer control signal SSY.

A modulator circuit 24H modulates carrier using the transmission data DTX to output signal which has IF. The signal with the IF is provided to a mixer 24G via an IF amplifier 24C and a low pass filter 24D. The mixer 24G mixes the signal with the IF and the oscillation signal SVCO to output high frequency signal. The high frequency signal is amplified by a power amplifier 24F and then provided to the antenna unit 21 via the switching circuit 22.

Description of the antenna unit, the switching circuit, the receiver circuit, and the transmitter circuit of the watch-shaped information processing device 12 was given above. The mobile telephone 11 also has the similar components in it.

The antenna unit, the switching circuit, the receiver circuit, and the transmitter circuit of the mobile telephone 11 correspond to a transmitter-receiver unit of the mobile telephone of the present invention. Also, the central control circuit (not shown in the figure) of the mobile telephone 11 that performs data communication using the above transmitter-receiver unit corresponds to a control unit of the mobile telephone of the present invention.

Figure 4:
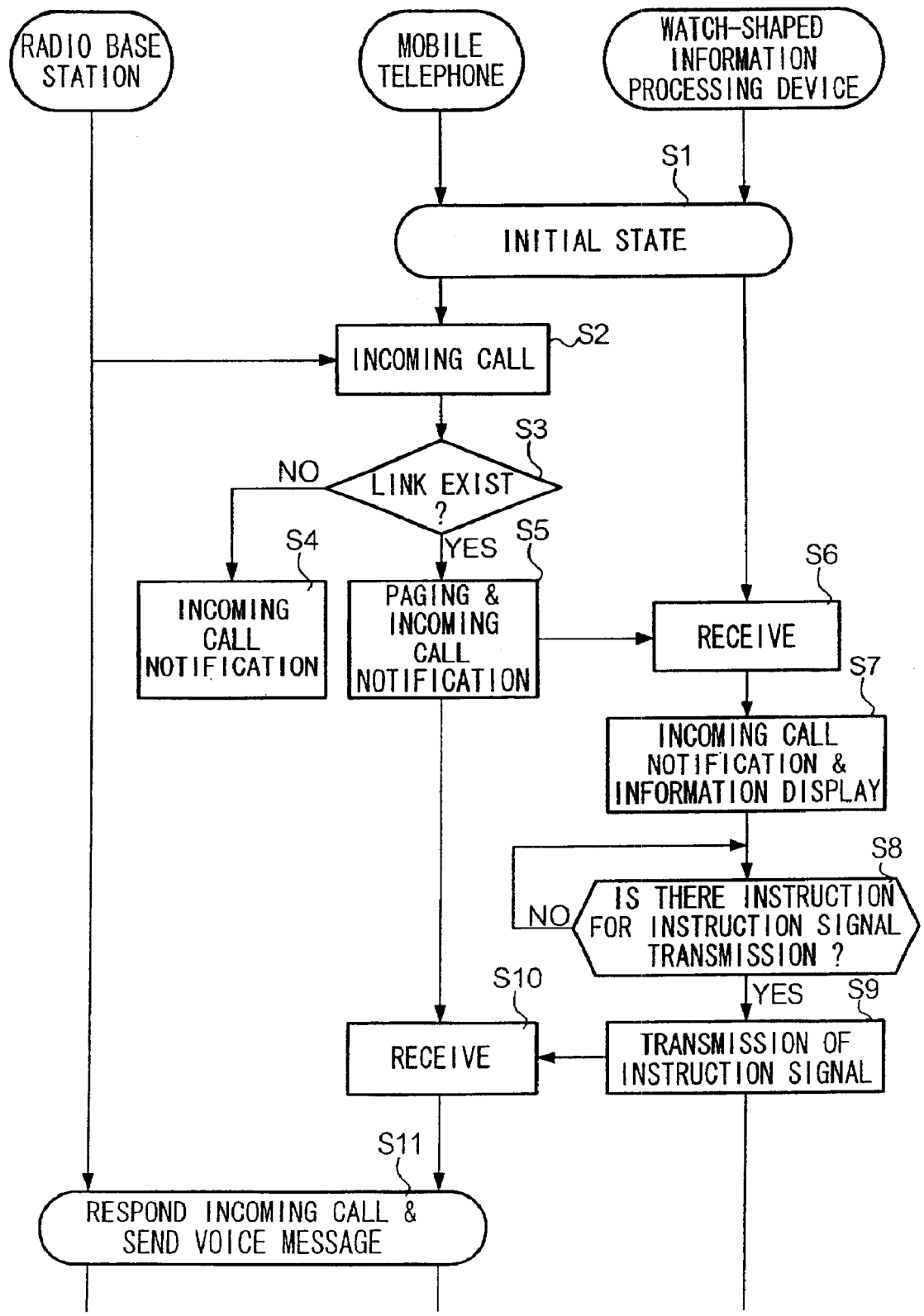
FIG. 4 is a sequence chart showing an operation of the first embodiment.

FIG. 4 is a sequence chart showing an operation of the first embodiment. With reference to the figure, the operation of the first embodiment will be described.

At the initial state S1, the mobile telephone 11 periodically transmits an identification signal (which corresponds to the ID number NIND of the mobile telephone 11) having a synchronization signal using a carrier of 430 MHz or 2.45 GHz. On the other hand, the watch-shaped information processing device 12 performs carrier sensing operation. As long as the watch-shaped information processing device 12 is receiving the identification signal from the mobile telephone 11, a synchronization of bidirectional communication exists between the watch-shaped information device 12 and the mobile telephone 11. When there is this synchronization and the watch-shaped information processing device 12 received from the mobile telephone 11 the identification signal that corresponds to the ID number NIND stored in the nonvolatile memory 33, the watch-shaped information processing device 12 can communicate with the mobile telephone 11. By this communication, the watch-shaped information processing device 12 can recognize the operating state of the mobile telephone 11.

Figure 5:
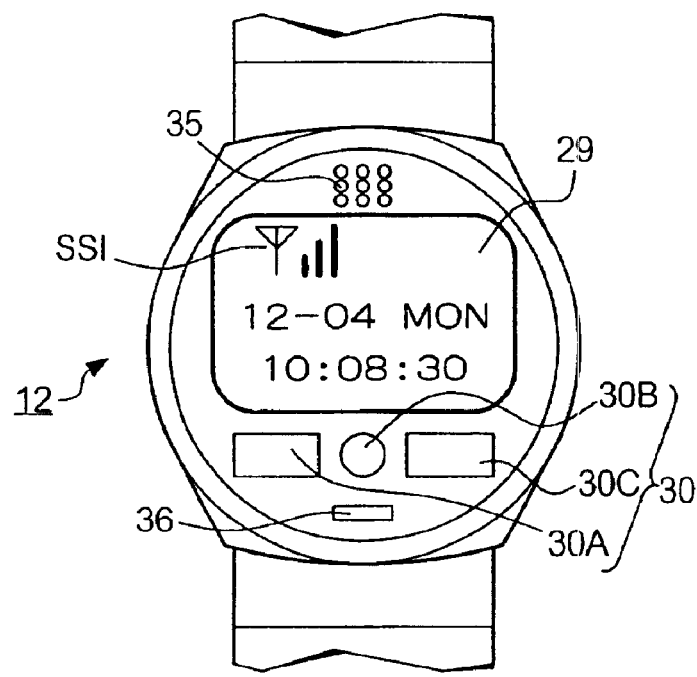
FIGS. 5 and 6 are the watch-shaped information processing devices displaying information on their displays.

Also at the initial state S1, as shown in FIG. 5, a date, day of the week, and a current time are shown on the display unit 29 of the watch-shaped information processing device 12. Also shown on the display unit 29 is a signal strength indicator SSI that tells strength of the received signal from the mobile telephone 11. The signal strength indicator SSI is displayed depending on the signal strength signal SSS output from the IF amplifier 23E of the receiver circuit 23.

The reason to display the signal strength indicator SSI is to notify the user of quality deterioration or loss of radio communication between the mobile telephone 11 and the watch-shaped information processing device 12.

When there is an incoming call to the mobile telephone 11 as shown in FIG. 4 (step S2), the mobile telephone 11 examines if there is a communication link with the watch-shaped information processing device 12 (step S3). The incoming call may be, for example, from the fixed telephone 15 via the PSTN, the mobile network 17, and the radio base station 14, or from another mobile telephone 13 via the radio base station 14 and the mobile network 17.

When the watch-shaped information processing device 12 is not within a given range of the mobile telephone Hand there is no communication link between them (step S3: NO), the mobile telephone 11 notifies the user of incoming call by producing sound from its own speaker or producing vibration by vibrator (step S4).

On the other hand, when there is a communication link between the mobile telephone 11 and the watch-shaped information processing device 12 (step S3: YES), the mobile telephone 11 pages the watch-shaped information processing device 12 and sends information about the incoming call (step S5). In more detail, the mobile telephone 11 generates a send data DTXT that includes information to the effect that there is an incoming call, an ID number NID of the watch-shaped information processing device 12, and a telephone number of the caller. Then the mobile telephone 11 modulates carrier using the send data DTXT to output to the watch-shaped information processing device 12 an incoming call notification signal which is a high frequency signal. As a circuit to generate a high frequency signal in the mobile telephone 11, a similar circuit to the transmitter circuit 24 in FIG. 3 is used.

In the watch-shaped information processing device 12, the incoming call notification signal is received in the antenna unit 21 and the receiver circuit 23 demodulates the incoming call notification signal to the received data DRX (step S6). This received data DRX includes information to the effect that there is an incoming call, an ID number NID of the watch-shaped information processing device 12, and a telephone number of the caller.

Figure 6:
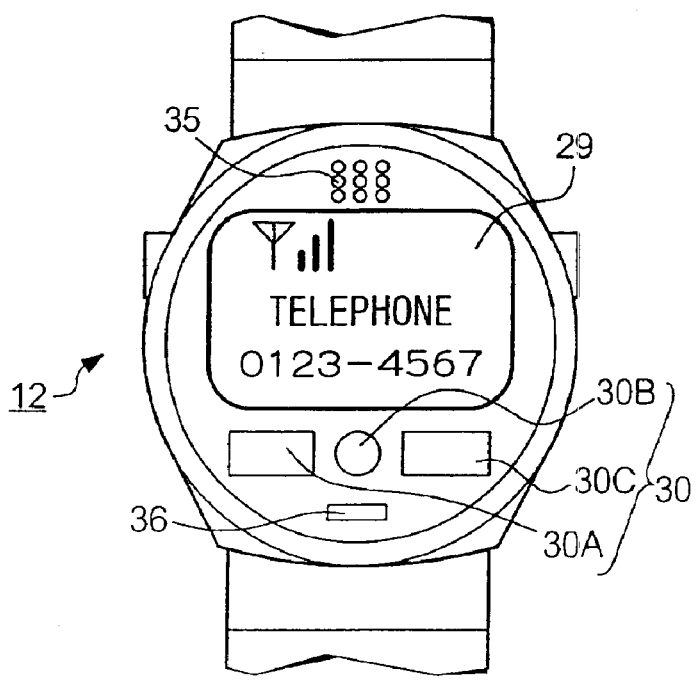

On receiving the received data DRX, the central control circuit 25 determines that there is an incoming call to the mobile telephone 11, and then notifies user of incoming call and displays information (step S7). In more detail, in order to notify the user of incoming call, the central control circuit 25 controls the electronic sound unit 26 to produce a buzzer sound or an electronic sound, the vibrator 27 to produce a vibration, or the light emitting unit 28 to blink light emitting device such as an LED. The central control circuit 25 also extracts the telephone number of the caller from the received data DRX, and displays on the display unit 29 the telephone number and other related information, if any information such as name of the caller is registered in advance. FIG. 6 shows the information for this case. Shown on the display unit 29 in FIG. 6 are the telephone number of the caller and a phrase meaning call incoming.

When the user notices an incoming call, s/he takes the mobile telephone 11 from the bag and makes a conversation. However, there is a case when the user cannot answer the incoming call. In that case, by the following operation, the user can send information telling that the user cannot answer the phone at the moment. The operation can be that the user operates buttons 30A, 30B, and 30C of the external input unit 30 to send instruction from the watch-shaped information processing device 12 to the mobile telephone 11 (steps S8 and S9). The instruction may be for sending a voice message that asks the caller to wait for a moment. When the mobile telephone 11 receives the instruction, it answers the call automatically and makes a communication link. Then, the mobile telephone 11 reads an encoded data of voice message from an unshown nonvolatile memory. The voice message may be like "I am not able to answer the phone at the moment, please wait for a moment." Then the mobile telephone 11 sends the encoded data to the caller (step S11).

By this embodiment, when there is an incoming call to the mobile telephone, because the watch-shaped information processing device is notified of the incoming call, its user can recognize the incoming call and see caller's phone number without taking the mobile telephone from the bag.

B. Second Embodiment

Figure 7:
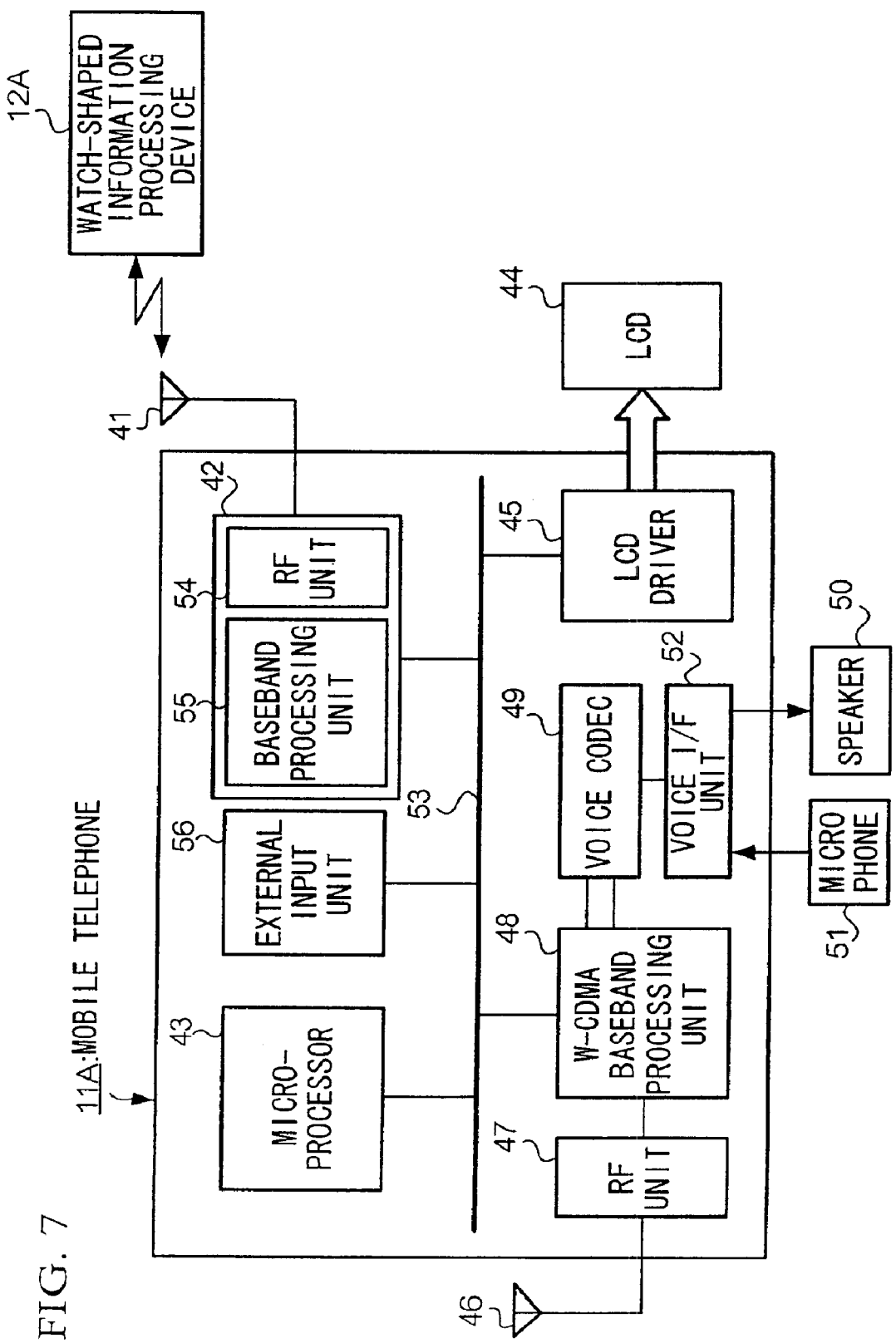
FIG. 7 shows a configuration of a mobile telephone of a mobile telephone system of the second embodiment.
Figure 8:
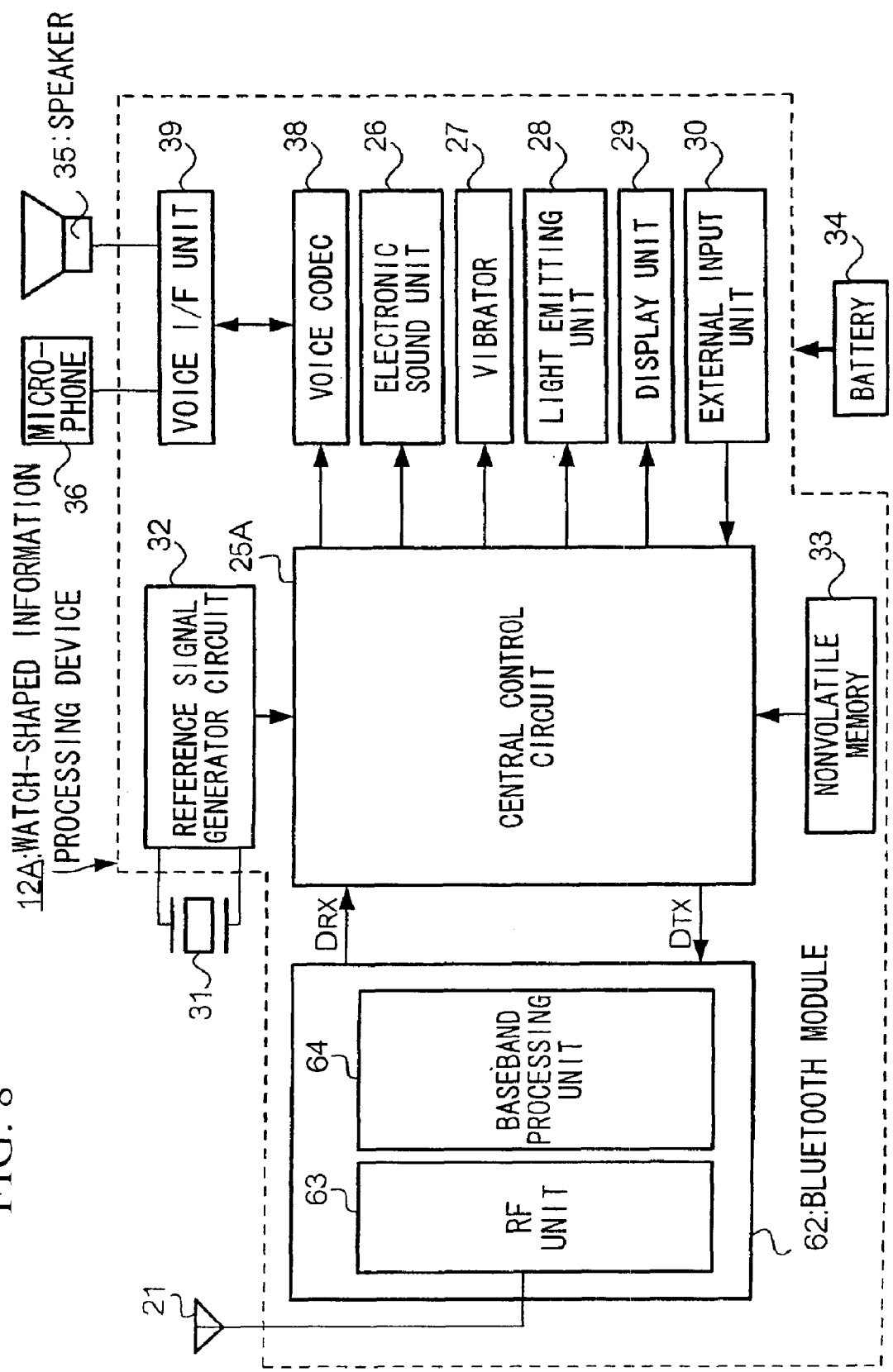
FIG. 8 shows a configuration of a watch-shaped information processing device of the second embodiment.

FIG. 7 shows a configuration of a mobile telephone 11A of a mobile telephone system of the second embodiment, and FIG. 8 shows a configuration of a watch-shaped information processing device 12A of the mobile telephone of this mobile telephone system.

The mobile telephone system of the second embodiment has similar configuration to that shown in FIG. 1. But the mobile telephone 11 is replaced with the mobile telephone 11A and the watch-shaped information processing device 12 with the watch-shaped information processing device 12A.

In this mobile telephone system, when there is an incoming call to the mobile telephone 11A, the mobile telephone 11A sends an incoming call notification signal to the watch-shaped information processing device 12A. Based on the incoming call notification signal, the watch-shaped information processing device 12A notifies the user of the incoming call. Also, the watch-shaped information processing device 12A sends pre-stored voice message to the mobile telephone 11A based on user's instruction. This voice message is transmitted to the caller via the mobile network 17.

Next, with reference to FIG. 7, a configuration of the mobile telephone 11A will be described.

As shown in FIG. 7, a bluetooth module 42 performs bidirectional communication with the watch-shaped information processing device 12A via a antenna 41 for bluetooth.

A microprocessor 43 has a read only memory (ROM) and a random access memory (RAM) for storing various data. The microprocessor 43 controls communication, application, and entire units of the mobile telephone 11A. Main control operation conducted by the microprocessor 43 are as follows; a control for sending an incoming call notification signal to the watch-shaped information processing device 12A when there is an incoming call, and a control for processing for incoming call.

An LCD driver 45 drives a liquid crystal display (LCD) 44 under a control of the microprocessor 43.

An RF unit 47 conducts a high frequency signal processing such as amplifying high frequency signal, and conducts a radio communication with mobile network via an antenna 46.

A W-CDMA baseband processing unit 48 conducts baseband processing that is modulation/demodulation of the baseband signal for wide-band code division multiple access (W-CDMA).

A voice codec 49 decodes the output of the W-CDMA baseband processing unit 48 to output voice data and encodes voice data from a voice interface (IF) unit 52 to output to the W-CDMA base band processing unit 48.

The voice interface (IF) unit 52 conducts a digital-to-analog conversion on the voice data output from the voice codec 49 into analog voice signal, and voice sound is output from a speaker 50. The voice interface unit 52 also conducts a digital-to-analog conversion on analog signal input from a microphone 51 into a voice data, and the voice data is output to the voice codec 49.

The external input unit 56 is equipped with various operation keys, an operation stick, a touch panel, and a jog dial, and operated by the user.

Next, configuration of the bluetooth module 42 will be described.

An RF unit 54 of the bluetooth module 42 performs high frequency signal processing such as amplifying high frequency signal and performs bidirectional communication with the watch-shaped information processing device 12A.

A baseband processing unit 55 modulates/demodulates baseband signals based on bluetooth technique.

Also, the bluetooth module 42 has a flash memory, a voltage regulator, a quartz oscillator, and other peripherals (all not shown). The configuration of this bluetooth module is already known.

The flash memory of the bluetooth module 42 stores various necessary information for bluetooth radio communication such as a bluetooth device address, a link key, and an encryption key. The bluetooth device address is used for identifying other bluetooth devices. The link key is used for authorizing radio communication when starting it. The encryption key is used for encrypted communication.

The bluetooth module 42 with the above configuration transmits, based on instructions from the microprocessor 43, to the watch-shaped information processing device 12A control data such as incoming call notification signal that indicates there is an incoming call. This bluetooth module 42 also sends to the watch-shaped information processing device 12A voice data that is sent from other telephone via the mobile network 17. Also, the bluetooth module 42 receives various control data and voice data that are sent from the watch-shaped information processing device 12A, and outputs the received data to the microprocessor 43 and the W-CDMA base band processing unit 48 via a bus 53.

Next, configuration of the watch-shaped information processing device 12A will be described with reference to FIG. 8.

The watch-shaped information processing device 12A shown in FIG. 8 is similar to the watch-shaped information processing device 12 of the first embodiment shown in FIG. 2. However, the antenna unit 21, the receiver circuit 23, and the transmitter circuit 24 are replaced with an antenna 61 for bluetooth and a bluetooth module 62. The bluetooth module 62 functions as a transmitter-receiver unit of the radio communication device of the present invention.

The bluetooth module 62 has a similar configuration to that of the above mentioned bluetooth module 42. An RF unit 54 of the bluetooth module 62 performs high frequency signal processing such as amplifying high frequency signal and performs bidirectional communication with the watch-shaped information processing device 11A. A baseband processing unit 64 modulates/demodulates baseband signals using bluetooth technique. Also, the bluetooth module 62 has a flash memory, a voltage regulator, a quartz oscillator, and other peripherals (all not shown). The configuration of this bluetooth module is already known. The flash memory of the bluetooth module 62 stores various necessary information for bluetooth radio communication such as a bluetooth device address, a link key, and an encryption key. The bluetooth device address is used for identifying other bluetooth devices. The link key is used for authorizing radio communication when starting it. The encryption key is used for encrypted communication.

The bluetooth module 62 transmits various control data generated by the central control circuit 25A and voice data read from the nonvolatile memory 33 to the watch-shaped information processing device 11A. The bluetooth module 62, also, receives various control data and voice data that are sent from the mobile telephone 11A, and outputs the received data to the central control circuit 25A.

The nonvolatile memory 33 stores various messages such as for asking the caller to wait for a moment and for answering machine function. Also, the caller stores his or her message in the nonvolatile memory 33. The nonvolatile memory 33 also stores a process table that is described later. The nonvolatile memory 33 also stores control programs that perform notification of incoming call when the incoming call notification signal from the mobile telephone 11A is received, and that make the mobile telephone 11A to conduct a process for incoming call. By performing these control programs, the central control circuit 25A functions as a control unit of the radio communication device of the present invention.

Other components are basically the same as those shown in FIG. 2, therefore, the description for them is not given here.

Next, the central control circuit 25A of the watch-shaped information processing device 12A will be described.

The central control circuit 25A controls the bluetooth module 62 and transmits/receives voice data and control data to and from the mobile telephone 11A. In this case, the central control circuit 25A selects from four transmit/receive modes to transmit control data, transmit voice data, receive control data, and receive voice data.

Figure 9:
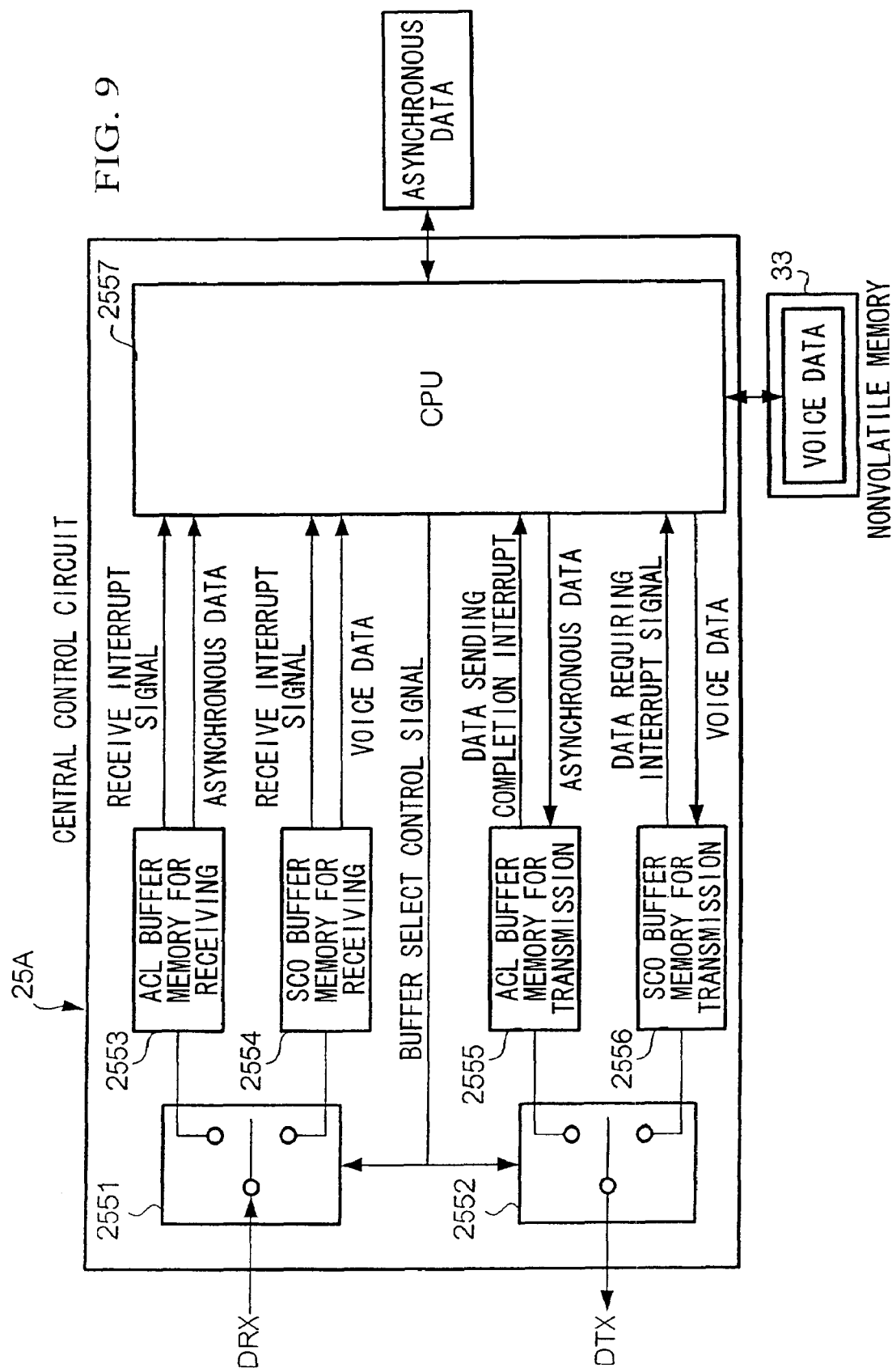
FIG. 9 shows a configuration of a central control circuit of the watch-shaped information processing device of the second embodiment.

FIG. 9 shows a configuration of a central control circuit 25A.

As shown in FIG. 9, the central control circuit 25A has a central processing unit (CPU) 2557, switching elements 2551 and 2552, a ROM, and a RAM. The central control circuit 25A can also perform data communication on asynchronous connection less (ACL) link and synchronous connection oriented (SCO) link.

The ACL link is an asynchronous communication link defined in the bluetooth technical specification. In the bluetooth system, two or more units sharing the same channel form a piconet. One Bluetooth unit acts as the master of the piconet, whereas the other unit(s) acts as slave(s). Using the ACL link, the master unit performs data communication with several slave units. Effective communication speed in the ACL link varies depending on the number of slaves and the amount of exchanged data in the piconet. Also, the master polls the slaves based on state of the communication slot, and performs data communication with the slaves using empty communication slot. Therefore, the ACL link is usually used for non-real-time communication.

The watch-shaped information processing device 12A of the second embodiment uses the ACL link to exchange asynchronous data that does not require real time processing with the mobile telephone 11A. The asynchronous data here can be control data used for various instructions and controls among the watch-shaped information processing device 12A and the mobile telephone 11A.

When conducting communication on the ACL link, the CPU 2557 sends a buffer select control signal to the switching elements 2551 and 2552 to switch the switching element 2551 to an ACL buffer memory 2553 for receiving and to switch the switching element 2552 to an ACL buffer memory 2552 for transmission. Then the received data DRX output from the bluetooth module 62 is written in the ACL buffer memory 2553 for receiving via the switching element 2551. When one packet full of asynchronous data is written, an unshown memory controller transmits a receive interrupt signal to the CPU2557. In response to the receive interrupt signal, the CPU 2557 reads the asynchronous data stored in the ACL buffer memory 2553 for receiving. On the other hand, asynchronous data generated by the CPU 2557 is written on an ACL buffer memory 2555 for transmission. Then the asynchronous data is read from the ACL buffer memory 2555 for transmission and is output to the bluetooth module 62 via the switching element 2552 as the transmission data DTX. When one packet full of control data is sent and the ACL buffer memory 2555 for transmission becomes empty, an unshown memory controller transmits a data sending completion interrupt signal to the CPU2557. In response to the data sending completion interrupt signal, the CPU 2557 writes in the ACL buffer memory 2555 for transmission the asynchronous data to be sent next.

The above is detailed configuration of the second embodiment for communication on the ACL link.

Next, the SCO link will be described. The SCO link is a synchronous communication link defined in the bluetooth technical specification. This SCO link is a point-to-point link between the master and a specific slave. The SCO link reserves slots for communication between the master and the slave at a given interval, and can therefore have a certain communication speed (in this embodiment 64 kbps). Therefore, the SCO link is usually used for real-time communication.

The watch-shaped information processing device 12A of the second embodiment exchanges voice data by using the SCO link.

When conducting communication on the SCO link, the CPU 2557 sends a buffer select control signal to the switching elements 2551 and 2552 to switch the switching element 2551 to the SCO buffer memory 2554 for receiving and to switch the switching element 2552 to the SCO buffer memory 2556 for transmission. Then the received data DRX output from the bluetooth module 62 is written in the SCO buffer memory 2554 for receiving via the switching element 2551. When one packet full of asynchronous data is written, the unshown memory controller transmits a receive interrupt signal to the CPU2557. In response to the receive interrupt signal, the CPU 2557 reads voice data stored in the SCO buffer memory 2554 for receiving.

On the other hand, transmission operation is as follows. Several voice messages such as response message are stored in the nonvolatile memory 33 in advance. Voice data for telephone communication is stored in an unshown RAM by using the microphone 36, the voice interface unit 39, and voice codec 38. Voice data stored in the nonvolatile memory 33 or the unshown RAM is read by the CPU 2557 and written in an SCO buffer memory 2556 for transmission. Then the voice data is read from the SCO buffer memory 2556 for transmission and is output to the bluetooth module 62 via the switching element 2552 as the transmission data DTX. When one packet full of voice data is sent and the SCO buffer memory 2556 for transmission becomes empty, an unshown memory controller transmits a data requiring interrupt signal to the CPU2557. In response to the data requiring interrupt signal, the CPU 2557 reads voice data to be sent next from the nonvolatile memory 33 or the unshown RAM to write in the SCO buffer memory 2556 for transmission.

The above is detailed configuration of the second embodiment for communication on the SCO link.

Next, the nonvolatile memory 33 will be described.

The nonvolatile memory 33 stores voice data for various messages and an address management table AMT having memory address of the above voice data.

Figures 10, 11:
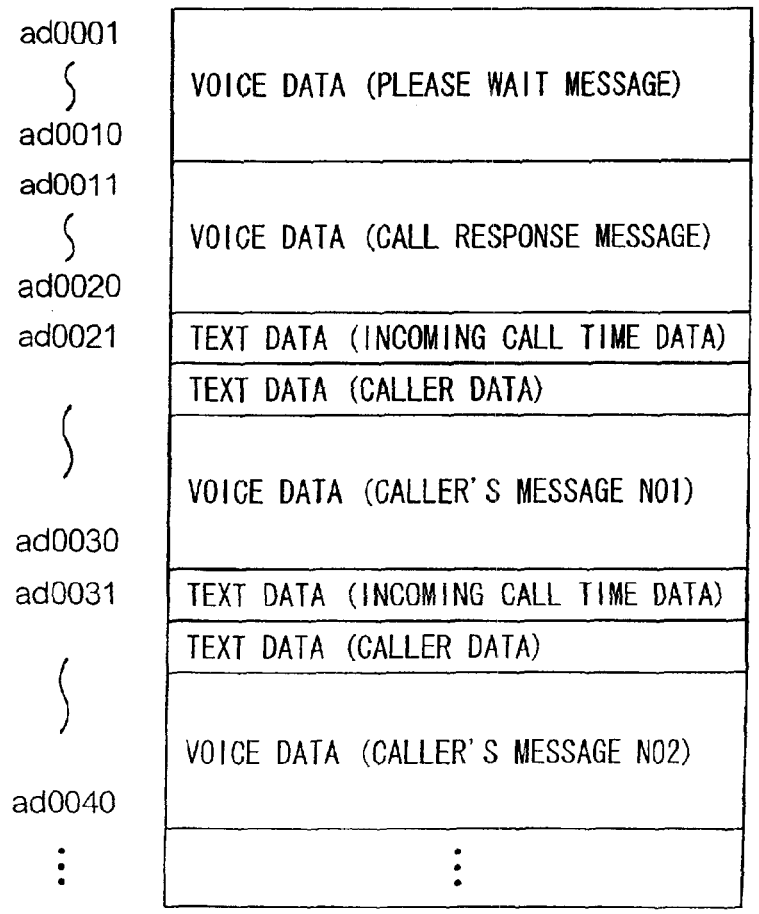
FIG. 10 shows an address management table stored in a nonvolatile memory of the watch-shaped information processing device of the second embodiment.
FIG. 11 is a memory map showing content of the nonvolatile memory of the watch-shaped information processing device of the second embodiment.

FIG. 10 shows an address management table AMT stored in a nonvolatile memory of the watch-shaped information processing device of the second embodiment. FIG. 11 is a memory map showing content of the nonvolatile memory 33.

As shown in FIG. 10, message types and memory addresses for the voice data of the message types are associated with each other and written in the address management table AMT.

In FIG. 10, for example, "please wait message" is a message which is sent to the caller when the user cannot answer the phone at the moment. To illustrate, it may be a message such as "please wait for a moment, I'll answer your call soon".

In FIG. 10, voice data for the "please wait message" is stored in a memory area with memory address "ad0001" to "ad0010" of the nonvolatile memory 33. When the central control circuit 25A reads the "please wait message", the central control circuit 25A sees the address management table AMT to get the memory address for the "please wait message". Using the address, the central control circuit 25A reads data of the "please wait message" from the nonvolatile memory 33. The read data is then sent to the mobile telephone 11A via the bluetooth module 62 and the antenna 61 for bluetooth. Then the data is sent from the mobile telephone 11A to the telephone of the caller, and finally voice is output at the caller's telephone.

In this case, the data for the "please wait message" may be stored in the nonvolatile memory 33 of the watch-shaped information processing device 12A prior to shipment. Also, the user can store his or her own data for the "please wait message" by using the microphone 36, conducting analog-to-digital conversion on his or her voice, and storing in the nonvolatile memory 33. When the user stores his or her own data for the "please wait message", the central control circuit 25A sees the address management table AMT and acquires the memory address for the data. Then the central control circuit 25A designates the acquired memory address as a writing address, and writes the data input by the user into the nonvolatile memory 33.

"Call response message" shown in FIG. 10 is a message sent to the caller when the user of the mobile telephone 11A cannot answer the phone. The message, for example, may be "I am not available at the moment, please leave a message after the tone".

In FIG. 10, voice data for the call response message is stored in a memory area with memory address "ad0011" to "ad0020" of the nonvolatile memory 33. The central control circuit 25A reads the data for call response message as follows.

First, the central control circuit 25A sees the address management table AMT to get the memory address for the call response message.

Then, using the address, the central control circuit 25A reads data of the call response message from the nonvolatile memory 33. The read data is then sent to the mobile telephone 11A via the bluetooth module 62 and the antenna 61 for bluetooth in the same way as the data for "please wait message". Then the data is sent from the mobile telephone 11A to the telephone of the caller, and finally voice is output at caller's telephone.

This data of the call response message may also be stored in the watch-shaped information processing device 12A prior to shipment. Also, the user can store his or her own voice for the call response message by using the microphone 36. When the user stores his or her own data for the call response message, the central control circuit 25A sees the address management table AMT and acquires the memory address for the data. Then the central control circuit 25A designates the acquired memory address as a writing address, and writes the data input by the user into the nonvolatile memory 33.

"Caller's message No. 1" to "caller's message No. 10" shown in FIG. 10 are messages that the caller left as messages to the user of the mobile telephone 11 when they heard the above "call response message". In FIG. 10, it is possible to store up to ten messages.

As shown in FIG. 11, in a memory area for voice data of the caller's message (hereinafter referred to as caller's message data), text data indicating the time of the incoming call (hereinafter referred to as incoming call time data) and other text data indicating the caller (hereinafter referred to as caller data) are stored. In a memory region after these data, voice data of caller's message are stored. The central control circuit 25A generates the incoming call time data based on time kept by the time keeping function of the watch-shaped information processing device 12A. Also, by using a caller's phone number display service provided by the mobile network 17 (this service is already known in America as a caller ID), caller data is acquired. Then the central control circuit 25A associates the incoming call time data and the caller data with the caller's message and writes them on the nonvolatile memory 33.

When recording the caller's message data, the central control circuit 25A sees the address management table AMT and acquires a memory address for the caller's message data.

Then the central control circuit 25A stores the caller's message data based on the memory address. In this case, the central control circuit 25A stores the caller's message data in an order from "caller's message No. 1", "caller's message No. 2" . . . to "caller's message No. 10". When reached to "caller's message No. 10", the central control circuit 25A returns to the "caller's message No. 1", erases it, and writes a new caller's message data there.

When the central control circuit 25A reads the caller's message data, it sees the address management table AMT and acquires the memory address for the caller's message the user desired.

Using the memory address, the central control circuit 25A reads the incoming call time data, the caller data, and the caller's message.

The incoming call time data and the caller data are displayed on the display unit 29 in a text form. The caller's message data is decoded by the voice codec 38 and then output from the speaker 35 via the voice IF unit 39.

Next, operations of the second embodiment will be described.

Hereinafter, explanation will be given in an order from;

(1) message recording process by the watch-shaped information processing device 12A, (2) operation while asking the caller to wait for a moment (3) operation during answering machine function (4) caller's message playing process by the watch-shaped information processing device 12A.

Figure 12:
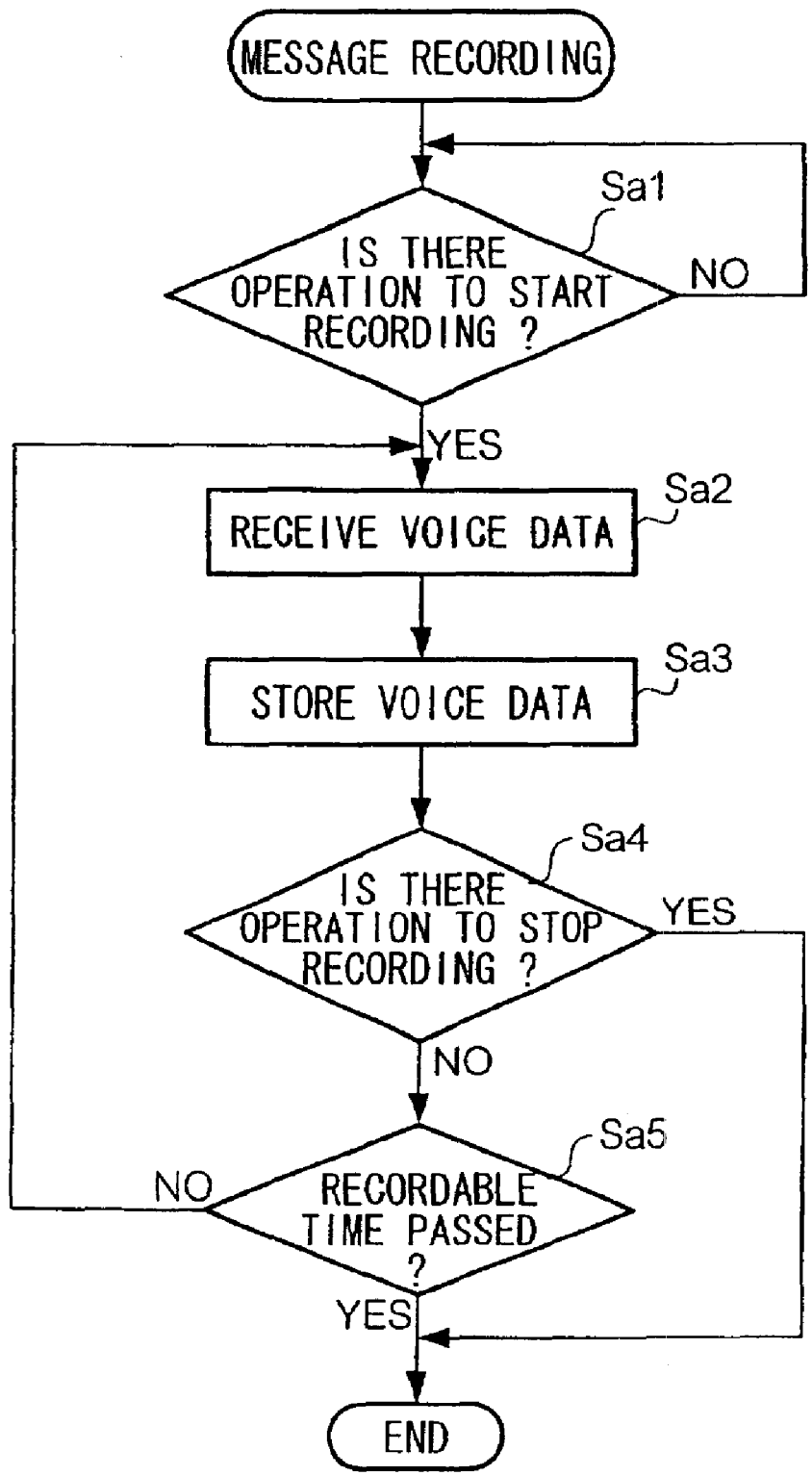
FIG. 12 is a flowchart for a message recording operation of the second embodiment.

(1) Message Recording Process by the Watch-shaped Information Processing Device 12A FIG. 12 is a flowchart for a message recording operation by the central control circuit 25A of the watch-shaped information processing device 12.

In FIG. 12, the central control circuit 25A regularly scans the external input unit 30, and makes a judgement if the user operates it or not (step Sa1).

When the user uses the external input unit 30 to instruct to record message asking to wait for a moment, the central control circuit 25A detects user's operation (step Sa1; Yes) and starts reading voice data (step Sa2). To illustrate, the user speak to the speaker and the user's voice is sent to the voice interface unit 39, which generates voice data. Then the voice data is encoded by the voice codec 38 and the central control circuit 25A receives it.

Then the central control circuit 25A sees the address management table AMT shown in FIG. 10 in the nonvolatile memory 33. The central control circuit 25A then writes the voice data on a memory area with memory address that start from "ad0001"that is a memory area for "please wait message"in the nonvolatile memory 33 (step Sa3).

The processes in steps Sa2 and Sa3 are continued until the user operates to stop recording (step Sa4), or until a prescribed time period that is a longest recordable time period has elapsed (step Sa5). When there is either the recording stop operation or elapse of longest recordable time (step Sa4 Yes or step Sa5 Yes), process in FIG. 12 ends.

In the above explanation for the recording process, "please wait message" is used. However, similar recording process is also used for recording the call response message. For the call response message, other memory area is used, though.

(2) Operation While Asking the Caller to Wait for a Moment

With reference to a sequence chart in FIGS. 13, and 14, operation while asking the caller to wait for a moment will be described.

The watch-shaped information processing device 12A carries out a synchronization establishment phase and a link connection phase, both are defined in the bluetooth specification, to form a communication network with the mobile telephone 11A called a piconet (step Sb1). Then operational modes of the mobile telephone 11A and the watch-shaped information processing device 12A shifts to a low power consumption mode called a park mode (step Sb2). During the mode shifting, several processes are conducted in a master unit and a slave unit using a bluetooth device address and a link key. However, these processes are already known, explanation for them will not given here.

In the second embodiment, either the watch-shaped information processing device 12A or the mobile telephone 11A can be a master unit or a slave unit. The following explanation is given with the assumption that the mobile telephone 11A is a master unit and the watch-shaped information processing device 12A is a slave unit.

In this low power consumption mode, a date, the day of the week, and a current time are displayed as shown in FIG. 5 on the display unit 29 of the watch-shaped information processing device 12A. Displayed also on the displayed unit 29 is the signal strength indicator SSI that shows an intensity of the received beacon signal periodically sent from the mobile telephone 11A. This indicator is based on the above mentioned signal strength signal SSS.

The reason to display the signal strength indicator SSI is to tell the user of quality deterioration or loss of radio communication between the mobile telephone 11A and the watch-shaped information processing device 12A.

When the user (referred to as a caller in this explanation) of the mobile telephone 13 in FIG. 1 calls the user of the mobile telephone 11A, the mobile network 17 sends a terminating call signal via the radio base station 14 (step Sb3). This terminating call signal includes telephone numbers of the mobile telephone 11A and 13.

When the mobile telephone 11A in a service area of the radio base station 14 receives the terminating call signal, the mobile telephone 11A instructs the watch-shaped information processing device 12A, a slave unit, to shifts from the park mode to a link connection phase by the ACL link. By this, operation of the mobile telephone 11A and the watch-shaped information processing device 12A shift to the link connection phase by the ACL link (step Sb5).

When the ACL link is established, the mobile telephone 11A sends the incoming call notification signal in ACL packets in order to notify the incoming call (step SB6). The incoming call notification signal includes the caller's telephone number of the mobile telephone 13 and information to the effect that there is an incoming call.

When the watch-shaped information processing device 12A receives the ACL packets (step Sb7), it finds that there is an incoming call to the mobile telephone 11A and displays information and notifies the user of incoming call. To illustrate, the watch-shaped information processing device 12A extracts the caller's telephone number from the ACL packets. Then the watch-shaped information processing device 12A displays on the display unit 29 telephone number or information corresponding to the telephone number to notify the user of the incoming call (step Sb8). One example what is displayed on the display unit 29 in this case is shown in FIG. 6. Instead of the telephone number of the caller, caller's name that is associated with the telephone number and stored in a memory (for example the nonvolatile memory 33) of the watch-shaped information processing device 12A may be displayed.

The watch-shaped information processing device 12A also performs the incoming call notification (step Sb9). To illustrate, the central control circuit 25A controls the electronic sound unit 26 to produce buzzer sound or electronic sound. The central control circuit 25A also controls the vibrator 27 to vibrate. The central control circuit 25A also controls the light emitting unit 28 to blink the light emitting device such as an LED.

When the user notices the incoming call notification, the user has to take the mobile telephone 11A from the bag to answer the call. However, there are some cases where the user cannot answer the call or the user cannot open the bag. In these cases, the user uses the external input unit 30 on the watch-shaped information processing device 12A for instruction for "please wait message".

The watch-shaped information processing device 12A receives these inputs (step Sb10) and sends to the mobile telephone 11 ACL packets that includes instruction for "please wait message" (step Sb11).

When the mobile telephone 11A receives the ACL packet (step Sb12), it extracts the instruction for "please wait message". In response to the instruction for "please wait message", the mobile telephone 11A orders the radio base station 14 to make a communication link with the caller's mobile telephone 13 (step Sb13).

The radio base station 14 carries out a predetermined process such as for allocating a communication channel, and makes a communication line between the mobile telephone 11A and the mobile telephone 13 (step Sb14).

Then the mobile telephone 11A instructs the watch-shaped information processing device 12A to shift from the link connection phase by the ACL link to the link connection phase by the SCO link.

In response to the instruction for phase shift, operations of the mobile telephone 11A and the watch-shaped information processing device 12A shift to the link connection phase by the SCO link (step Sb15).

Figure 15:
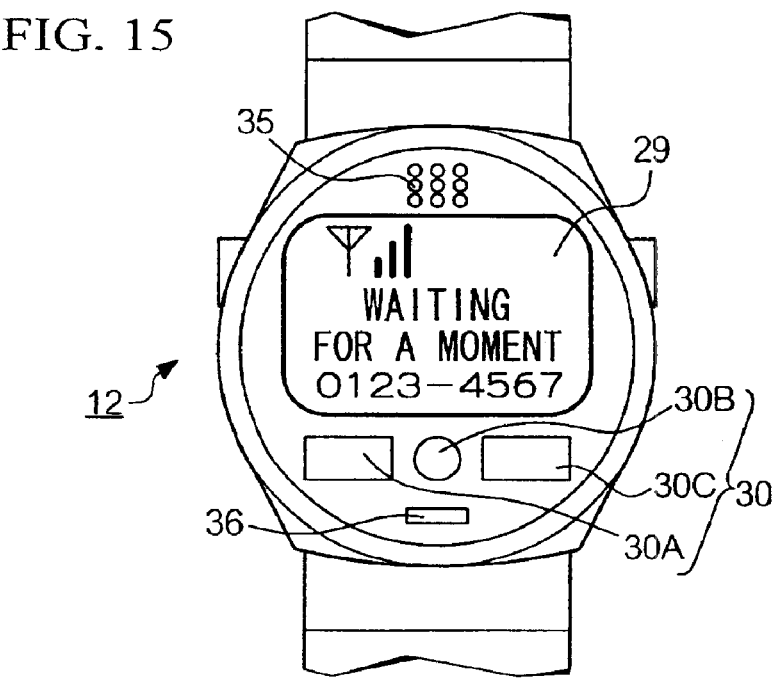
FIG. 15 is the watch-shaped information processing device of the second embodiment displaying information on its display asking the caller to wait for a moment.

After the SCO link is established, the watch-shaped information processing device 12A sees the address management table AMT to acquire a readout address of "ad0001" to "ad0010". Then the watch-shaped information processing device 12A reads the data for "please wait message" from the nonvolatile memory 33 and sends the data to the mobile telephone 11A via the SCO link (step Sb16). During this process, the caller's telephone number and a message "please wait for a moment" are shown on the display unit 29 of the watch-shaped information processing device 12A to inform the user of the state as shown in FIG. 15.

When the mobile telephone 11A receives data for "please wait message" using the bluetooth module 42, the mobile telephone 11A sends the data to the radio base station using the W-CDMA base band processing unit 48, the RF unit 47, and the antenna 46 (step Sb17).

The data for "please wait message" is received by the radio base station 14 (step Sb18), and then is sent to the caller's mobile telephone 13 via the mobile network 17. Then the message is output from the speaker of the mobile telephone 13. The user of the mobile telephone 13 hears the message and waits for a moment or hangs up the phone.

The process from the step SB16 to the SB18 is continued until the user of the mobile telephone 11A operates the mobile telephone 11A, and the caller is kept hearing the message for "please wait message".

When the user of the mobile terminal 11A becomes able to operate it and conducts an off-hook operation using the external input unit 56, the mobile telephone 11A accepts the off-hook operation (step Sb19).

In response to the off-hook operation, the mobile telephone 11A stops reading voice data from the bluetooth module 42. Then the mobile telephone 11A carries out processes for direct voice communication between the caller and the user of the mobile telephone 11A (step Sb20).

To illustrate, the user speaks to the microphone 51, then voice data is generated for the user's voice by the voice IF unit 52, and then the voice data is encoded by the voice codec 49. This voice data is sent to the radio base station 14 using the W-CDMA base band processing unit 48, the RF unit 47, and the antenna 46.

Also, voice data sent from the mobile telephone 13 is output from the speaker 50 through the antenna 46, the RF unit 47, the W-CDMA base band processing unit 48, the voice codec 49, and the voice interface unit 52.

The mobile telephone 11A instructs the watch-shaped information processing device 12A to shift from the link connection phase by the SCO link to the link connection phase by the ACL link. In response to the instruction for phase shift, operations of the mobile telephone 11A and the watch-shaped information processing device 12A shift to the link connection phase by the ACL link (step Sb21).

When the ACL link is established, in order to notify a communication start, the mobile telephone 11A sends ACL packets that includes a communication start notification (step Sb22).

When the watch-shaped information processing device 12A receives the above ACL packets (step Sb23), it detects the communication start notification in the ACL packets. By detecting the communication start notification, the watch-shaped information processing device 12A judges that communication with the mobile telephone 11A has started and makes a shift to the park mode in the same way as step Sb2 (step Sb24).

After finishing the telephone communication, the user of the mobile telephone 11A uses the external input unit 56 to conduct an on-hook operation. The mobile telephone 11A accepts this operation (step Sb25) and sends a request for releasing the telephone line to the radio base station 14, and by this the telephone line is released (step Sb26).

(3) Operation During Answering Machine Function

With reference to a sequence chart shown in FIGS. 16 and 17, operation during answering machine function will be described.

Figure 13:
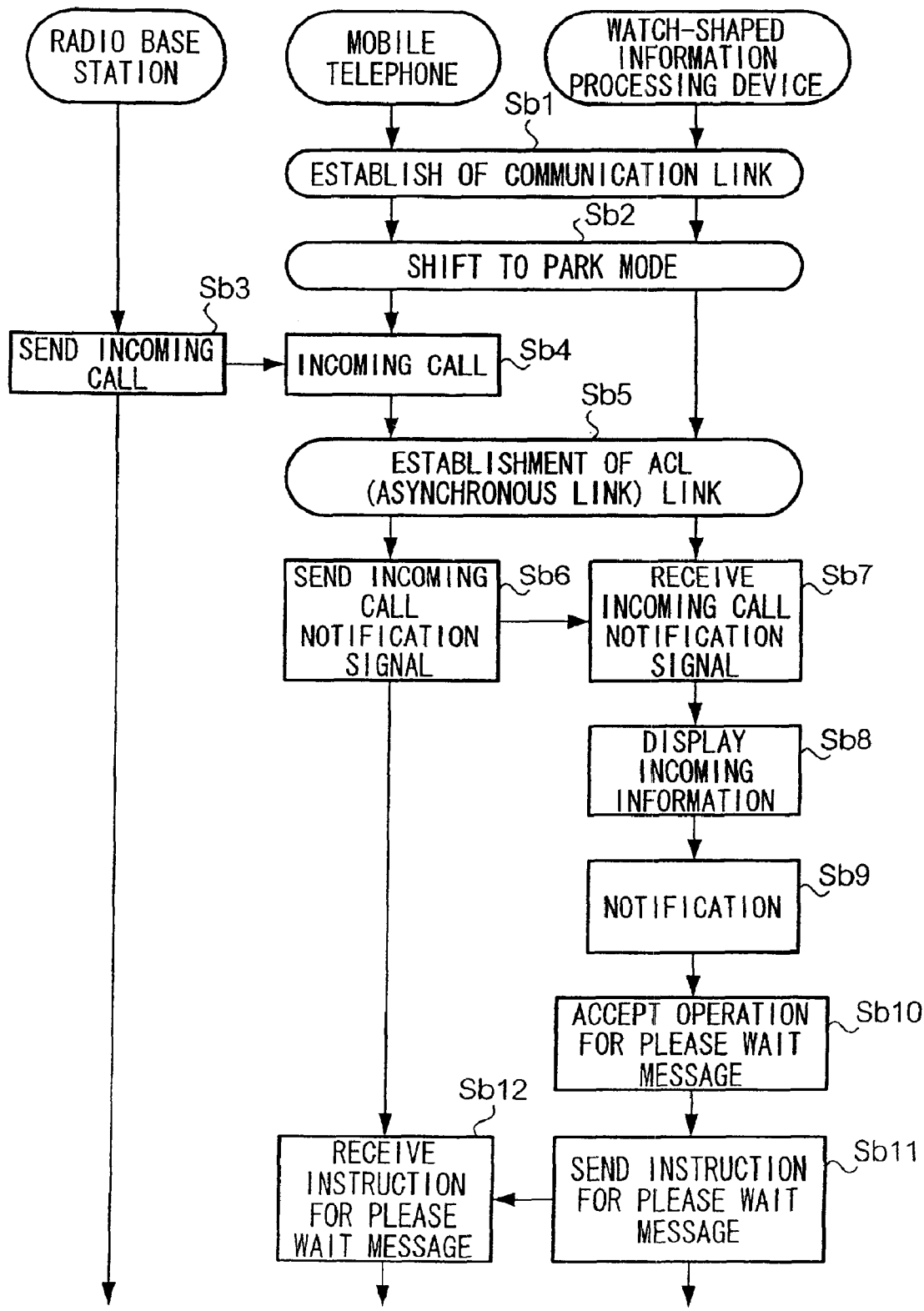
FIGS. 13 and 14 form a sequence chart of the second embodiment for an operation of asking the caller to wait for a moment.
Figure 14:
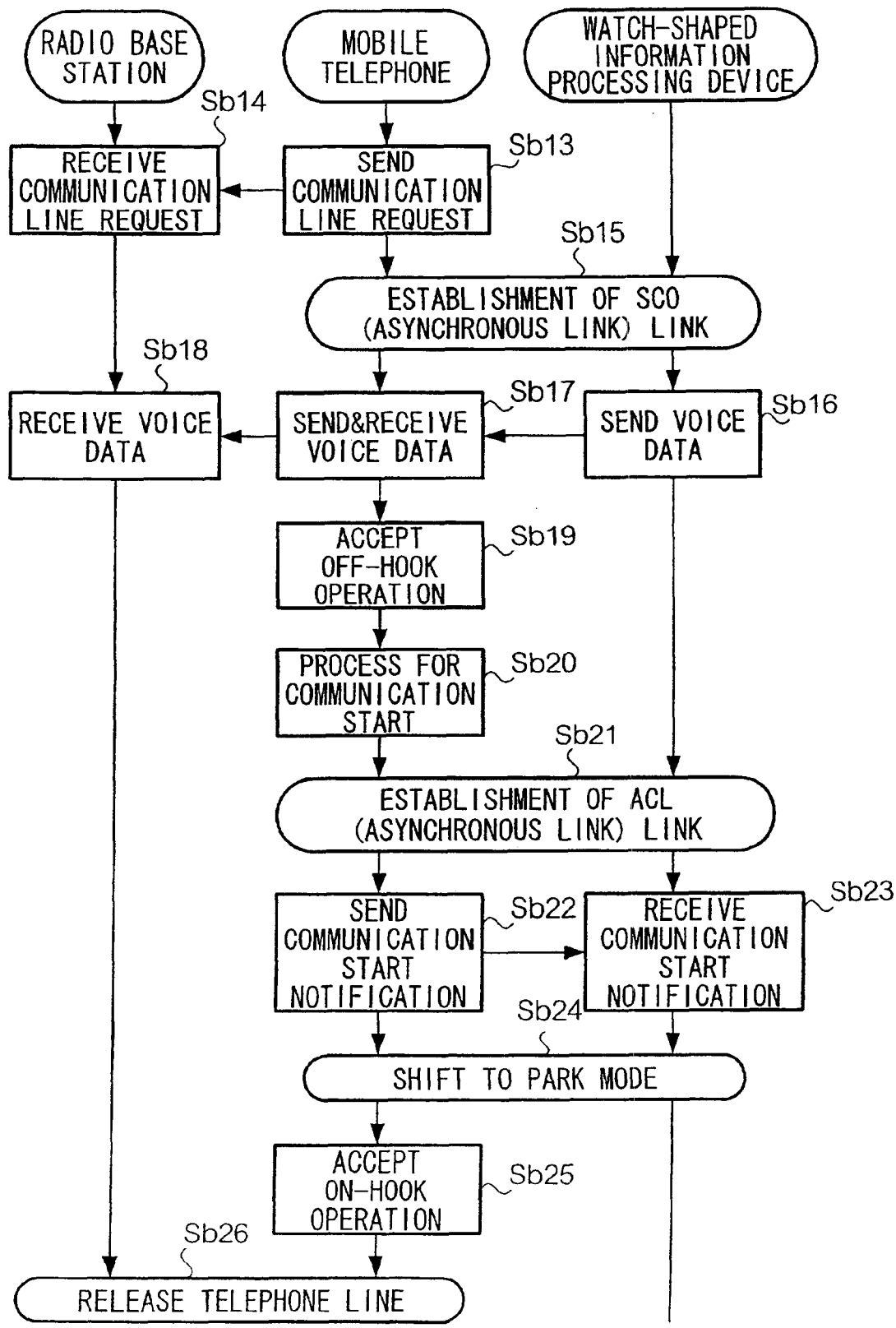
Figure 16:
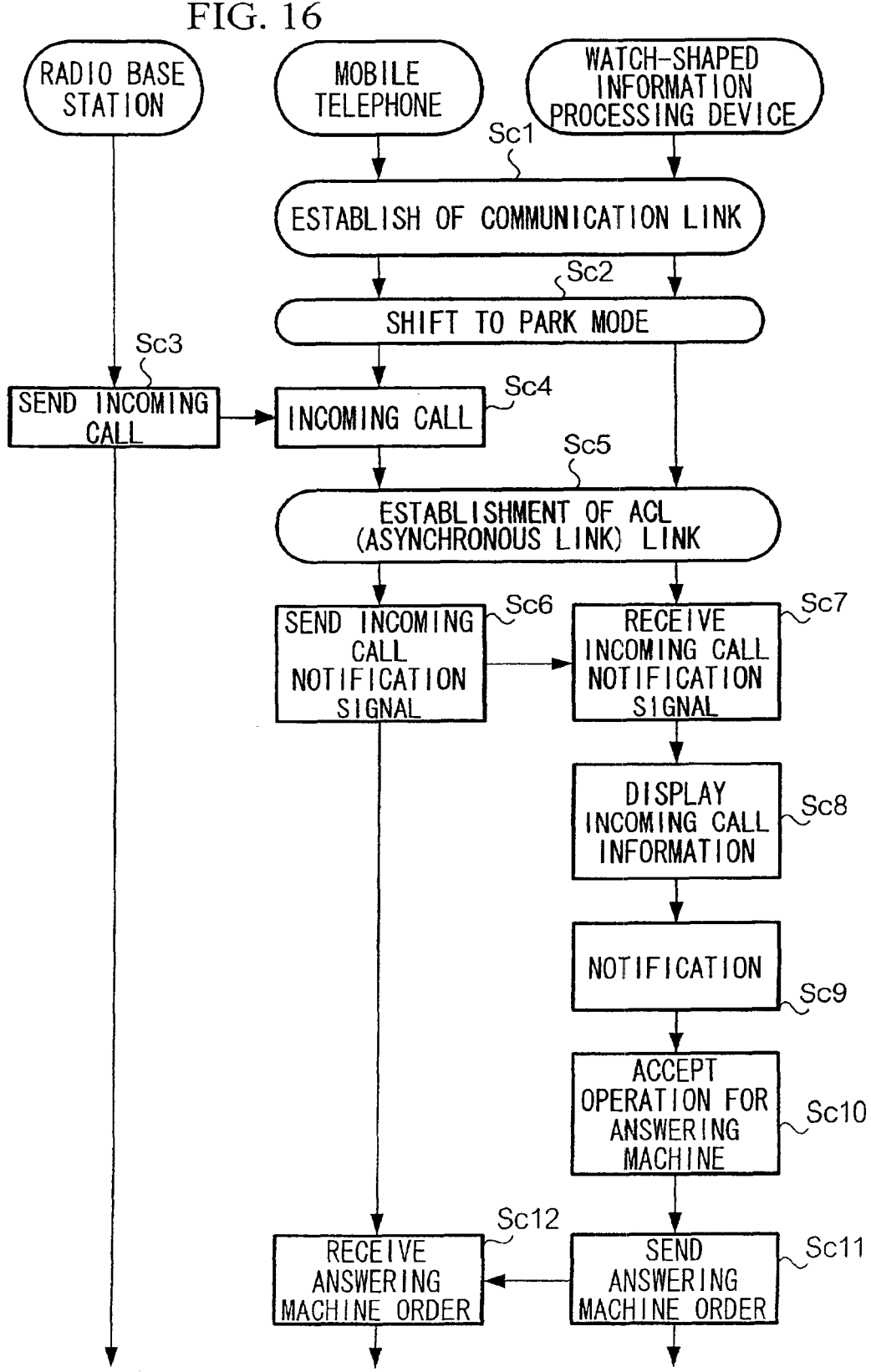
FIGS. 16 and 17 form a sequence chart of the second embodiment for an operation of activating answering machine function.

In FIG. 16, processes from step Sc1 to Sc9 are the same as those of from step Sb1 to Sb9 in FIG. 13, therefore explanation will not given for them. So explanation will start from the process of step Sc10.

By the incoming call notification in steps Sc8 and Sc9, the user notices that there is an incoming call. However, when the user cannot answer the phone, the user uses, in a prescribed order, the external input unit 30 of the watch-shaped information processing device 12A to use the answering machine function.

The watch-shaped information processing device 12A accepts this operation (step Sc10), then it sends to the mobile telephone 11A ACL packets that includes an order for answering machine function (step Sc11).

Also, advancing to step Sc11 can be carried out in the following way. The watch-shaped information processing device 12A starts time-counting when it receives the incoming call notification signal in step Sb6. And when a prescribed time period has passed without the above mentioned user's operation, the process advances to the step Sc11. Therefore, it is possible to advance to step Sc11 even when the user does not notice the incoming call notification or the user does not carry the watch-shaped information processing device 12A.

When the mobile telephone 11A receives the above ACL packets (step Sc12), it detects the order for answering machine function. Then the mobile telephone 11A orders the radio base station 14 to make a communication line (step Sc13 in FIG. 17).

In response to this, the radio base station 14 carries out prescribed processes such as allocating communication channel to make a communication line between the mobile telephone 13 and the watch-shaped information processing device 12A (step Sc14).

Then, the mobile telephone 11A instructs the watch-shaped information processing device 12A to shift from the link connection phase by the ACL link to the link connection phase by the SCO link. In response to the instruction for phase shift, operations of the mobile telephone 11A and the watch-shaped information processing device 12A shift to the link connection phase by the SCO link (step Sb15).

Figure 18:
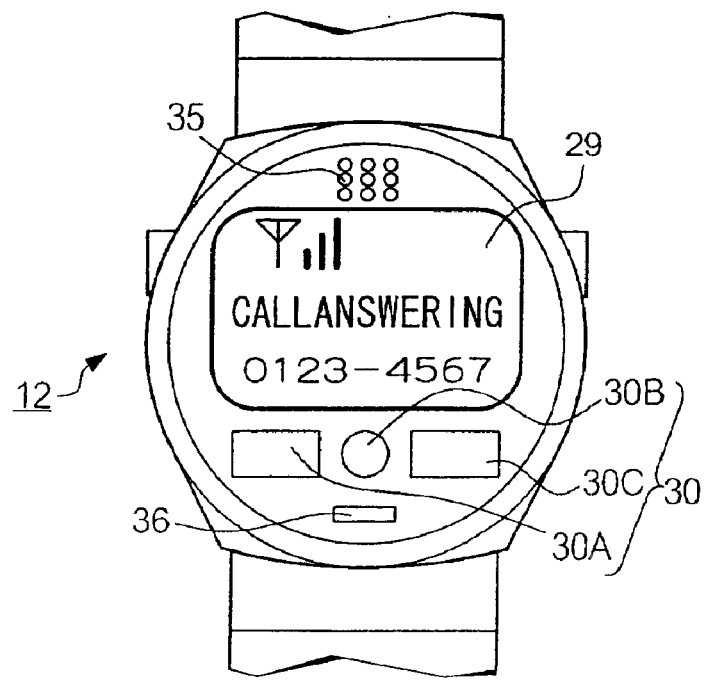
FIGS. 18, 19, and 20 are the watch-shaped information processing devices of the second embodiment displaying information on their displays during conducting answering machine function.

After the SCO link is established, the watch-shaped information processing device 12A sees the address management table AMT to acquire a readout address of "ad0011" to "ad0020". Then the watch-shaped information processing device 12A reads the data for "call response message" from the nonvolatile memory 33 and sends the data to the mobile telephone 11A via the SCO link (step Sc16). As shown in FIG. 18, during this process, the caller's telephone number and a message "call answering" are shown on the display unit 29 of the watch-shaped information processing device 12A to inform the user of the state.

When the mobile telephone 11A receives data for "call answering message" using the bluetooth module 42, the mobile telephone 11A sends the data to the radio base station using the W-CDMA base band processing unit 48, the RF unit 47, and the antenna 46 (step Sc17).

The data for "call answering message" is received by the radio base station 14 (step Sc18), and then is sent to the caller's mobile telephone 13 via the mobile network 17. Then the message is output from the speaker of the mobile telephone 13. The user of the mobile telephone 13 hears the message and speaks to the mobile telephone 13 in order to leave his or her message after the tone. His or her message is sent from the mobile telephone 13 to the mobile telephone 11A via the mobile network 17 and the radio base stations 14 (step Sc20).

The mobile telephone 11A receives the data for the message (step Sc21), and then sends the data to the watch-shaped information processing device 12A via the SCO link (step Sc22).

The watch-shaped information processing device 12A carries out the process for the step Sc16, and then advances to recording operation of caller's message (step Sc19). To illustrate, when the data for caller's message is received by the watch-shaped information processing device 12A, it sees the address management table AMT in the nonvolatile memory 33 shown in FIG. 10. Then the watch-shaped information processing device 12A writes the voice data for the caller's message in memory area for the caller's message. In this explanation, the data is written in an area for the "caller's message No. 1", and memory address for the "caller's message No. 1" starts "ad0021".

Figure 19:
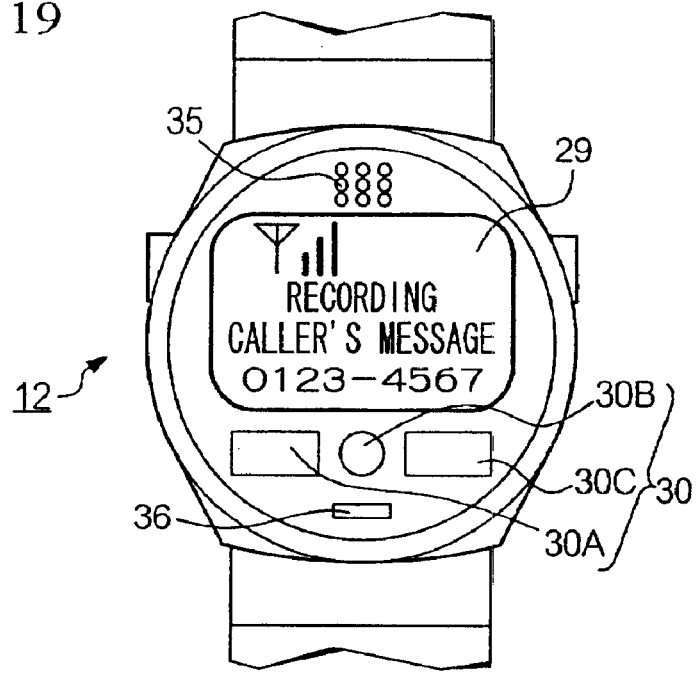

As shown in FIG. 19, during this process, the caller's telephone number and a message "recording caller's message" are shown on the display unit 29 of the watch-shaped information processing device 12A to inform the user that the call is currently leaving a message.

After finishing leaving his or her message, the caller conducts an on-hook operation. In response to the on-hook operation, the mobile telephone 13 sends a request for releasing the telephone line to the radio base station 14, and by this the telephone line between the radio base station 14 and the mobile telephone 11 is released (step Sc23).

When the communication line is released, the mobile telephone 11A instructs the watch-shaped information processing device 12A to shift from the link connection phase by the SCO link to the link connection phase by the ACL link. In response to the instruction for phase shift, operations of the mobile telephone 11A and the watch-shaped information processing device 12A shift to the link connection 16 phase by the ACL link (step Sc24).

After the ACL link is established, in order to notify a communication end, the mobile telephone 11A sends ACL packets that includes a communication end notification (step Sc25).

When the watch-shaped information processing device 12A receives the above ACL packets (step Sc26), it detects the communication end notification in the ACL packets.

Figure 20:
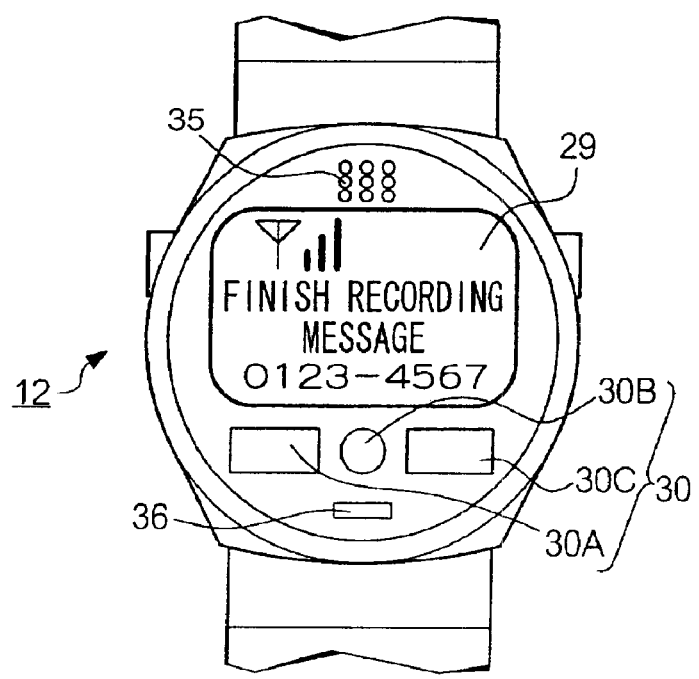

By detecting the communication end notification, the watch-shaped information processing device 12A judges that communication with the mobile telephone 11A has ended and stops recording operation of voice data (step Sc27). As shown in FIG. 20, during this process, the caller's telephone number and a message "finish recording message" are shown on the display unit 29 of the watch-shaped information processing device 12A to inform the user that the message recording is finished.

Then, the operations of the mobile telephone 11A and the watch-shaped information processing device 12A shift to the park mode (step Sc28) which is similar to step Sb2.

(4) Caller's Message Playing Process by the Watch-shaped Information Processing Device 12A.

Figure 21:
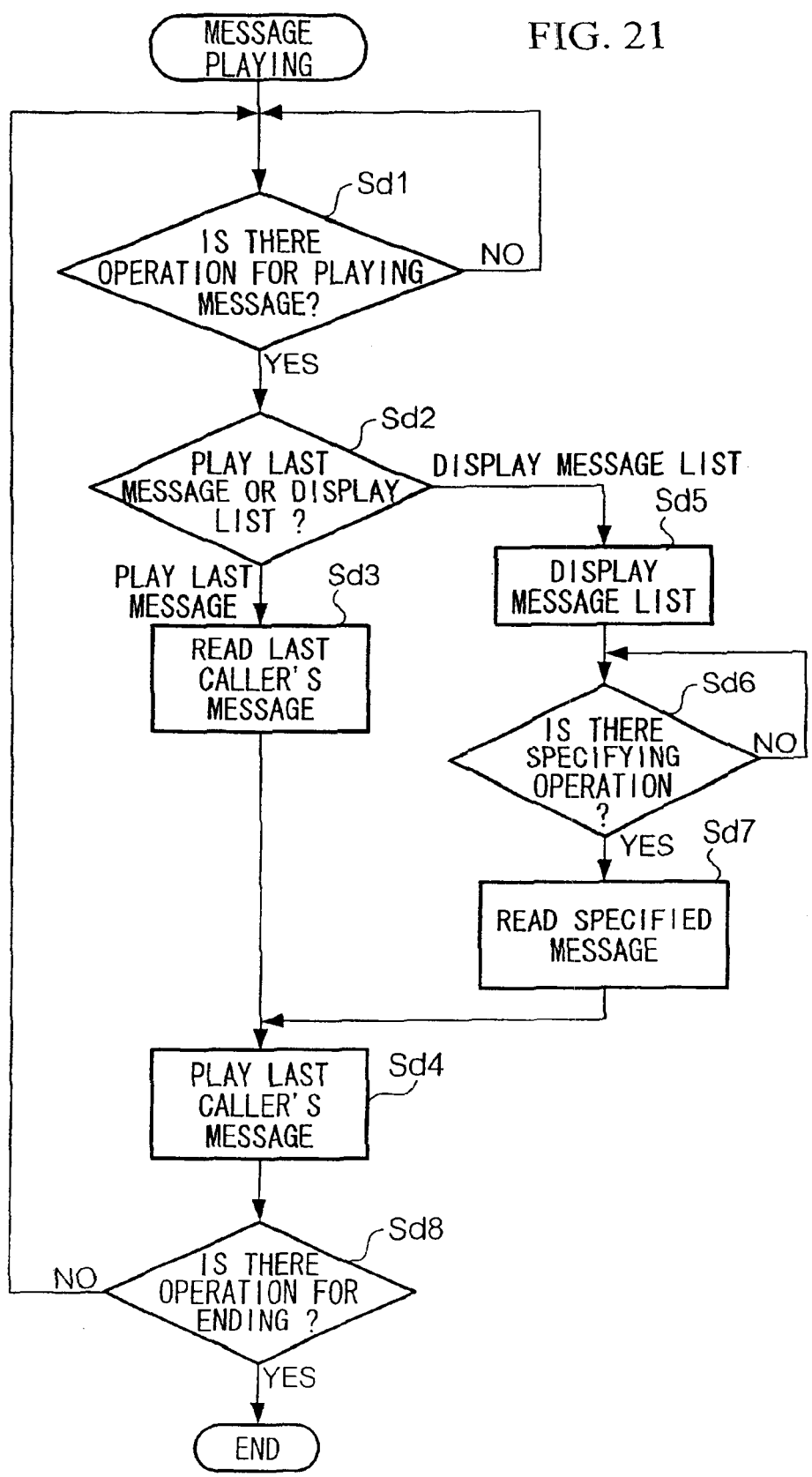
FIG. 21 is a flowchart for a message playing operation of the second embodiment.

FIG. 21 is a flowchart for a message playing operation of the second embodiment.

In FIG. 21, the central control circuit 25A regularly scans the external input unit 30, and makes a judgement if the user operates it or not (step Sd1).

When the user uses the external input unit 30 to instruct to play the caller's message, the central control circuit 25A detects user's operation (step Sd1; Yes) and advances to step Sd2.

There are "last message playing operation" and "message playing operation by list" in the playing operation of the caller's message.

By the "last message playing operation", the last recorded message is played.

By the "message playing operation by list", first the list of all recorded caller's message are displayed, and then the message the user specified is played.

In step Sd2, the central control circuit 25A makes a judgement which the auser's operation is between the above two.

When the central control circuit 25A receives the last message playing operation for playing the caller's message No. 1 (step Sd2: last message play), it sees the address management table AMT to acquire a readout address from "ad0021" to "ad0030".

Then, using the acquired address, the central control circuit 25A reads the caller's message from the nonvolatile memory 33 (step Sd3).

Figure 22:
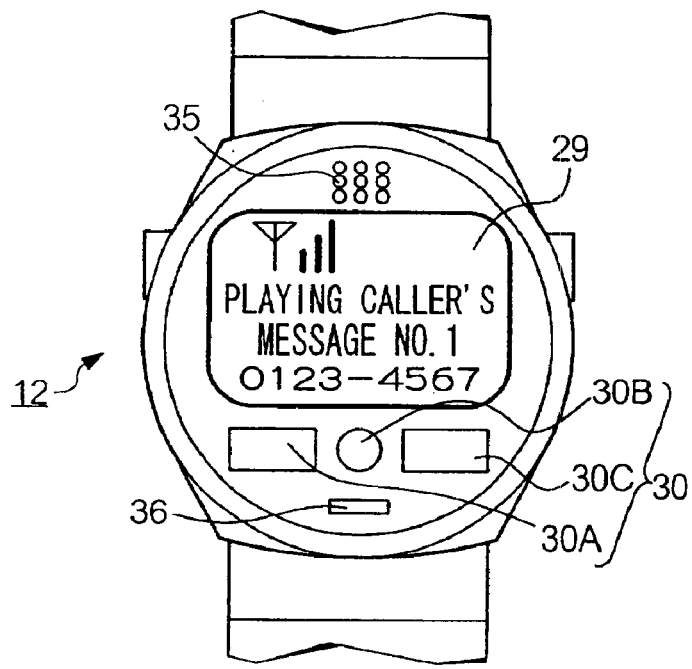
FIGS. 22 and 23 are the watch-shaped information processing devices of the second embodiment displaying information during playing caller's message.

Then the central control circuit 25A outputs the read caller's message to the voice codec 38. By this, the caller's message is output from the speaker 35 (step Sd4). As shown in FIG. 22, during this process, the caller's telephone number and a message "playing caller's message No. 1" are shown on the display unit 29 of the watch-shaped information processing device 12A to inform the user that the message is being played.

On the other hand, when the central control circuit 25A receives "message playing operation by list" (step Sd2: playing operation by list), it sees the address management table AMT and acquires all the readout addresses for the caller's messages.

Figure 23:
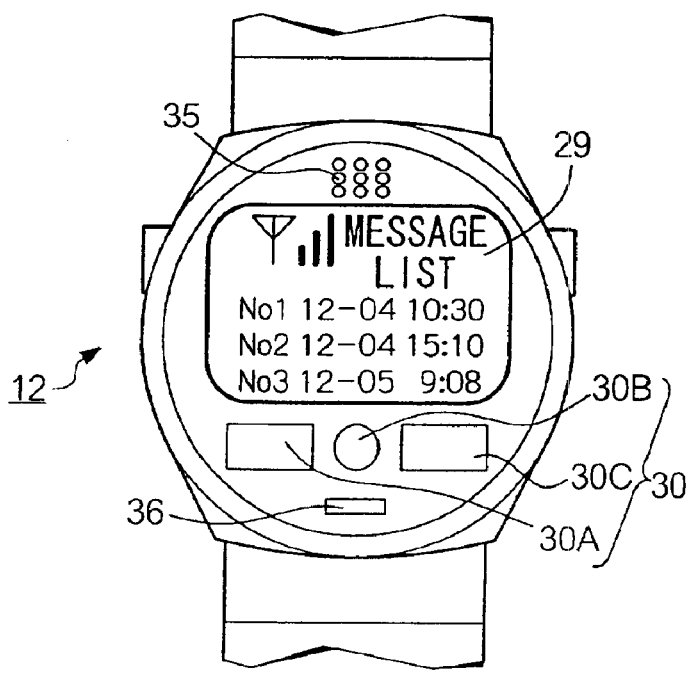

Using the readout addresses, the central control circuit 25A reads only the incoming call time data and the caller data in the nonvolatile memory 33, and displays them on the display unit 29 (step Sd5). As shown in FIG. 23, during this process, a message "message list" and property information on messages are shown on the display unit 29 of the watch-shaped information processing device 12A. In FIG. 23, only a part of the list is shown. However, the user can scroll the screen right-and-left and up-and-below by using the external input unit 30.

When the user specifies a caller's message, the central control circuit 25A accepts this (step Sd6: Yes).

Then the central control circuit 25A sees the address management table AMT and acquires the readout addresses for the specified caller's messages. Using the readout addresses, the central control circuit 25A reads the caller's message in the nonvolatile memory 33 (step Sd7).

Then the central control circuit 25A outputs the read caller's message to the voice codec 38. The voice codec 38 decodes the data for the caller's message, and the caller's message is output from the speaker 35 (step Sd4).

When the specified message ends and the user wants to play other caller's message, the user operates to do so (step Sd8: No). By this, the process of the central control circuit 25A returns to step Sd1 and the above processes are again carried out.

After finishing the play of the message, when the user conducts an operation for ending the play (step Sd8: Yes), the processes in FIG. 21 end.

As explained above, according to the second embodiment, since the incoming call notification signal of the mobile telephone 11A is sent to the watch-shaped Information processing device 12A, the user can notice the incoming call and see the telephone number of the caller without taking the mobile telephone 11A from the bag.

Also, according to the second embodiment, by using the watch-shaped information processing device 12A, the user can request the "please wait message" and a "call response message".

Also, the user can record the "please wait message" and "call response message" in his or her own voice by using the watch-shaped information processing device 12A. The user also can record caller's messages in the watch-shaped information processing device 12A, so the user can hear the caller's message anywhere anytime.

So, the watch-shaped information processing device 12A becomes an interesting gadget to its user.

C. Third Embodiment

In the second embodiment, the caller's messages are stored in the watch-shaped information processing device 12A. In the third embodiment, the caller's messages are stored in a service center connected to the mobile network 17.

Figure 24:
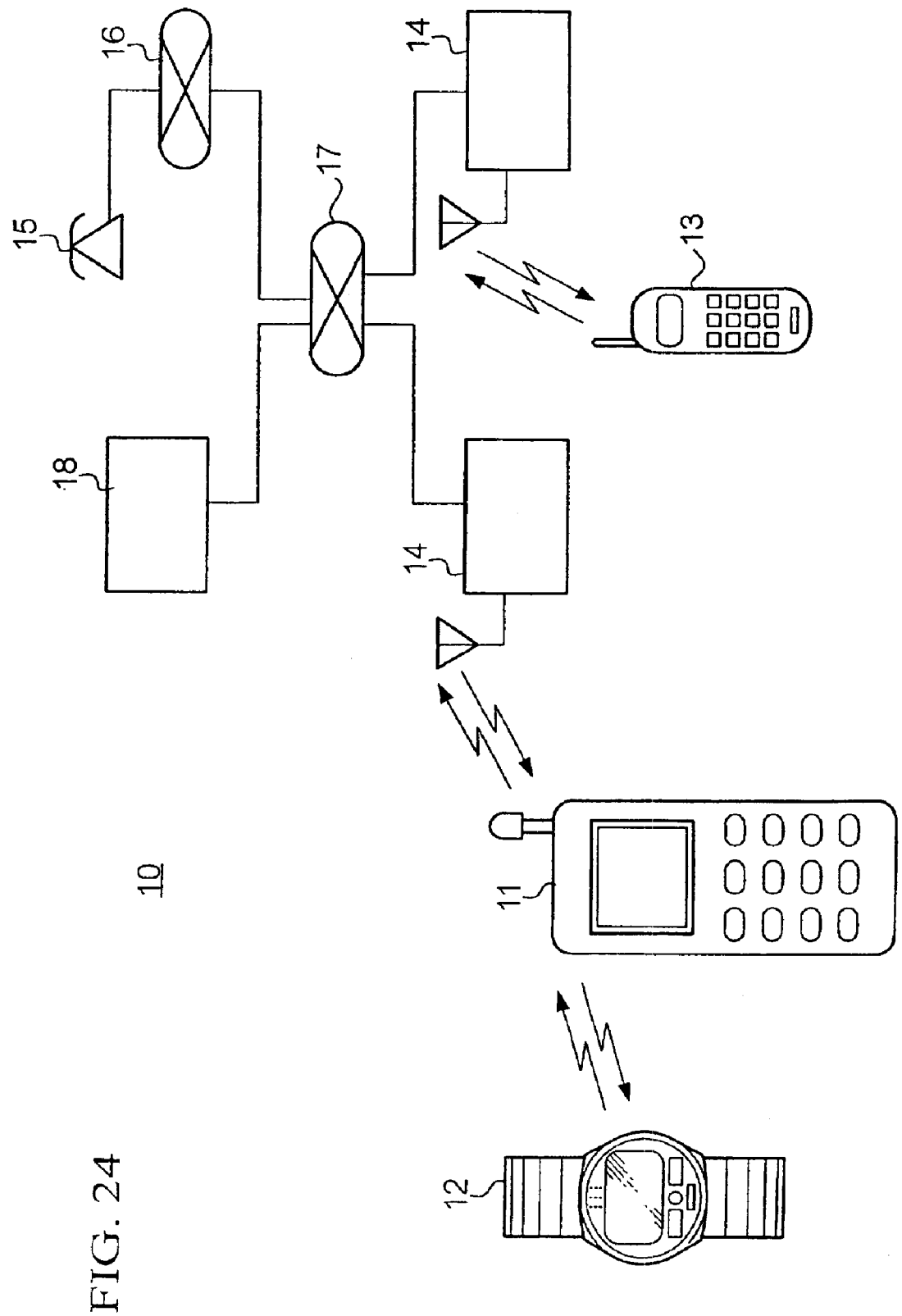
FIG. 24 shows a mobile telephone system of the third embodiment.

FIG. 24 shows a configuration of a mobile telephone system of the third embodiment. Only one difference of the third embodiment shown in FIG. 24 from the first embodiment shown in FIG. 1 is there is a service center 18 connected with the mobile network 17.

The service center 18 has several servers. One of them is for storing caller's messages for each mobile telephone 11A. Another of them is for accepting orders from the mobile telephones 11A and for distributing the stored caller's messages in response to the orders.

Therefore, the watch-shaped information processing device 12A does not have to store the caller's message in the nonvolatile memory 33, which is the case in the second embodiment. In more detail, only the memory addresses for the "please wait message" and for "call response message" have to be stored in the address management table AMT (refer to FIG. 10) for the nonvolatile memory 33 in the watch-shaped information processing device 12A. Also, no memory area for caller's messages are provided in the nonvolatile memory 33.

Other components are the same as in the second embodiment, therefore, explanation for them will not given below.

Next, operation of the third embodiment will be described.

With reference to a sequence chart in FIGS. 25 and 26, operation during answering machine function will be described. However, message recording operation and operation during the "please wait message" are not described because they are the same operations explained in the second embodiment.

Figure 17:
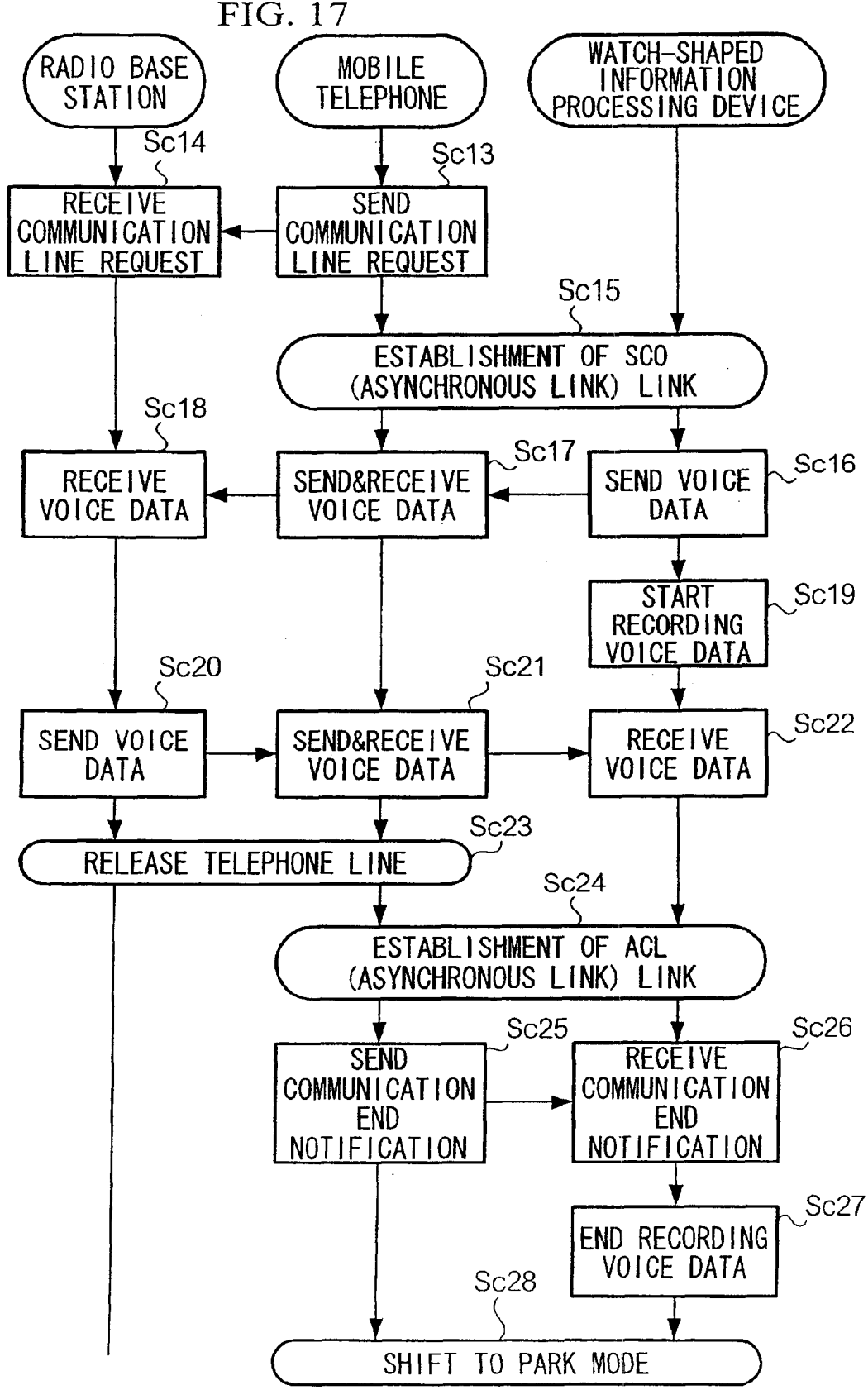
Figure 25:
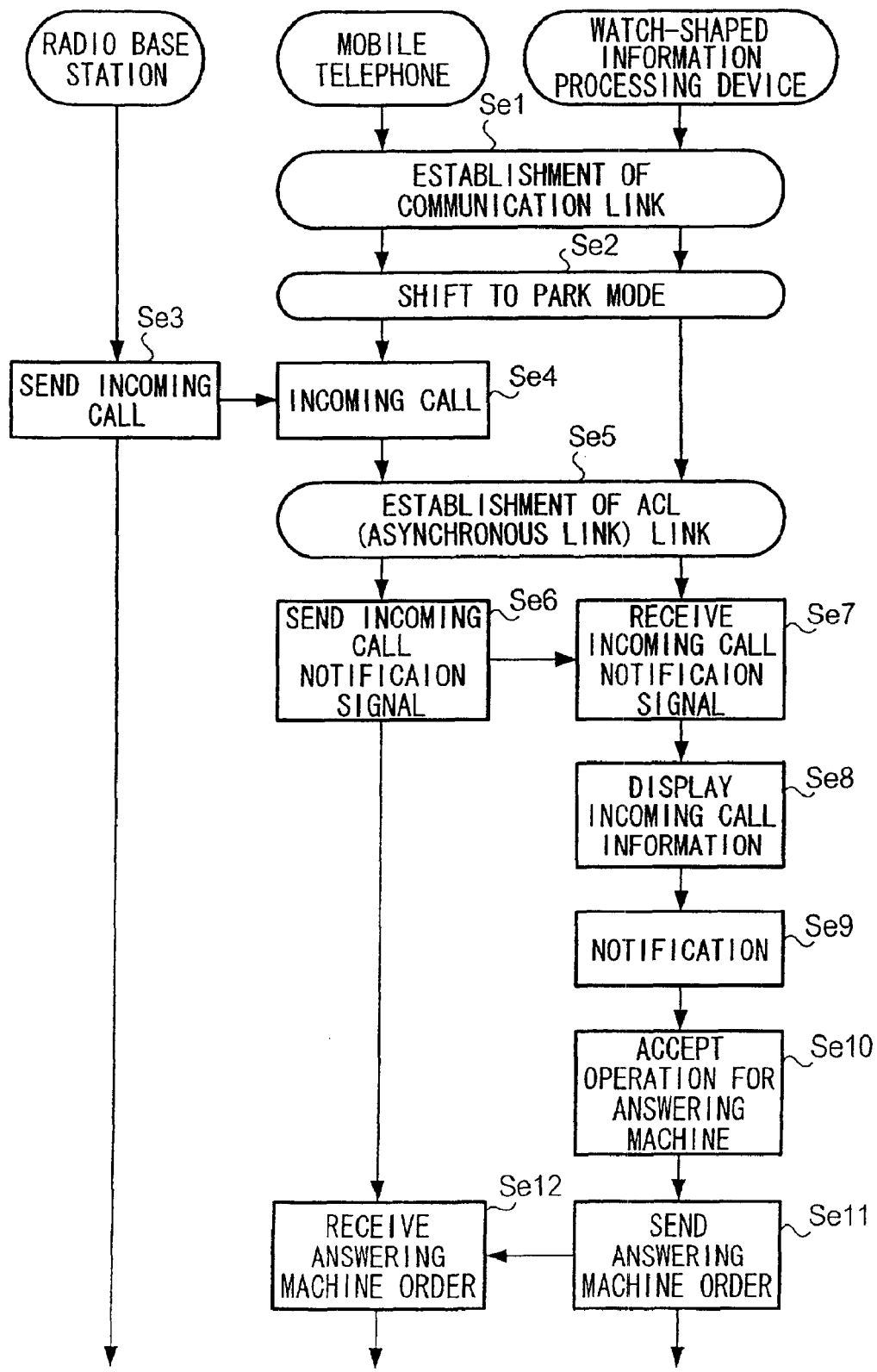
FIGS. 25 and 26 form a sequence chart for an operation of the third embodiment.
Figure 26:
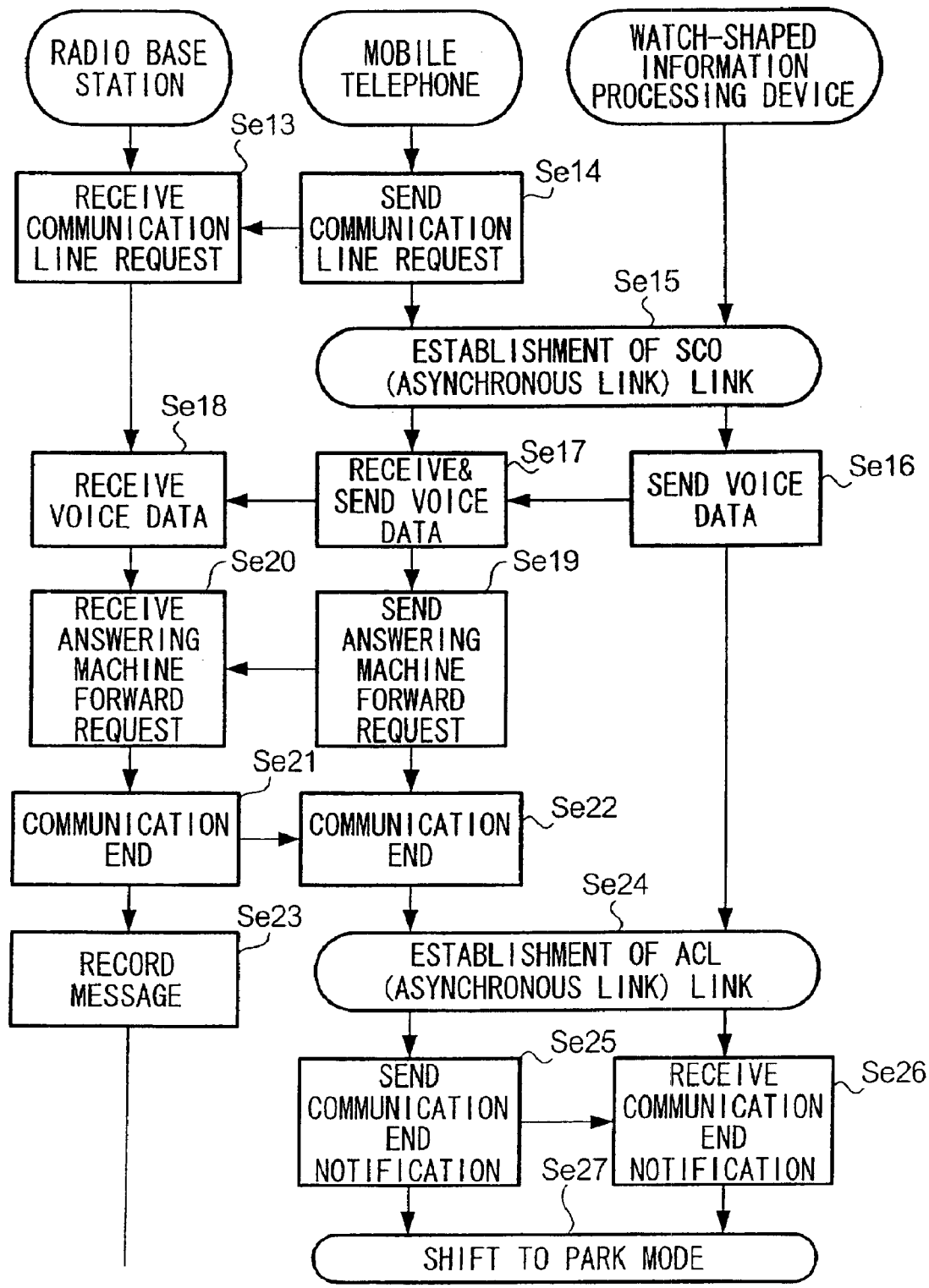

In FIGS. 25 and 26, processes from step Se1 to Se17 are the same as those of from step Sc1 to Sc17 in FIGS. 16 and 17, therefore explanation will not given for them. So explanation will start from the process of step Se18.

The data for the call response message that is sent from the mobile telephone 11A is received by the radio base station 14 (step Se18). Then the data is sent to the mobile telephone 13 via the mobile network 17. The message is output from the unshown speaker of the mobile telephone 13.

On the other hand, the mobile telephone 11A sends to the radio base station 14 an answering machine forward request for switching the current communication line between the mobile telephone 13 and the mobile telephone 11A to other communication line between the mobile telephone 13 and the service center 18 (step Se19).

When an unshown exchange in the mobile network 17 receives the answering machine forward request via the radio base station 14, it changes the current communication line between the mobile telephone 13 and the mobile telephone 11A to other communication line between the mobile telephone 13 and the service center 18 (Step Se20). Then a communication end notification is sent form the radio base station 14 to the mobile telephone 11A (step Se21). Thereby, the communication line between the mobile telephone 13 and the mobile telephone 11A is released (step Se22).

After changing communication is finished, the user of the mobile telephone 13 speaks his or her message after the tone. The message is sent to the service center 18 via the mobile network 17, and the service center 18 records the message.

When the communication line is released, the mobile telephone 11A instructs the watch-shaped information processing device 12A to shift from the link connection phase by the SCO link to the link connection phase by the ACL link. In response to the instruction for phase shift, operations of the mobile telephone 11A and the watch-shaped information processing device 12A shift to the link connection phase by the ACL link (step Se24).

After the ACL link is established, in order to notify a communication end, the mobile telephone 11A sends ACL packets that includes a communication end notification (step Se25).

When the watch-shaped information processing device 12A receives the above ACL packets (step Se26), it detects the communication end notification in the ACL packets. By detecting the communication end notification, the watch-shaped information processing device 12A judges that communication with the mobile telephone 11A has ended and shifts to the park mode which is described in step Se2 (step Se27).

Playing operation of the caller's message is as follow. The user uses the mobile telephone 11A to call to the service center 18. Then the user carries out a predetermined operation procedure to hear the caller's message.

As described above, caller's messages can be stored and played as the second embodiment.

D. Modifications of First, Second, and Third Embodiments (1) First Modification

In the first embodiment, voice message asking waiting for a moment is sent from the mobile telephone to the caller. However, there are cases when the user cannot use the mobile telephone to answer the phone such as while driving. For these cases, the following configuration may be preferable.

First, encoded data for a response message of "I cannot answer the phone at the moment, please leave a message after the tone" is stored in an unshown nonvolatile memory of the mobile telephone 11.

Then when there is an incoming call to the mobile telephone 11, an incoming call notification signal is sent to the watch-shaped information processing device 12. Then the watch-shaped information processing device 12 receives the incoming call notification signal. When a predetermined button operation is conducted on the watch-shaped information processing device 12, it sends an message recording request. It is also possible to automatically send the message recording request by so configuring the watch-shaped information processing device 12. Buttons may be used to set the watch-shaped information processing device 12. In this case, on receiving the incoming call notification signal, or after a prescribed time period has passed, the message recording request is sent.

When the mobile telephone 11 receives the message recording request, it reads from the nonvolatile memory 33 the encoded data for the response message and sends to the caller. In response to this, if the caller sends a message, the mobile telephone 11 stores the message in a storage means such as an unshown RAM or in a message recording area in a nonvolatile memory.

(2) Second Modification

In the above first, second, and third embodiment, when there is an incoming call to the mobile telephone 11 or 11A, the watch-shaped information processing device 12 or 12A sends to the mobile telephone 11 or 11A necessary information for the incoming call process. In addition to this, it is possible to modify the embodiment. In one possible modification, the mobile telephone 11 or 11A intermittently makes a communication with the watch-shaped information processing device 12 or 12A. When the mode of the mobile telephone 11 or 11A shifts, it notifies the mode to the watch-shaped information processing device 12 or 12A. Then the mode of the watch-shaped information ,processing device is shifted to the same mode.

As these modes, there are, for example, an incoming call sound generation mode for outputting sound when there is an incoming call, a vibration mode for producing vibration when there is an incoming call, a silent mode for not outputting sound when there is an incoming call, and other mode that is preferable under which both the mobile telephone and the watch-shaped information processing device are in the same mode.

For example, when the silent mode is set where the mobile telephone 11 does not output incoming signal sound and makes a communication in a predetermined interval of for example five minutes, the watch-shaped information processing device does not output an incoming call signal sound.

By this, it is possible to simplify the settings; thereby the operability is enhanced.

(3) Third Modification

In the above first, second, and third embodiment, it is possible to use the watch-shaped information processing device 12 or 12A as a remote control device of the mobile telephone 11 or 11A.

For example, by operating buttons on the external input unit 30 of the watch-shaped information processing device 12 or 12A, instructions are sent to the mobile telephone 11 or 11A, and the mobile telephone 11 or 11A is shifted to silent mode.

In this case, after mode shift is completed, data that tells setting completion is sent from the mobile telephone 11 or 11A to the watch-shaped information processing device 12 or 12A. Then information for the setting completion is displayed on the display unit 29 of the watch-shaped information processing device 12 or 12A. Hence, the user can know that there happens a setting change.

(4) Fourth Modification

In the second embodiment, caller's messages are stored in the watch-shaped information processing device 12A, and in the third embodiment, they are stored in the service center 18 on the mobile network 17.

However, caller's messages may-be stored in the mobile telephone 11A. In this case, the watch-shaped information processing device 12A does not have the nonvolatile memory 33 and the address management table AMT for recording and playing caller's messages. On the other hand, the mobile telephone 11A needs to have components for recording and playing caller's messages.

(5) Fifth Modification

Figure 27:
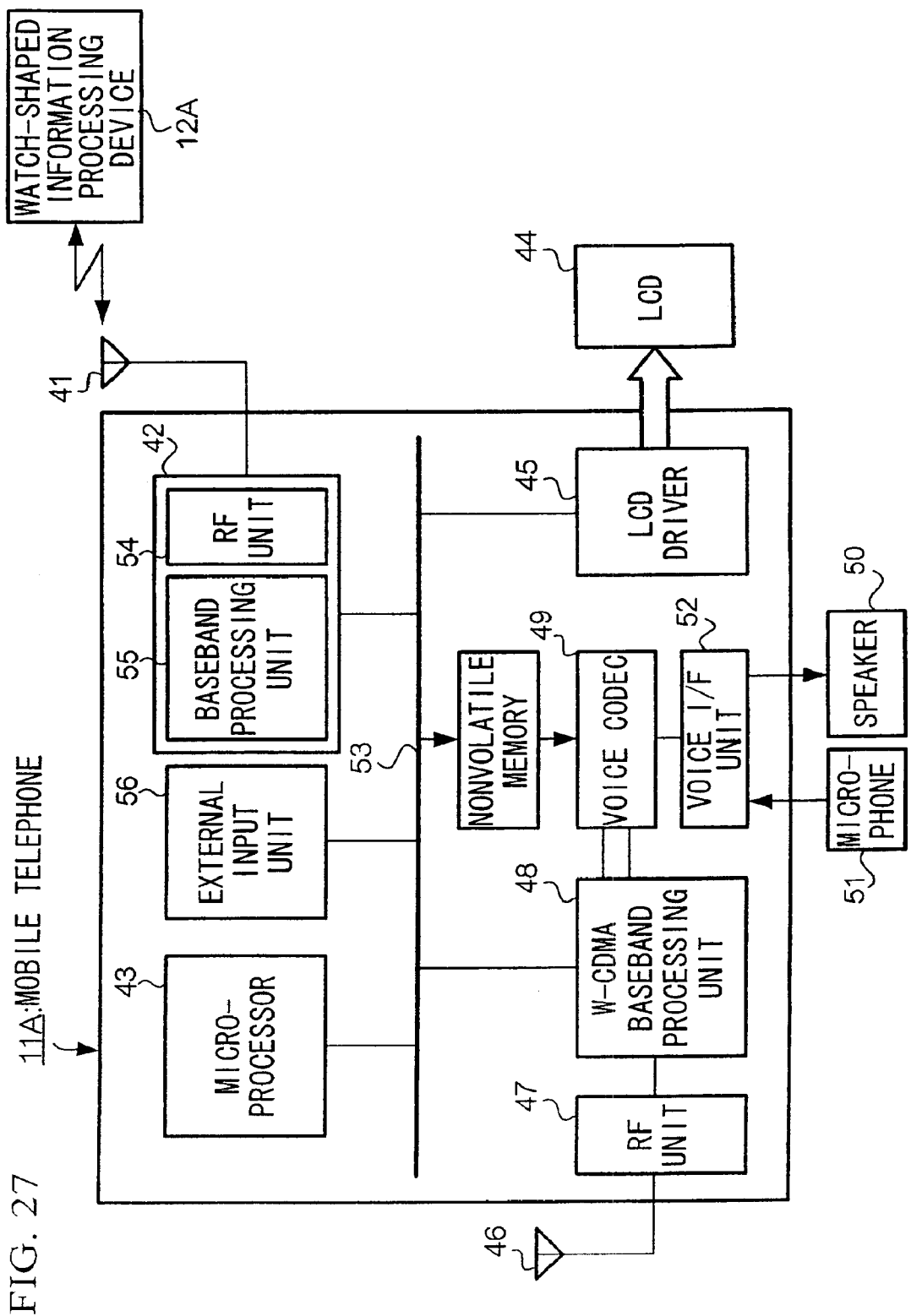
FIG. 27 shows a configuration of a modification of the mobile telephone of the first, second, and third embodiments.

It is also possible to make a mobile telephone system with the mobile telephone 11A (refer to FIG. 7) and the watch-shaped information processing device 12A both of the second embodiment (refer to FIG. 7), and make the mobile telephone system perform the operation of the first embodiment. Namely, when there is an incoming call to the mobile telephone 11A, the watch-shaped information processing device 12A sends to the mobile telephone 11A an instruction signal instead of sending voice message, the instruction makes the mobile telephone 11A send voice message. When the mobile telephone 12A receives the instruction, it makes call connection to the caller's telephone and sends to the caller's telephone voice message that asks the caller to wait for a moment. In order to achieve this, the mobile telephone 11A has a nonvolatile memory 57 as shown in FIG. 27 and stores encoded data of the voice message. When the mobile telephone 11A receives the instruction, it reads the encoded data of the voice message in the nonvolatile memory 57 and sends it to the caller.

(6) Sixth Modification

In the above explanation for the first, second, and third embodiments, when the mobile telephone 11 or 11A has e-mail function or web page viewer function, a modification may be possible as follows. When there is e-mail message or during web page auto-browsing, data for the e-mail message or the web page is sent to the watch-shaped information processing device 12 or 12A and is displayed on the display unit 29 of the watch-shaped information processing device 12 or 12A. By this modification, the user can read e-mail message or see web page without taking the mobile telephone 11 or 11A from his or her bag.

Explanation is given under an assumption that this modification is applied to the second embodiment.

First, explanation of e-mail is given.

An assumption is used here that there is a connection between the mobile telephone 11A and the watch-shaped information processing device 12A before accessing to a mail server.

First, on the display of the watch-shaped information processing device 12A, screen image on the mobile telephone 11A for connecting to the mail server is displayed. This is achieved by sending HTML data from the mobile telephone 11A.

When the user presses a button on the display by using the external input unit 30, the watch-shaped information processing device 12A sends to the mobile telephone 11A a button ID that is related to the pressed button. The mobile telephone 11A receives the button ID, and generates an event for the pressed button ID to give to a user interface. The user interface is a software installed in the mobile telephone 11A, and accepts the generated event by the operation of the input unit of the mobile telephone 11A, and carries out the instructed process by the event. The user interface receives the event and then interprets it as instruction for mail receiving. Then the user interface. carries out processes for mail receiving based on post office protocol version 3 (POP3).

The mobile telephone 11A makes the watch-shaped information processing device 12A display list of the received e-mail messages on its display. It is possible to display a list that includes all the received e-mail message, instead of displaying a list that only includes newly-received e-mail messages.

When the user selects an e-mail message using the external input unit 30, the watch-shaped information processing device 12A sends data for this selecting operation to the mobile telephone 11A via a connection link between them. When the mobile telephone 11A receives data for the selecting operation, it generates event that is equivalent to an event to the mobile telephone 11A. Thereby, it is possible to select and display an e-mail message.

Figure 28:
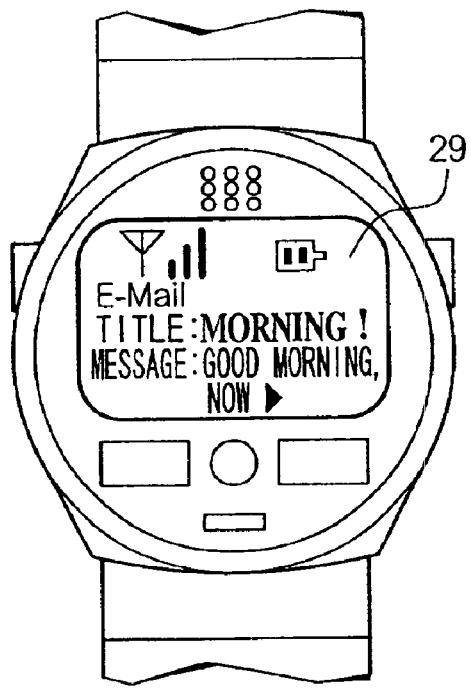
FIGS. 28 and 29 are modification of the watch-shaped information processing devices of the first, second, and third embodiment displaying information on their displays.

FIG. 28 shows a display screen after an e-mail message is selected. In FIG. 28, the user sees that an e-mail message, and title and part of the message.

Next, operation during viewing web page will be described.

An assumption is used here that there is a connection between the mobile telephone 11A and the watch-shaped information processing device 12A before accessing to a content server.

First, on the display of the watch-shaped information processing device 12A, screen image on the mobile telephone 11A for connecting to the content server is displayed. This is achieved by sending HTML data from the mobile telephone 11A.

When the user presses a button on the display by using the external input unit 30, the watch-shaped information processing device 12A sends to the mobile telephone 11A a button ID that is related to the pressed button. The mobile telephone 11A receives the button ID, and generates an event for the pressed button ID to give to a user interface.

As a result, GET messages that specify uniform resource locator (URL) are sent from the mobile telephone 11A. The get message is a message of Hyper Text Transfer Protocol (HTTP) and used to get a resource specified by the URL.

When the mobile telephone 11A receives data of the web page specified by the URL from the content server, the mobile telephone 11A sends the data to the watch-shaped information processing device 12A.

Figure 29:

The watch-shaped information processing device 12A displays screen image for the data on its display. In more detail, as shown in FIG. 29, a web page is displayed.

When the user uses the external input unit 30 to press a button on the screen, the watch-shaped information processing device 12A to the mobile telephone 11A a button ID that is related to the pressed button. The mobile telephone 11A receives the button ID, and generates an event for the pressed button ID to give to a user interface.

As a result, another GET message is sent from the mobile telephone 11A, and the same processes are carried out.

(7) Seventh Modification

In the above explanation for the first, second, and third embodiments, another modification may be possible by which the user can perform a telephone communication by using the microphone 36 and the speaker 35 of the watch-shaped information processing device 12 or 12A as follows. When there is an incoming call to the mobile telephone 11 or 11A, communication links between the caller's telephone and the mobile telephone 11 or 11A and between the mobile telephone 11 or 11A and the watch-shaped information processing device 12 or 12A are established. Using the links, the user makes telephone conversation with the caller.

The steps for achieving the above are as follows.

The mobile telephone 11 receives an incoming call from the caller, and then sends to the watch-shaped information processing device 12 an incoming call notification signal.

In response to the signal, the watch-shaped information processing device 12 notifies the user of the incoming call. The user notices the notification, and uses the external input unit 30 to respond the incoming call. The central control circuit 25 of the watch-shaped information processing device 12 sends the mobile telephone 12 an answer for the incoming call and an instruction to establish a communication link between the mobile telephone 11 and the watch-shaped information processing device 12.

As suggested by the instruction, the mobile telephone 11 forwards the answer for the incoming call to the radio base station 14. The mobile telephone 11 also makes a telephone line with the caller's telephone and a communication line with the watch-shaped information processing device 12.

By using them and the microphone 36 and the speaker 35 of the watch-shaped information processing device 12, the user can make a telephone communication with the caller.

(8) Eighth Modification

In the explanation in the first, second, and third embodiments, only bluetooth is used for a method for bidirectional communication. However, it is possible to use other method if the method enables communication in a range of several tens of meters.

(9) Ninth Modification

In the above explanation for the first, second, and third embodiments, when there is an incoming call to the telephone 11 or 11A, voice message for asking for leaving a message or for waiting for a moment is sent to the caller. However, information sent to the caller is not limited to these messages. For example, data of synthetic sound for melody, chime, or song of birds may be sent to the caller. Also, instead of sending voice, sending image or text information that asks the caller to wait for a moment or to leave a message may be possible.

(10) Tenth Modification

In the above explanation for the first, second, and third embodiments, watch-shaped information processing device is used as one example of the radio communication device. However, instead of shape of watch, ring-shaped, necklace-shaped, pendant-shaped and other wearable shape is possible.

(11) Eleventh Modification

In the above explanation for the first, second, and third embodiments, control programs for the mobile telephone and the watch-shaped information processing device are preinstalled in a ROM, a RAM, or a nonvolatile memory.

However, it is possible to carry out the present invention in the following way.

First, control programs for the mobile telephone or the watch-shaped information processing device of the above embodiments are recorded on storage media such as semiconductor memory, optical disc such as compact disc (CD), compact disc recordable (CD-R), digital versatile disk (DVD), DVD-recordable (DVD-R), DVD-Random Access Memory (DVD-RAM), magnetic optical disk such as Magneto-Optical (MO), Mini-Disk (MD), hard disk drive, or flexible disk. Then the media are distributed to users. The user who got the media installs the control program to the memory (flash ROM or RAM) of the mobile telephone or the watch-shaped information processing device by using an appropriate drive device. Then the micro processor unit (MPU) of the mobile telephone or the watch-shaped information processing device operates according to the control program installed in its memory.

Also, it is possible to distribute the control program to users of the mobile telephone or the watch-shaped information processing device through network such as the Internet, a private line (wireless or wired), public circuit (wireless or wired). The user who got the control program installs the control program to the memory (flash ROM or RAM) of the mobile telephone or the watch-shaped information processing device by using an appropriate drive device. Then the MPU of the mobile telephone or the watch-shaped information processing device operates according to the control program installed in its memory.

E. Fourth Embodiment

A system is being studied to perform various data communication between several electronic devices by connecting them through bidirectional radio links to form a wireless network. By this system, for example, image data taken by a digital camera is transmitted to a personal computer and stored in it. The image data also is transmitted to a printer from the personal computer to print. As electronic devices, portable devices are possible. Also, a radio system such as bluetooth may be used for this system. However, the bluetooth radio system enables radio communication within a range of only about ten meters (in class two of bluetooth specification). Therefore, radio communication link may be cut off depending on the location of the user of the bluetooth unit. In that case, the user has to reestablish a radio communication link, which is a troublesome operation for the user. Hence, it is very useful if the user can know the state of the radio communication link and avoid the cut-off of the radio communication link. However, there is no means for the user to know the state of the radio communication link and it is impossible to avoid cut-off of the radio communication link.

The fourth embodiment is to make it possible to notify a user of state of the bidirectional radio communication between the electronic devices.

Figure 30:
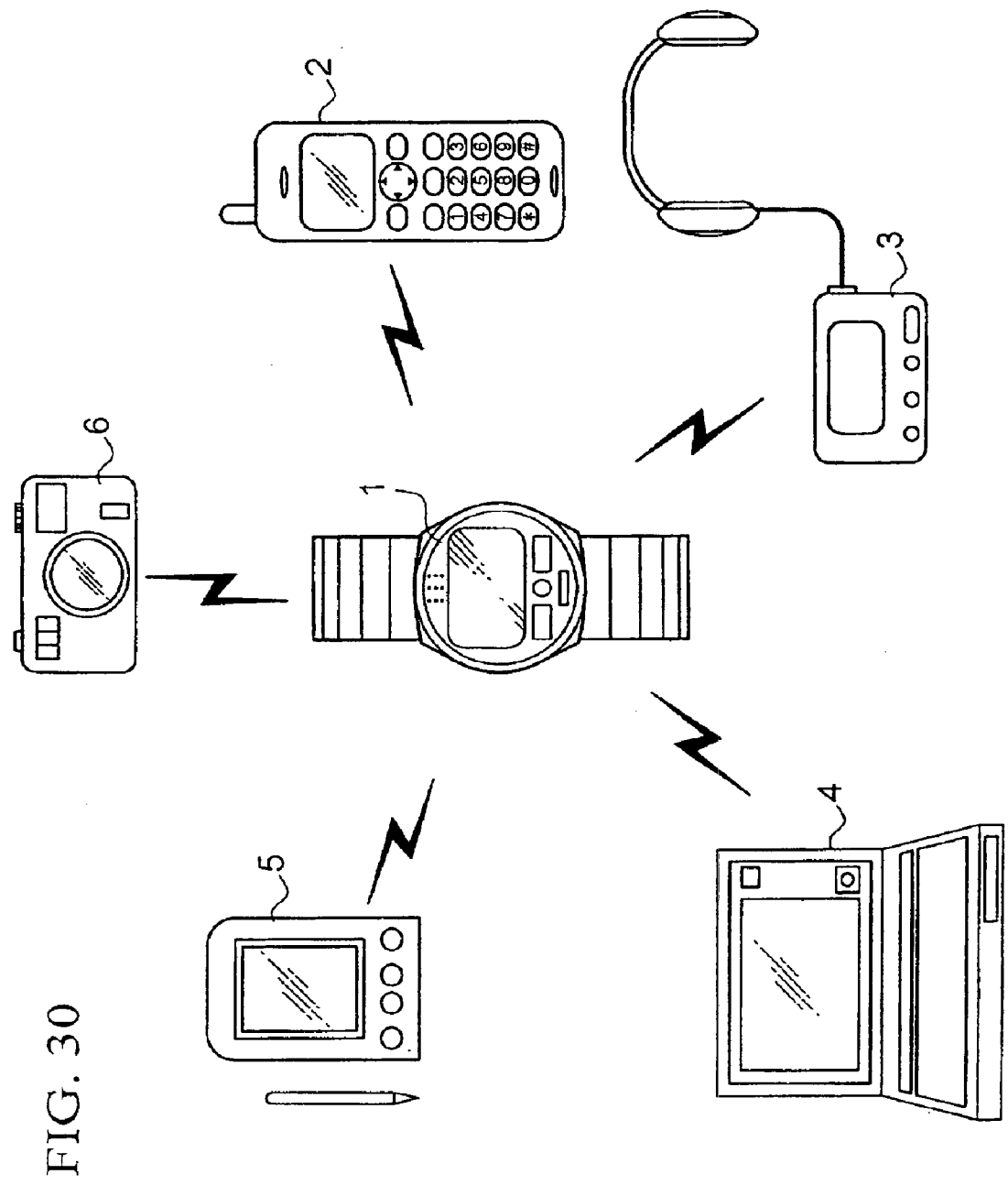
FIG. 30 shows a configuration of a radio communication system of the fourth embodiment.

FIG. 30 shows a configuration of a radio communication system of the fourth embodiment. This system as shown in FIG. 30 has a watch-shaped information processing device 1, a mobile telephone 2, an MPEG 1 audio layer 3 (MP3) player 3, a notebook computer 4, a personal digital assistants (PDA) 5, and a digital camera 6, and other portable devices.

Each of the devices 1 to 6 has a function of bidirectional radio communication that is based on the bluetooth specification within a range of about ten meters (hereinafter the function is referred to as a bluetooth communication). The devices 1 to 6 form a network called piconet, exchange various information using a frequency band of 2.45 GHz, and perform various application software.

According to the bluetooth specification, the piconet can have a master unit and up to seven slave units.

In FIG. 30, the watch-shaped information processing device 1 is a master unit and the portable device 2 to 6 are slave units. In the fourth embodiment, explanation will be given using this relation in FIG. 30. Also, in the following explanation, device with a bluetooth communication function is referred to as a bluetooth unit.

In the above system, the watch-shaped information processing device 1 has a function that can detect a state shift from communication-able to communication-disable between the watch-shaped information processing device 1 and the portable devices 2 to 6 and can notify the user of a current communication state.

Figure 31A:
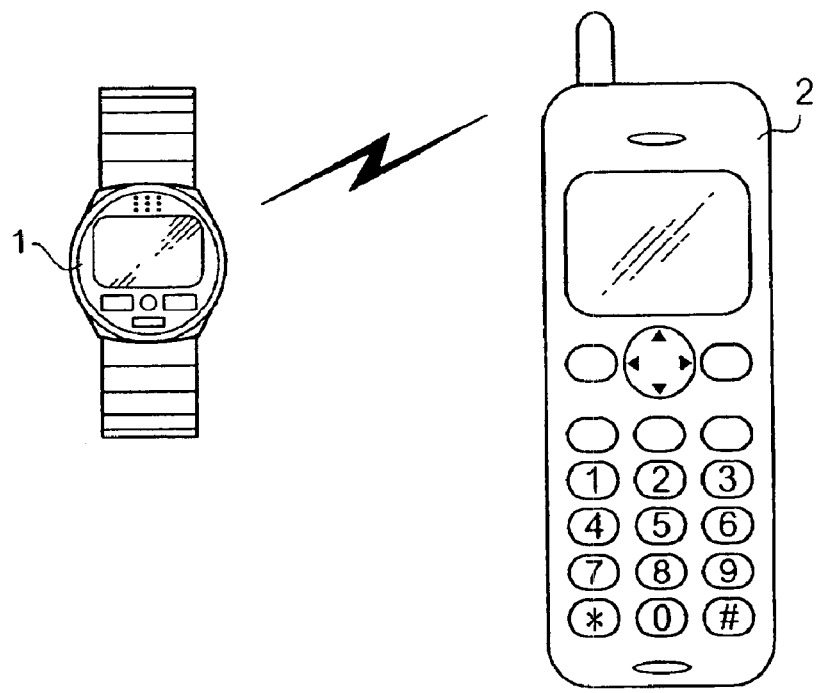
FIGS. 31A and 31B are to explain notification operation of the fourth embodiment.
Figure 31B:
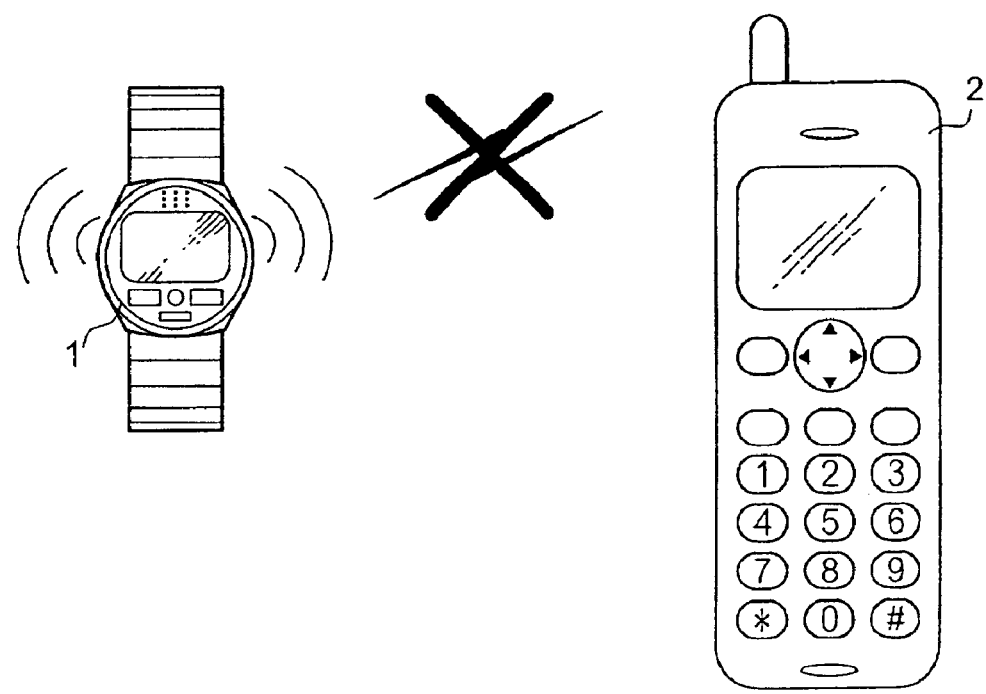

In more detail, if state of the communication between the watch-shaped information processing device 1 and the portable devices 2 to 6 change from an excellent quality shown in FIG. 31A to a bad quality shown in FIG. 31B. This quality decline can be because one of the communicating devices has gone outside of the communication area.

The watch-shaped information processing device 1 detects this state change and notifies the user the current communication state.

From here, explanation will be given in detail of a configuration for achieving this function.

Figure 32:
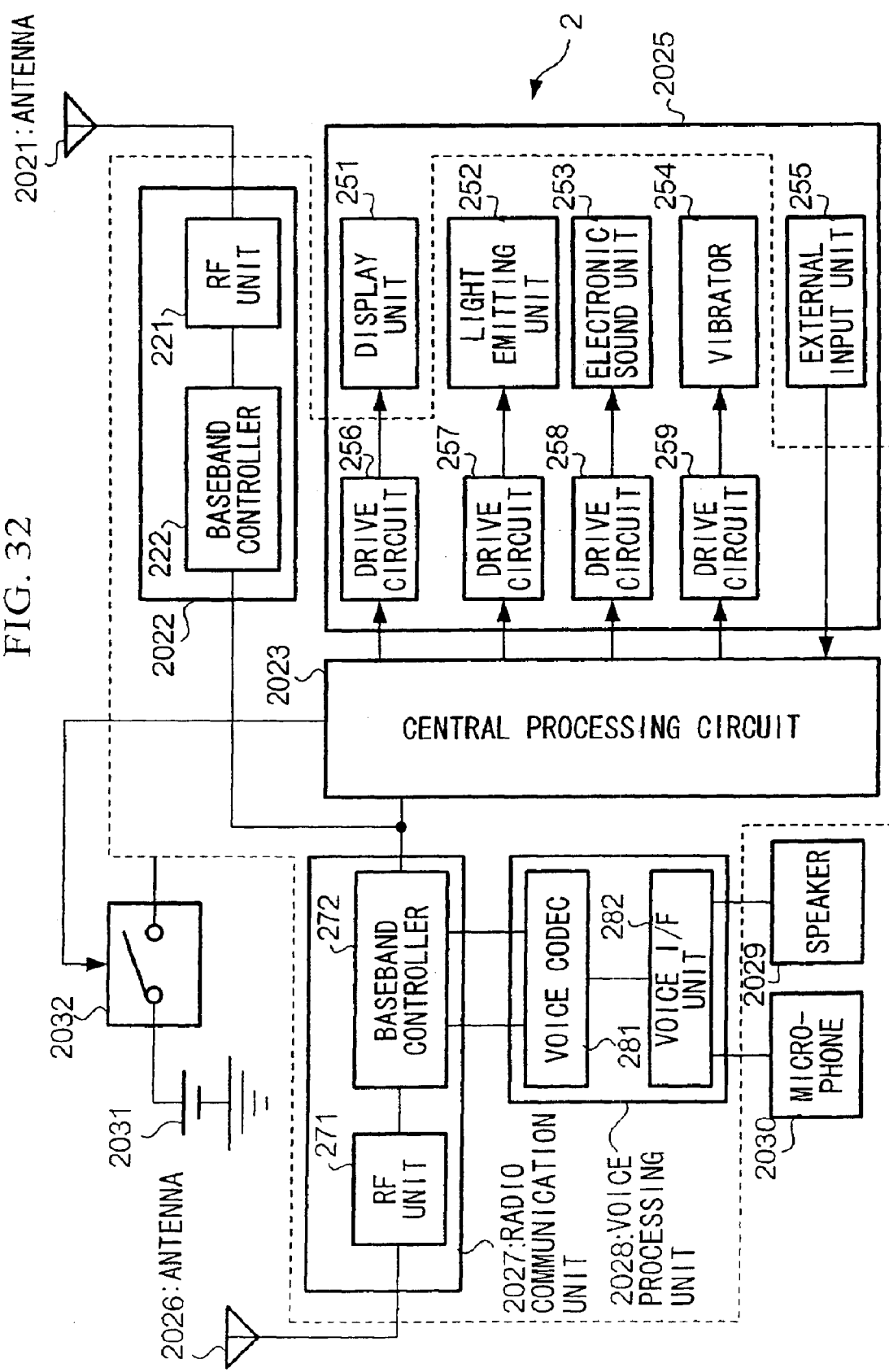
FIG. 32 shows a configuration of a mobile telephone of the fourth embodiment.

FIG. 32 shows a configuration of a mobile telephone 2. Other portable devices 2 to 6 have the same configuration as the mobile telephone 2 for bluetooth communication.

A bluetooth module 2022 of the mobile telephone 2 makes a bluetooth communication with other bluetooth units through an antenna 2021 for bluetooth.

A central control circuit 2023 controls entire units of the mobile telephone 2.

A user interface unit 2025 receives various users'operations and notifies the user of various information under a control of the central control circuit 2025.

A radio communication device 2027 performs a radio communication with an unshown radio base station of the mobile network via an antenna 2026 for telephone.

A voice processing unit 2028 carries out a predetermined processing on signals output from the radio communication device 2027 to output voice signal to a speaker 29. The voice processing unit 2028 outputs signals for voice signal input form a microphone 2030 to the radio communication device 2027.

A battery 2031 supplies power to components enclosed by a dotted line in FIG. 32.

A switching circuit 2032 switches a line connected to the battery2031 between connection and cut-off.

An RF unit 221 of the bluetooth module 2022 performs high frequency signal processing such as amplifying high frequency signal and performs bidirectional communication with other bluetooth unit.

A baseband processing unit 222 modulates/demodulates baseband signals based on bluetooth technique.

Also, the bluetooth module 2022 has a flash memory, a voltage regulator, a quartz oscillator, and other peripherals (all not shown). The configuration of this bluetooth module is already known.

The flash memory of the bluetooth module 2022 stores various necessary information for bluetooth radio communication such as a bluetooth device address, a link key, and an encryption key. The bluetooth device address is used for identifying other bluetooth devices. The link key is used for authorizing radio communication when starting it. The encryption key is used for encrypted communication.

The central control circuit 2023 is equipped with a central processing unit (CPU), a read only memory (ROM), and a random access memory (RAM) connected on a bus, all not shown in the figure. The ROM stores various control programs. The CPU reads the control programs and carries out various processing operations. The RAM is used as a work area of the CPU.

A display unit 251 of the user interface 2025 is equipped with a liquid crystal display or an organic electroluminescence display, and displays various information.

A light emitting unit 252 has an LED or other light emitting device, and emits to notify the user of states of the device.

An electronic sound unit 253 is a device that produces electronic sound or buzzer sound to notify the user of states of the device.

A vibrator 254 vibrates to notify the user of states of the device.

An external input unit 255 is equipped with various operation keys, an operation stick, a touch panel, and a jog dial, and operated by the user.

Under a control of the central control circuit 2023, a drive circuit 256 drives the display unit 251, a drive circuit 257 the light emitting unit 252, a drive circuit 258 the electronic sound unit 253, a drive circuit 259 drives the vibrator 254.

An RF unit 271 of the radio communication device 2027 performs high frequency signal processing such as amplifying high frequency signal and performs radio communication with the radio base station via the antenna 2026 for telephone. A baseband controller 272 modulates/demodulates baseband signals.

A voice codec 281 of the voice processing unit 2028 decodes the output signal of the base band controller 272 to output voice data. The voice codec 281 encodes the voice data that is output from a voice interface unit which is later described, then output it to the base band controller 272.

A voice interface unit 282 of the voice processing unit 2028 conducts digital to-analog conversion on voice data output from the voice codec 281 into analog voice signal, then the speaker 202 outputs voice. The voice interface unit 282 conducts analog-to-digital conversion on analog signal input from the microphone 2030 into voice data to output to the voice codec 281.

As a result, the user can make a telephone communication with other people by using the speaker 2029 and the microphone 2030.

Based on a switching control signal provided from the CPU 2023 and on an operation the user conducts on the external input unit 255, a switching circuit 2032 carries out switching operation between connection and cut-off of the power supply.

As described, the mobile telephone 2 has a configuration for telephone function and and for bluetooth communication used for communication with other bluetooth unit.

The portable devices 2 to 6 have these configurations in common. Namely, every portable device 2 to 6 can perform its own function and bluetooth communication.

Therefore, from the description for the mobile telephone 2, configuration of portable devices other than mobile telephone 2 is easily conceivable. So explanations for them will not be given.

Figure 33:
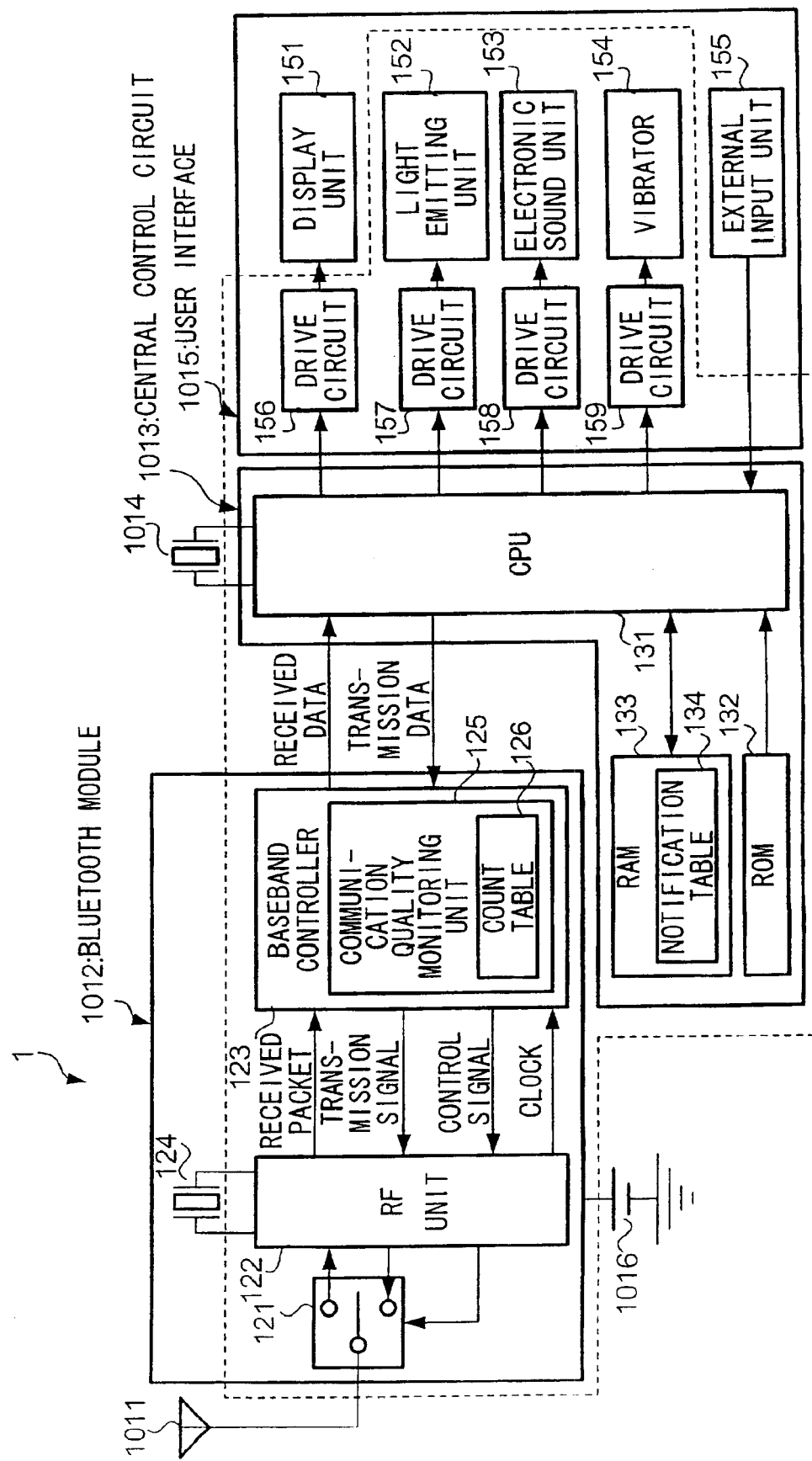
FIG. 33 shows a configuration of a watch-shaped information processing device of the fourth embodiment.

FIG. 33 shows a configuration of a watch-shaped information processing device 1.

A bluetooth module 1012 of the watch-shaped information processing device 1 carries out bluetooth radio communication with the mobile telephone 2 via an antenna 1011.

A central control circuit 1023 controls entire units of the watch-shaped information processing device 1.

A quartz oscillator 1014 generates a source oscillation signal having a reference frequency.

A user interface unit 1015 receives various users' operations and notifies the user of various information.

A battery 1016 supplies power to components enclosed by a dotted line in FIG. 33.

An RF unit 122 of the radio communication device 1012 controls a switching circuit 121 that is connected to an antenna 1011 and conducts bidirectional radio communication via the antenna 1011.

A baseband controller 123 modulates/demodulates baseband signals.

A quartz oscillator 124 generates a source oscillation signal having a reference frequency.

The bluetooth module 1012 also has unshown flash memory and a voltage regulator and other components.

A communication quality monitoring unit 125 of the base band controller 123 monitors quality of bluetooth communication.

The communication quality monitoring unit 125 has a count table 126 and monitors communication quality of the bluetooth communication with the portable device 2 to 6. Based on this monitoring, the communication quality monitoring unit 125 increases count number of the count table 126 depending on a degree of quality degradation of bluetooth communication. When quality of bluetooth communication recovers, the count number of the count table 126 is cleared.

An unshown flash memory stores various necessary information such as a bluetooth device address, a link key, and an encryption key as with the case of the flash memory of the mobile telephone 2.

In a ROM 132 of the central control circuit 1013, various control programs are stored.

A CPU 131 reads the control programs from the ROM 132 and carries out various control processing.

A RAM 133 is used as a work area of the CPU 131 and stores a notification table 134 for managing information, the information being to decide what kind of notification is made to the user depending on the communication state with other bluetooth unit.

A display unit 151 of the user interface 1025 is equipped with a liquid crystal display or an organic electroluminescence display, and displays various information.

A light emitting unit 152 has an LED or other light emitting device, and emits light to notify the user of states of the device.

An electronic sound unit 153 is a device that produces electronic sound or buzzer sound to notify the user of states of the device.

A vibrator 154 vibrates to notify the user of states of the device.

An external input unit 155 is equipped with various operation keys, an operation stick, a touch panel, and a jog dial, and operated by the user.

Under a control of the central control circuit 1013, a drive circuit 156 drives the display unit 151, a drive circuit 157 the light emitting unit 152, a drive circuit 158 the electronic sound unit 153, a drive circuit 159 drives the vibrator 154.

Next, quality monitoring method for bluetooth communication of the fourth embodiment will be described.

Master unit and slave units form a piconet through a synchronization establishment phase and a link connection phase, both phases are defined in the bluetooth specification. Then, depending on the circumstance, operational modes of the master unit and the slave unit shift to a low power consumption mode called a sniff mode. During the mode shifting, several processes are conducted in a master unit and a slave unit using a bluetooth device address and a link key.

While shifting to the sniff mode, the master unit tells to the slave unit a cycle of inquiry signal transmission (referred to as inquiry signal cycle from here). After shifting to the sniff mode, the master sends to the slave unit the inquiry signal based on the inquiry signal cycle.

When the slave unit receives the inquiry signal, it sends to the master unit an inquiry reply signal in response to the inquiry signal.

Figure 34:
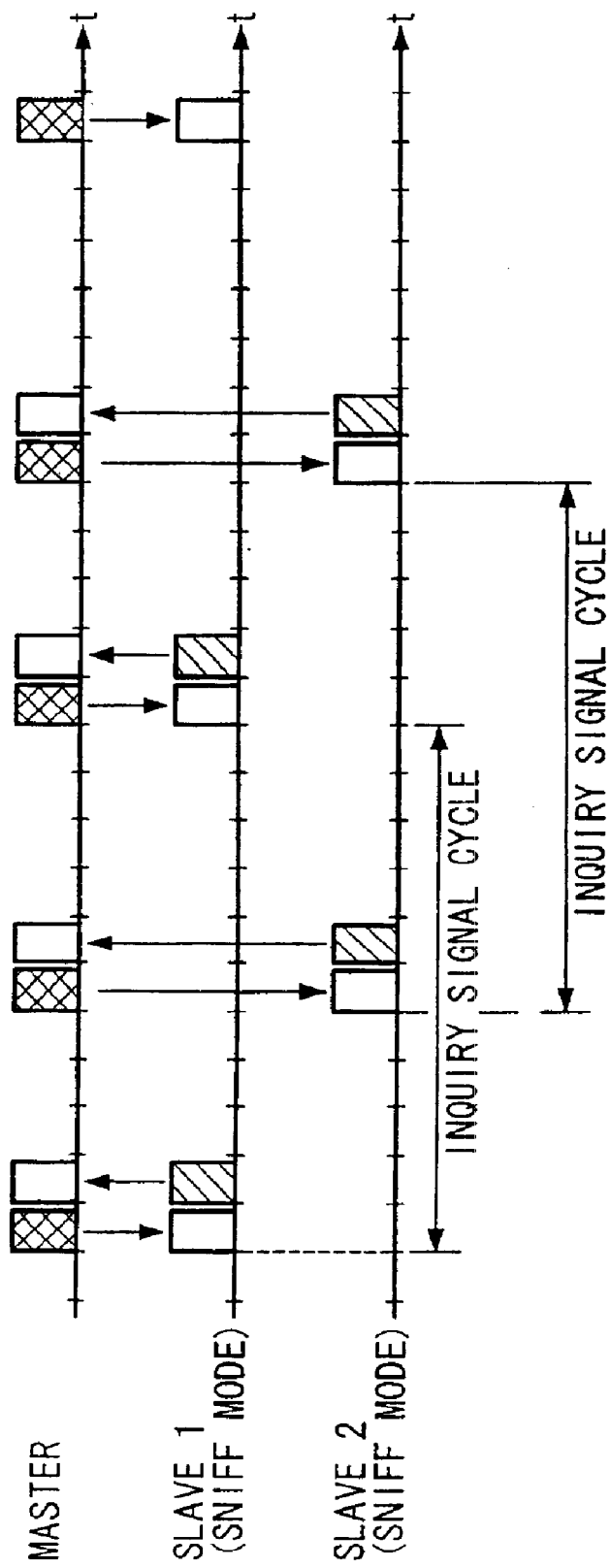
FIG. 34 is a timing chart of transmitting inquiry signals and responding them in a sniff mode of the bluetooth communication.

FIG. 34 is a timing chart showing the above signal exchanging of inquiry signal and the inquiry reply signal. In FIG. 34, the master unit specifies a slave unit and sends the inquiry signal (in the figure, the signal is crosshatched) to it at each inquiry signal cycle. Each slave unit receives the inquiry signal at each time slot.

In response to the inquiry signal, the slave units 1 and 2 send an inquiry response signal (in the figure, signal is hatched) to the master unit. The inquiry signal and the inquiry response signal have bluetooth device addresses of the transmission side and the receiving side.

As described above, in the sniff mode, the master unit and the slave unit exchange the inquiry signal and the inquiry response signal. By this, the master unit sends various instructions to the slave unit, and the slave unit sends various requests to the master unit. The slave unit also carries out synchronization correction.

Communication quality monitoring method of the fourth embodiment is based on the above explained technology, and will be described in detail below.

Figures 35, 37:
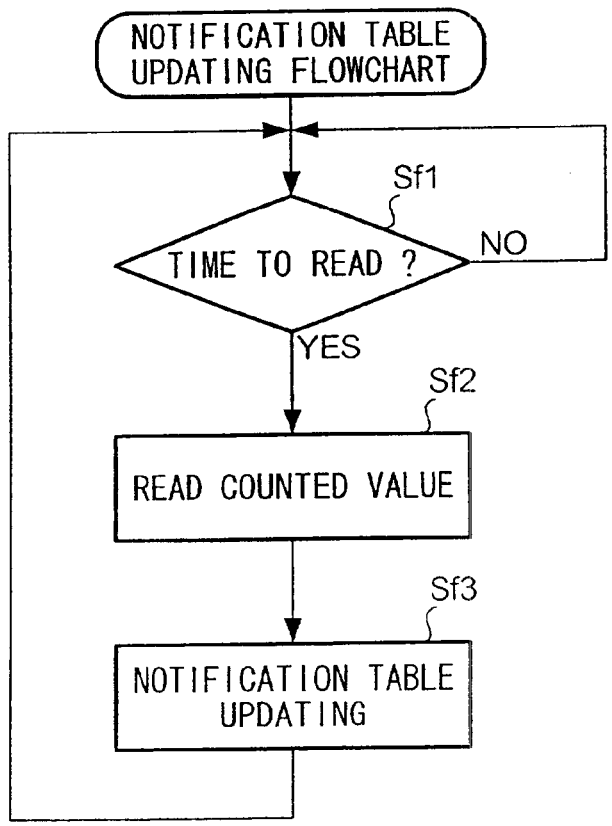
FIG. 35 is a count table of the fourth embodiment.
FIG. 37 is a flowchart for process of updating the notification table of the fourth embodiment.

As shown in a format chart of FIG. 35, the count table 126 stores a list that tells the number of failures of receiving the inquiry response signal from the portable devices 2 to 6. In the list, the number of failures and the bluetooth device addresses of the portable devices 2 to 6 are associated. When the communication quality monitoring unit 125 of the watch-shaped information processing device 1 does not receives any inquiry response signal from a slave unit in a slot defined by the inquiry signal cycle, the watch-shaped information processing device 1 judges that it fails to receive an inquiry response signal from the slave unit. Then the watch-shaped information processing device 1 adds one to the number of failures of receiving the inquiry response signal of the slave unit.

This addition of one is for counting the number of successively failures of receiving the inquiry response signal. Therefore, even one success of receiving the inquiry response signal from the slave unit clears the counted number of failures for the slave unit.

Next, the notification table 134 stored in the RAM 133 of the watch-shaped information processing device 1 will be described.

FIG. 36 is a format chart that shows one example of the notification table 134. As shown in FIG. 36, the notification table 134 stores various information of the portable device 2 to 6 by using the bluetooth device addresses of them.

As various information, there are for example device name, communication quality flag, power off flag, notification requirement flag, notification device for caution, and notification device for NG.

The content of these information will be described in detail.

The device name is a name of the portable device 2 to 6 input by the user. When notifying the communication state, these device names are used. In more detail, these device names are displayed o the display unit 151.

The communication quality flag is a flag that shows the state of the communication with the portable device 2 to 6. These states of communication is judged based on bluetooth communication quality with the portable devices 2 to 6. In the fourth embodiment, three communication qualities are used, an "OK" that tells communication quality is fine, a "caution" that tells communication quality is declining, and an "NG" that tells communication is impossible.

"OK", "caution", and "NG" of the communication quality is judged based on the number of failures of receiving the inquiry response signal stored in the count table 126. In the fourth embodiment, when the number of the failures of receiving the inquiry response signal is 0 to 2, the communication quality is judged to be "OK". When the number of the failures of receiving the inquiry response signal is 3 to 4, the communication quality is judged to be "caution". When the number of the failures of receiving the inquiry response signal is more than 4, the communication quality is judged to be "NG".

In the notification table 134 in FIG. 36, "1" means flag ON and "0" means flag OFF.

The power off flag becomes ON when the user shuts off the power of the portable devices 2 to 6.

After any portable device 2 to 6 is shut off, it cannot send back to the watch-shaped information processing device 1 an inquiry response signal. Also the watch-shaped information processing device 1 cannot receive any inquiry response signal from the portable devices 2 to 6, so it makes a judgement that the quality of bluetooth communication has declined or bluetooth communication becomes impossible and notifies the user of communication state.

However, because the user him/herself shuts off the power, notifying the user of the power off the portable device and of the state of the communication of the portable device that is power off is not considered to be necessary. Therefore, the watch-shaped information processing device 1 sets power off flag on the portable device that is powered off. When quality of the bluetooth communication with the powered off portable device has declined or the bluetooth communication becomes impossible, the watch-shaped information processing device 1 does not notify the user.

The power off flag is turned on in response to a power off signal sent from the portable devices 2 to 6 when they are turned off.

The notification requirement flag is a flag that is set on/off depending on requirement of notification of communication state when bluetooth communication quality has declined or bluetooth communication becomes impossible. That is, if notification is conducted every time when the communication quality has declined or the communication becomes impossible, there will be lots of notification, which may be annoying to the user. The notification requirement flag is for this situation. The user sets on/off of the notification requirement flag of the portable device 2 to 6, and based on the set flag, the watch-shaped information processing device 1 carries out notification.

The notification device for caution and notification device for NG tell what unit should be used when judged to be "caution" or "NG", the display unit 151, the light emitting unit 152, the electronic sound unit 153, or the vibrator 154. That is, notification is conducted by using the unit whose flag is set ON.

The settings of the notification device for caution and notification device for NG may be made by the user or may be preset before shipment.

In FIG. 36, a notebook personal computer 4 with a bluetooth device address "ad0001" has a state "OK" for bluetooth communication with the watch-shaped information processing device 1 and therefore is considered to be making a fine bluetooth communication.

The power off flag for the notebook personal computer 4 is set off. Therefore the personal computer is powered on at the moment.

Also the notification requirement flag is set on, which tells that notification have to be carried out when the communication quality has declined or the communication becomes impossible. In this case, when the communication quality is judged to be "caution", notification is made by using the display unit 151 and the vibrator 154, and when the communication quality is judged to be "NG", notification is made by using all the display unit 151, the light emitting unit 152, the electronic sound unit 153, and the vibrator 154.

Next, operations of the fourth embodiment will be described. Hereinafter, explanation will be given in an order from (1) Updating process of the notification table 134 by the watch-shaped information processing device 1

(2) Operation while shutting off portable device (3) Notification process of communication state by the watch-shaped information processing device 1

(4) Operation of the system.

(1) Updating process of the Notification Table 134 by the Watch-shaped Information Processing Device 1

FIG. 37 is a flowchart that shows an updating process of the communication quality flag on the notification table 134 by the central control circuit 1013. The central control circuit 1013 conducts time keeping based on the source oscillation signal output by the quartz oscillator 1014, and makes a judgement whether a time has come for reading count table 126 in the communication quality monitoring unit 125 (step Sf1).

When it is time for reading (step Sf1 Yes), the central control circuit 1013 sees the count table 126 and reads all the counted value stored in the count table 126 (step Sf2).

Then the central control circuit 1013 makes a judgement on communication quality based on the readout counted value and aforementioned judgement conditions. Based on the judgement, the central control circuit 1013 sets the communication quality flag on the notification table 134 (step Sf3). In FIG. 35, the number of failures of receiving the inquiry response signal for the bluetooth device address "ad*0003*" is 5, so the communication quality is judged to be "NG" . Therefore, the communication quality flag for the bluetooth device address "ad0003" on the notification table 134 in FIG. 36 is set "NG".

These steps Sf1 to Sf3 are repeated to keep the communication quality flag updated.

(2) Operation While Shutting off Portable Device.

Figure 38:
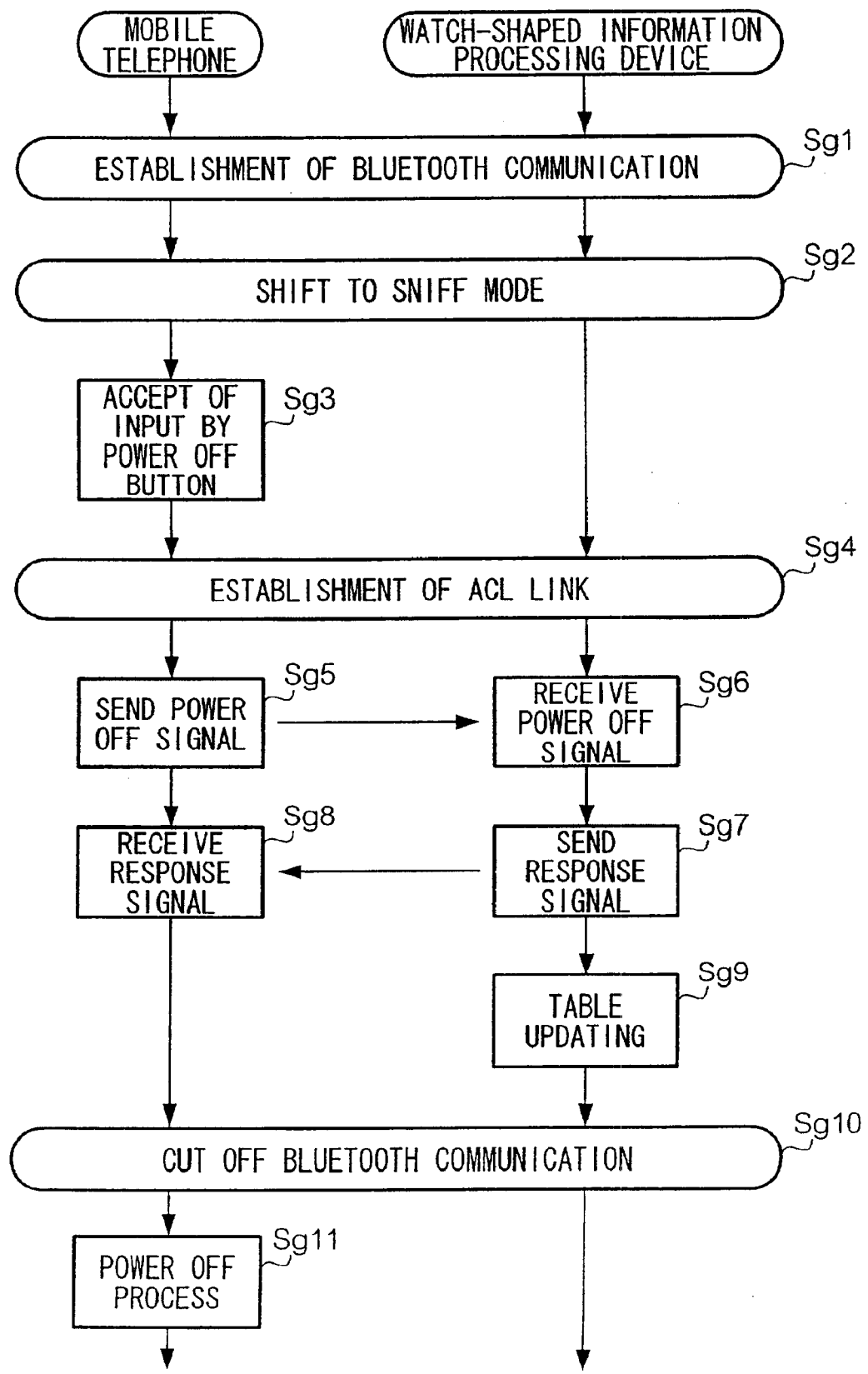
FIG. 38 is a sequence chart showing operations for shutting off a bluetooth device.

With reference to the sequence chart in FIG. 38, operation while shutting off the mobile devices 2 to 6 will be described.

The watch-shaped information processing device 1 and the mobile telephone 2 form a piconet via synchronization establishment phase and link connection phase defined by the bluetooth technique (step Sg1). Then the watch-shaped information processing device 1 shifts to the sniff mode (step Sg2).

During this sniff mode, for example, when the user of the mobile telephone 2 shuts off the mobile telephone 2 by using the external input unit 255. The central control circuit 2023 accepts this operation (step Sg3).

The central control circuit 2023 of the mobile telephone 2 sends request in a inquiry response signal. The request is for shifting from the sniff mode to the link connection phase by the ACL link. In response to the request for shifting, connection between the mobile telephone 2 and the watch-shaped information processing device 1 shifts to a link connection phase by the ACL link (step Sg4). Here, the ACL link is an asynchronous packet switched communication link by the bluetooth technique.

When the ACL link is established, the mobile telephone 2 sends a power off signal that tells there is a shutting off operation as an ACL packets (step Sg5). The ACL packets has bluetooth device address "ad0003" of the mobile telephone 2.

The watch-shaped information processing device 1 receives the ACL packets, and detects that there is a shutting off operation on the mobile telephone 2 (step Sg6). Then the watch-shaped information processing device 1 sends ACL packets that has a response signal (step Sg7).

The mobile telephone 2 receives the ACL packets (step Sg8), and confirms that notification of shutting off is made to the watch-shaped information processing device 1.

The watch-shaped information processing device 1 extracts the bluetooth device address "ad0003" from the received ACL packets. Then the watch-shaped information processing device 1 sets the power off flag for the bluetooth device address "ad0003" ON in the notification table 134 shown in FIG. 36 (step Sg9).

Then the communication link between the mobile telephone 2 and the watch-shaped information processing device 1 is cut off (step Sg10).

The central control circuit 2023 of the mobile telephone 2 sends a switching control signal to the switching circuit 2032 to shut off the power (step Sg11).

(3) Notification Process of Communication State by the Watch-shaped Information Processing Device 1.

Figure 39:
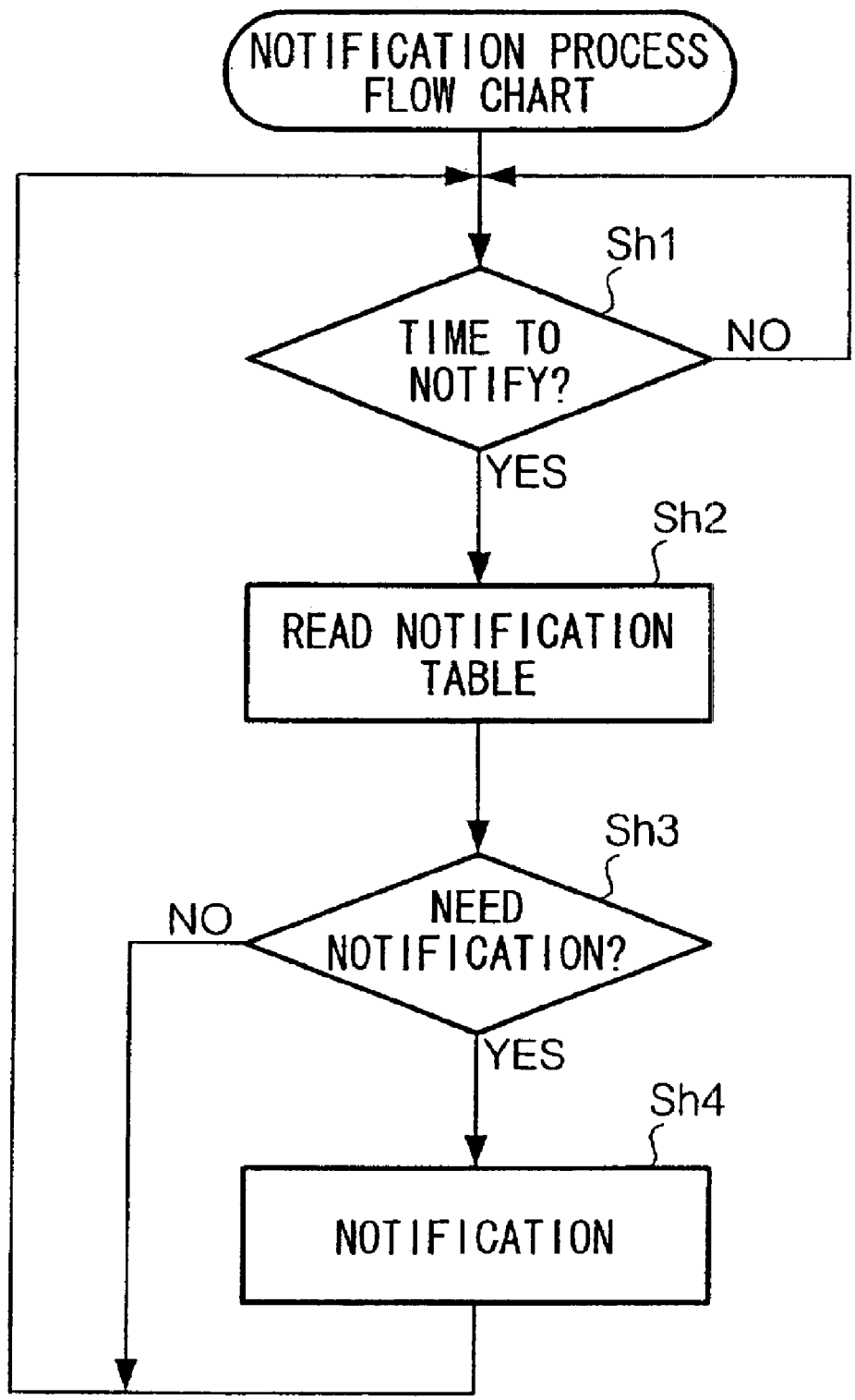
FIG. 39 is a flowchart showing a notification process of the fourth embodiment.

FIG. 39 is a flowchart showing operations when the central control circuit 1013 of the watch-shaped information processing device 1 carries out notification of the communication state.

In FIG. 39, the central control circuit 1013 counts time based on the source oscillation signal output by the quartz oscillator 1014, and makes a judgement if it is time to read the notification table 134 in the RAM 133 (step Sh1).

When it is time for reading (step Sh1 Yes), the central control circuit 1013 sees the notification table 134 in the RAM 133 (step Sh2).

The central control circuit 1013 makes a judgement whether or not to carry out notification based on the communication quality flag stored on the notification table 134 (step Sh3). For example, when the central control circuit 1013 sees the notification table 134 shown in FIG. 36, it makes a judgement that it needs to conduct a notification operation for the mobile telephone 2 because the communication quality flag is set ON to the "NG" part (step Sh3 Yes).

Then the central control circuit 1013 sees the notification device for NG on the notification table 134 and carries out a notification operation (step Sh4). As shown in the notification table 134 in FIG. 36, the central control circuit 1013 controls all the drive circuits 156 to 159 to use all the display unit 151, the light emitting unit 152, the electronic sound unit 153, and the vibrator 154 to conduct notification. When, at step Sh3, judgement is made that "caution" notification is necessary, the central control circuit 1013 uses notification device defined as notification device for caution in the notification table 134.

This notification is repeated until a prescribed time period has passed or the user operates to stop it. When the prescribed time period has passed or the user operates to stop it, the process in FIG. 39 returns to step Sh1.

When a judgement is made that there is no need of notification (step Sh3 No), the process in FIG. 39 returns to step Sh1.

(4) Operation of the System

Figure 40:
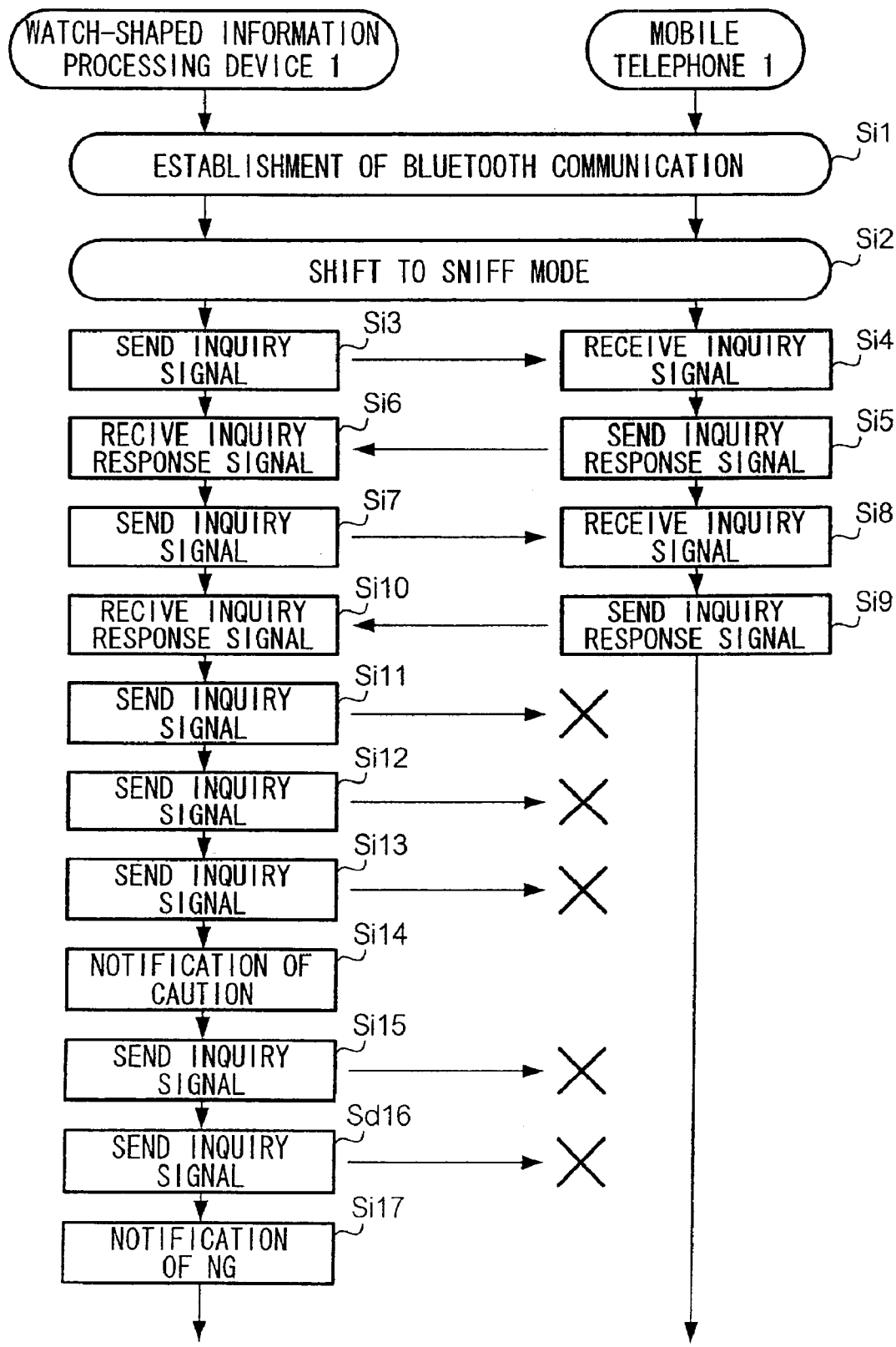
FIG. 40 is a sequence chart of the system of the fourth embodiment.

Referring to the sequence chart in FIG. 40 and using the watch-shaped information processing device 1 and the mobile telephone 2 as examples, operation of the system will be described. In FIG. 40, the watch-shaped information processing device 1 and the mobile telephone 2 form a piconet via synchronization establishment phase and link connection phase (step Si1). Then the watch-shaped information processing device 1 shifts to the sniff mode (step Si2).

During this sniff mode, when the inquiry signal cycle has come, the master unit that is the watch-shaped information processing device 1 sends an inquiry signal to the slave unit that is the mobile telephone 2 (step Si3). The mobile telephone 2 receives the inquiry signal (step Si4).

The mobile telephone 2 sends an inquiry response signal to the watch-shaped information processing device 1 (step Si5). The watch-shaped information processing device 1 receives the inquiry response signal (step Si6).

Figure 41:
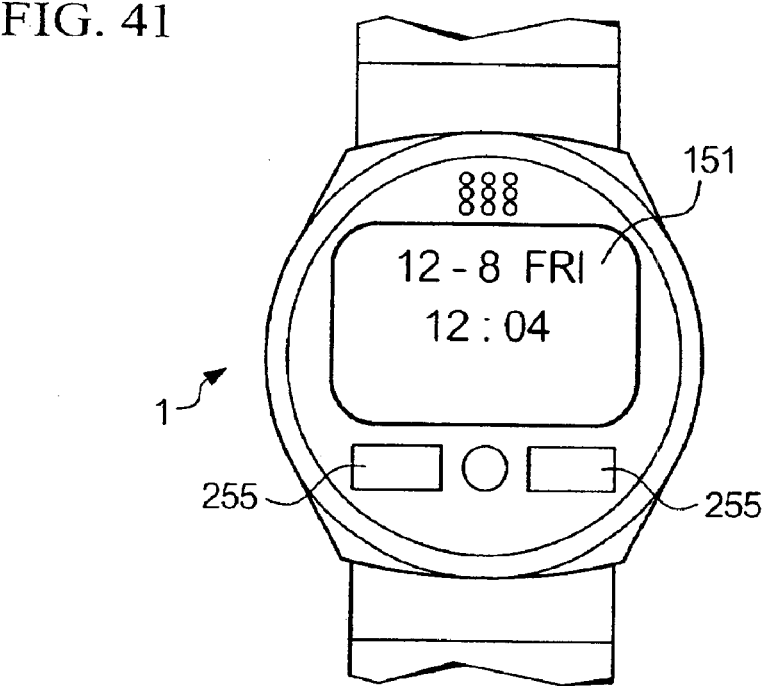
FIGS. 41, 42, and 43 are the watch-shaped information processing devices of the fourth embodiment displaying information.

Similar processing as steps Si3 to Si6 are carried out in each inquiry signal cycle (steps Si7 to Si10). During this steps, as shown in FIG. 41, date, month, day of the week, and a current time are displayed on the display unit 151 of the watch-shaped information processing device 1.

Here, explanation is given assuming that the user of the watch-shaped information processing device 1 moves and the watch-shaped information processing device 1 is located outside communication area of the mobile telephone 2.

In this case, when the watch-shaped information processing device 1 sends an inquiry signal to the mobile telephone 2 (step Si11), the mobile telephone 2 cannot receive the inquiry signal. As a result, the mobile telephone s cannot sends an inquiry response signal to the watch-shaped information processing device 1. Therefore, on the count table 126 of the watch-shaped information processing device 1, each time when inquiry signal cycle comes, the number of failures of receiving the inquiry response signal for the mobile telephone 2 is increased by one.

When this happens three times (steps Si11 to Si13), counted value for the number of failures of receiving the inquiry response signal for the mobile telephone 2 becomes three.

Also as described above, the watch-shaped information processing device 1 repeats notification table updating process shown in FIG. 37. Therefore, when the watch-shaped information processing device 1 detects that the number of failures of receiving the inquiry response signal on the count table 126, it sets the flag of caution of communication quality of the mobile telephone 2 to ON.

The watch-shaped information processing device 1 at the same time carries out a notification processes shown in a flow chart in FIG. 39. When the watch-shaped information processing device 1 detects that the communication quality flag for "caution" on the notification table 134 is set ON, the watch-shaped information processing device 1 makes a judgement that notification is necessary. Then the watch-shaped information processing device 1 conducts a notification using notification device for caution defined in the notification table 134 (step Si14). In more detail, as shown in the notification table 134, the watch-shaped information processing device 1 uses the display unit 151 and the light emitting unit 152 as devices for caution.

Figure 42:
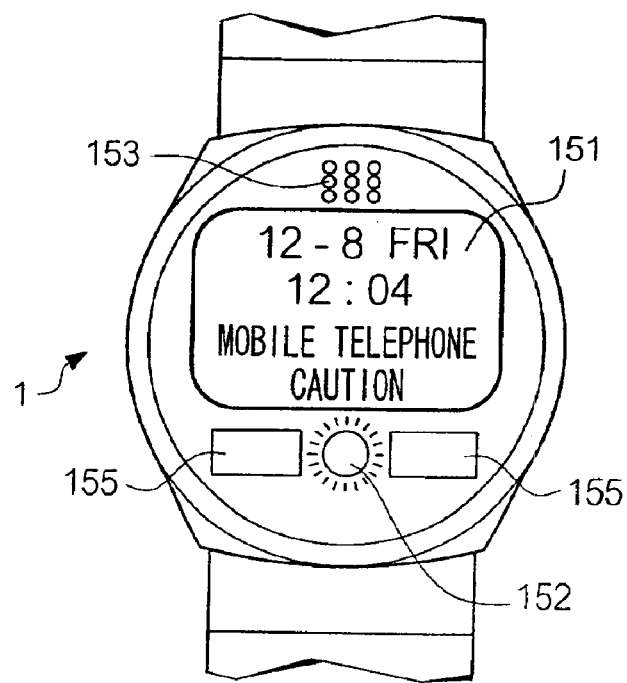

During this notification, date, month, the day of the week, a current time, and a message "mobile phone CAUTION" are displayed on the display unit 151 of the watch-shaped information processing device 1 as shown in FIG. 42. At the same time, the light emitting unit 152 makes a notification by such as blinking.

When the watch-shaped information processing device 1 fails to receive two inquiry response signals in a row from the mobile telephone 2 (step Si15 to Si16), the counted value of the number of failures of receiving the inquiry response signal becomes 5.

By this, the watch-shaped information processing device 1 detects that the counted value of the number of failures of receiving the inquiry response signal on the count table 126 becomes 5. Therefore, the watch-shaped information processing device 1 sets the "NG" part of the communication quality of the mobile telephone 2 to ON on the notification table 134.

When the watch-shaped information processing device 1 detects that the "NG" part of the communication quality of the mobile telephone 2 is set ON, the watch-shaped information processing device 1 judges that the notification is necessary.

Then the watch-shaped information processing device 1 conducts a notification using notification device for NG defined in the notification table 134 (step Si17).

Figure 43:
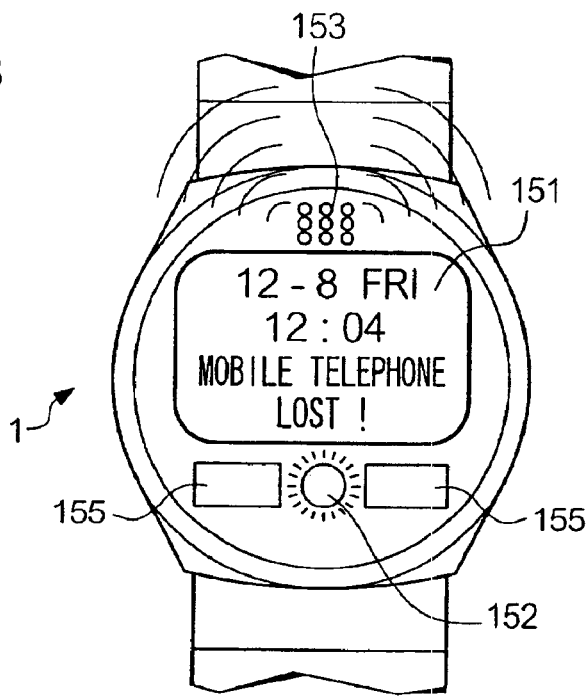

In more detail, as shown in the notification table 134, the watch-shaped information processing device 1 uses all the display unit 151, the light emitting unit 152, the electronic sound unit 153, and the vibrator 154 as devices for NG. During this notification, date, month, the day of the week, a current time, and a message "mobile phone LOST" are displayed on the display unit 151 of the watch-shaped information processing device 1 as shown in FIG. 43. At the same time, the light emitting unit 152 makes a notification by such as blinking, the electronic sound unit 153 outputs prescribed buzzer sound or electronic sound, and the vibrator 154 repeats vibrations.

These notification operations are repeated until a prescribed time period has passed or the user operates to stop the notification.

As described above, according to the fourth embodiment, the watch-shaped information processing device 1 makes a judgement for quality of bluetooth communication with the portable devices 2 to 6. When the quality has declined or the communication becomes. impossible, the watch-shaped information processing device 1 makes a notification to the user. Therefore, the user can easily know when the communication link seems to be cut off or when the communication link with the portable devices 2 to 6 are actually cut off.

Therefore, when communication link seems to be cut off, the user can move to other place or moves the portable device to other place to keep a fine bluetooth communication.

Also the watch-shaped information processing device 1 makes a judgement on communication quality for each portable device 2 to 6, and conducts a notification operation. Therefore, the user can know the state of communication quality for each portable device 2 to 6.

The fourth embodiment may also be applied to a lost property notification system for the portable devices 2 to 6.

Recently, portable devices have become compact and are likely to be left in a house or an office when leaving there. When the fourth embodiment is applied to as a lost property system and the user of the watch-shaped information processing device 1 moves from the portable device 2 to 6 at a certain distance, a notification operation is carried out depending on the decline of the communication quality. Hence, the user can notice he or she leaves the portable devices 2 to 6.

F. Modifications of the Fourth Embodiment (1) Allocating Master and Slave

In the fourth embodiment, in order to simplify the explanation, the watch-shaped information processing device 1 works as a master and other mobile devices 2 to 6 work as slaves in the piconet. However, it is possible to freely allocate master and slave function to any of the devices.

Figure 44:
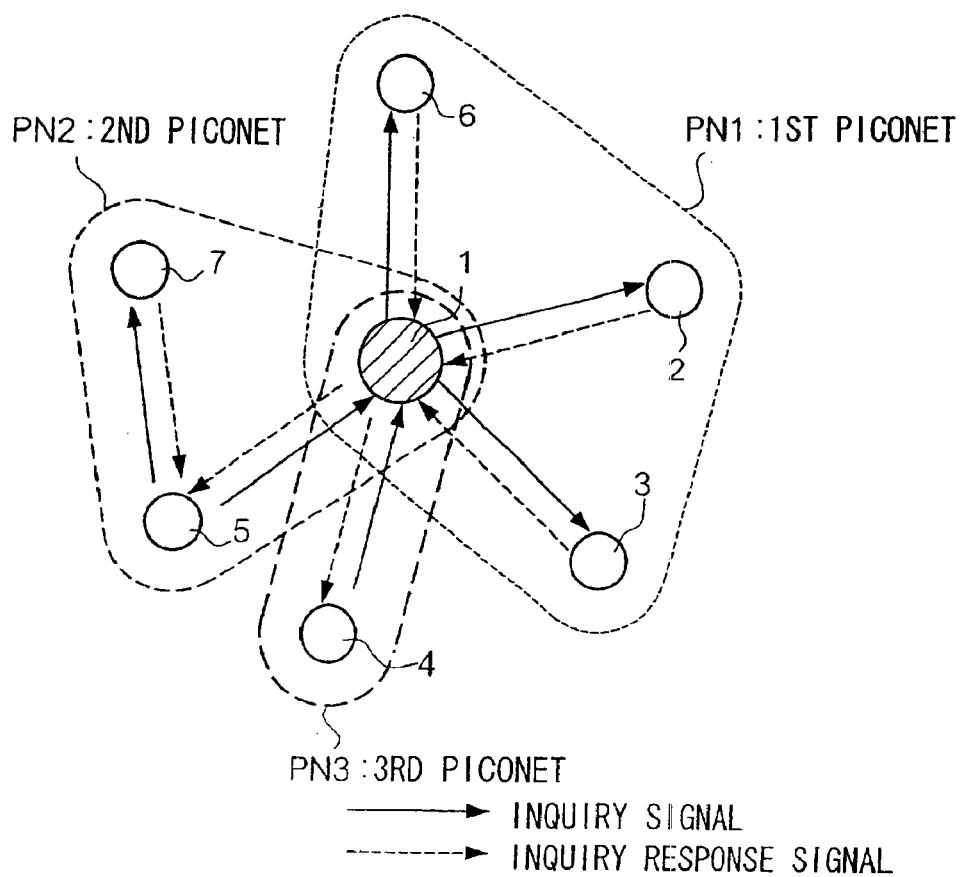
FIG. 44 shows piconets of the fourth embodiment.

FIG. 44 shows piconets of the portable devices 1 to 6. In FIG. 44, the watch shaped information processing device 1 is a master unit and a mobile telephone 2, an MP 3 player 3, and a digital camera 6 are slave units, and they form a piconet PN1. A PDA 5 is a master unit and the watch-shaped information processing device 1 and another bluetooth unit 7 are slave units, and they form a piconet PN2. A notebook personal computer 4 is a master unit and the- watch-shaped information processing device 1 is a slave unit, and they form a piconet PN3.

According to the bluetooth specification, one bluetooth unit can become a master unit in one piconet and can at the same time become a slave unit in another piconet. In FIG. 44, the watch-shaped information processing device 1 is a master unit in the piconet PN1 and a slave unit in the piconets PN2 and PN3.

In FIG. 44, arrows in solid lines tell directions of transmission of inquiry signals and arrows in dotted lines tell directions of transmission of inquiry response signals. For example, the watch-shaped information processing device 1 receives inquiry signal from the notebook personal computer 4 and a PDA5 and inquiry response signal from the mobile telephone 2, the MP 3 player 3, and the digital camera 6. Each inquiry signal cycle for the inquiry signal and the inquiry response signal is determined in each link between the watch-shaped information processing device 1 and each of the portable devices 2 to 6. Therefore, as described above, the number of failures of receiving the inquiry signal or the inquiry response signal can be counted. In this case, in the count table 126 shown in FIG. 35, counted values of the number of failures of receiving the inquiry signal or the inquiry response signal are stored.

(2) Judging Criteria for Communication Quality

In the fourth embodiment, when the, when the number of the failures of receiving the inquiry response signal is 0 to 2, the communication quality is judged to be "OK". When the number of the failures of receiving the inquiry response signal is 3 to 4, the communication quality is judged to be "caution". When the number of the failures of receiving the inquiry response signal is more than 4, the communication quality is judged to be "NG".

However, these judging criteria are not limited to the above, and designers or users of the devices may decide them.

Also, judging criteria for communication quality may be based on strength of received signal instead of the number of failures of receiving the signals.

(3) Conflict of Notification Target

In the explanation given using FIG. 36, only mobile telephone 2 has ON flag on "Caution" or "NG" part of the communication quality. Therefore, the watch-shaped information processing device 1 carries out a notification operation only to the mobile telephone 2 by following a sequence chart shown in FIG. 40.

However, there are cases where more than one portable devices are notification targets. In such one case, for example, in addition to the ON flag on "NG" part of the communication quality for the mobile telephone 2 shown in FIG. 36, the PDA 5 has ON flag on "Caution" part of the communication quality.

In the above case, it is possible to preset an order of priority for notification target and make a notification based on this order. For example, when the notebook personal computer has an order of 1, the PDA has an order of 2, the mobile telephone has an order of 3, the MP 3 player has an order of 4, and the digital camera has an order of 5, notification for the PDA is carried out prior to the mobile telephone.

These orders of priority may be set at any time by the user, or may be set based on the number of bluetooth communications.

Also, notification operation may be carried out in the order of the priority for a predetermined time period. For example, if the orders of priority are set as described above, notification for the PDA 5 is first carried out for five seconds, then notification for the mobile telephone is carried out for five seconds. This time period may be preset before shipment or set by the user.

These orders do not always have to have different number, and may have the same order of priority. For the devices with the same order of priority, notification may be carried out in an arbitrary order.

Also, the display unit 151, the light emitting unit 152, the electronic sound unit 153, and the vibrator 154 may be associated with the notification target. For example, the display unit 151 is associated with the mobile telephone 2. The light emitting unit 152 is associated with the notebook personal computer 4. The electronic sound unit 153 is associated with the PDA. The vibrator 154 is associated with the MP 3 player 3. In this case, notification operations for the mobile telephone 2 by the display unit 151 and for the PDA 5 by the electronic sound unit 153 may be carried out at the same time.

(4) Notification devices

In the fourth embodiment, based on "NG" and "Caution" for the communication quality for each portable device 2 to 6, notification operation is carried out by using other combination of notification device for each device.

However, it is possible to use the same notification device and change notification method for each portable device 2 to 6. For example, when conducting notification operation by using the electronic sound unit 153, different melodies may be used for each portable device 2 to 6. Also, different blinking pattern may be used for the light emitting unit 152, and different vibration pattern may be used for the vibrator 154.

(5) Method of Radio Communication

In the above explanation, only the bluetooth is used for a method for bidirectional communication. However, it is possible to use other method if the method enables communication in a range of several tens of meters.

(6) Watch-shaped Information Processing Device

In the above explanation, a wristwatch-shaped information processing device is used as one example of the device that notifies the communication state. However, the term watch is used for wristwatch in this specification, drawings, and claims. Also, instead of shape of watch, shape of ring, shape of necklace, shape of pendant and other wearable shapes are possible. These wearable devices are also preferable for a notification system of lost property.

Also, devices that notify the state of the communication are not limited to wearable devices. They can be just a portable device or a stationary device.

In the explanation of the fourth embodiment, one device (watch-shaped information processing device 1) in the piconet carries out notification operation. However, it is possible to install the unit that performs the notification operation to every mobile device 2 to 6.

In the fourth embodiment, as shown in FIG. 41, day, the day of the week, and a current time is displayed on the display unit 151 of the watch-shaped information processing device. However, if the mobile telephone has an e-mail function and a web-page viewer function, it is possible to set the mobile telephone or the watch-shaped information processing device to display an e-mail message when it comes or a web-page when time comes for auto-browsing.

(7) Control Programs

In the fourth embodiment, control programs are preinstalled in a ROM, a RAM, or a nonvolatile memory.

However, similar to the first, second, and third embodiments, in the fourth embodiment the control programs for the mobile telephone or the watch-shaped information processing device may be recorded in a computer readable storage media first, and then the storage media may be distributed to users. Also, such a program can be distributed through a telecommunication line.

What is claimed is:

1. A radio communication device comprising:
   a transmitter-receiver unit that carries out local and bidirectional communication with a mobile telephone;
   an incoming call notification unit that, when the radio communication device receives from the mobile telephone an incoming call notification signal that indicates that there is an incoming call to the mobile telephone, carries out a notification; and
   a control unit that, by using the transmitter-receiver unit, sends, in response to the incoming call, an instruction signal to the mobile telephone to make the mobile telephone respond to the caller by using voice, and establishes synchronization of transmitting-receiving operation by making intermittent communication with the mobile telephone by using the transmitter-receiver unit.

2. A radio communication device of claim 1, further comprising an external input unit;
   wherein the control unit, in response to an operation to the external input unit, sends an instruction signal to make the mobile telephone conduct operations for the incoming call.

3. A radio communication device of claim 1, further comprising an external input unit;
   wherein the control unit, when a prescribed time period has passed without any operation to the external input terminal after the notification of the incoming call is carried out, sends an instruction signal to make the mobile telephone conduct operations for the incoming call.

4. A radio communication device of claim 1:
   wherein the control unit, when an incoming call auto-response mode is preset to the radio communication device and the radio communication device receives the incoming call notification signal, sends an instruction signal to make the mobile telephone conduct operations for the incoming call.

5. A radio communication device of claim 1, further comprising a display;
wherein the control unit, when there is a telephone number, a mobile telephone identification information, or a caller identification signal of the mobile telephone in the incoming call notification signal received by the mobile telephone, displays them on the display.

6. A radio communication device of claim 5:
wherein the control unit, by using the transmitter-receiver unit, sends to the mobile telephone, as the instruction signal, a signal that instructs the mobile telephone to send to the caller a message that asks the caller to wait for a moment.

7. A radio communication device of claim 5:
wherein the control unit, by using the transmitter-receiver unit, sends to the mobile telephone, as the instruction signal, a signal that instructs the mobile telephone to send to the caller a message that asks the caller to leave a message.

8. A radio communication device of claim 1:
wherein the control unit, by using the transmitter-receiver unit, sends to the mobile telephone, as the instruction signal, a signal that instructs the mobile telephone to make a communication link between the radio communication device and the caller's communication device via the mobile telephone.

9. A radio communication device comprising:
a transmitter-receiver unit that carries out local and bidirectional communication with a mobile telephone;
an incoming call notification unit that, when the radio communication device receives from the mobile telephone an incoming call notification signal that indicates that there is an incoming call to the mobile telephone, carries out a notification of the incoming signal; and
a control unit that, by using the transmitter-receiver unit, sends to the mobile telephone a message to be sent to the caller to make the mobile telephone conduct processing for the incoming call.

10. A radio communication device comprising:
a transmitter-receiver unit that carries out local and bidirectional communication with a mobile telephone;
an incoming call notification unit that, when the radio communication device receives from the mobile telephone an incoming call notification signal that indicates that there is an incoming call to the mobile telephone, carries out a notification of the incoming signal; and
a control unit that, by using the transmitter-receiver unit, sends to the mobile telephone a message to be sent to the caller and an instruction signal that makes the mobile telephone conduct processing for the incoming call.

11. A radio communication device of claim 10, further comprising:
a storage unit that stores the message to be sent to a caller's communication device;
wherein the control unit sends the stored message to the mobile telephone.

12. A radio communication device of claim 10, further comprising:
an input unit that receives a message to be sent to a caller's communication device;
wherein the control unit stores in the storage unit the message that is input by using the input unit.

13. A radio communication device of claim 10:
wherein the message to be sent to the caller is a message that tells the caller to wait for a moment.

14. A radio communication device of claim 10:
wherein the message to be sent to the caller is a message that tells the caller to leave a message.

15. A radio communication device of claim 10:
wherein the storage unit that, after sending the message when a caller-sent information is received through the mobile telephone, stores the caller-sent information.

16. A radio communication device of claim 15, further comprising:
an output unit that outputs the caller-sent information that is stored in the storage unit.

17. A radio communication device of claim 10:
wherein the control unit, after sending to the mobile telephone the message to be sent to the caller, as the instruction signal, sends to the mobile telephone a record instruction that instructs the mobile telephone to record information sent from the caller's communication device in response to the message to be sent to the caller.

18. A radio communication device of claim 10:
wherein the control unit, after sending to the mobile telephone the message to be sent to the caller, as the instruction signal, sends to the mobile telephone a change order that instructs the mobile telephone to let another device on a network as a substitute of the mobile telephone carry out a communication with the communication device of the caller.

19. A radio communication device of claim 10, further comprising:
an operating mode synchronization unit that intermittently conducts a communication with the mobile telephone and, when the operating mode of the mobile telephone shifts, shifts the operating mode of the radio communication device to the operating mode of the mobile telephone after shifting.

20. A radio communication device comprising:
a transmitter-receiver unit that carries out local and bidirectional communication with a mobile telephone;
an incoming call notification unit that, when the radio communication device receives from the mobile telephone an incoming call notification signal that indicates that there is an incoming call to the mobile telephone, carries out a notification; and
a control unit that, by using the transmitter-receiver unit, sends, in response to the incoming call, a change order that instructs the mobile telephone to let another device on a network as a substitute of the mobile telephone carry out a communication with the communication device of the caller.

21. A mobile telephone comprising:
a transmitter-receiver unit that carries out local and bidirectional communication with a radio communication device; and
a control unit that, after receiving an incoming call from a network, sends, by using the transmitter-receiver unit, an incoming call notification signal to the radio communication device, based on an instruction signal received from the radio communication device by the transmitter-receiver unit, responds to the caller by using voice in response to the incoming call, and establishes synchronization of the transmitting-receiving operation by making intermittent communication with the radio communication device by using the transmitter-receiver unit.

22. A mobile telephone of claim 21, further comprising:
an incoming call notification unit;
wherein the control unit, when there is an incoming call to the mobile telephone, sends the incoming call notification signal in a case when there is a communication link between the mobile telephone and the radio communication device and carries out notification by using the incoming call notification unit in a case when there is a communication link between the mobile telephone and the radio communication device.

23. A mobile telephone of claim 21:
wherein, during the processing for the incoming call, the control unit sends a connection request to a network, makes a communication link between the mobile telephone and the caller's communication device, and sends to the caller's communication device a message for the caller via the communication link.

24. A mobile telephone of claim 23:
wherein, during the processing for the incoming call, the control unit, by the transmitter-receiver unit, sends to the radio communication device information about the caller sent in response to the message to be sent to the caller.

25. A mobile telephone of claim 23, further comprising a storage unit:
wherein the control unit stores information sent by the caller received via the network after sending message to be sent to the caller.

26. A mobile telephone comprising:
a transmitter-receiver unit that carries out local and bidirectional communication with a radio communication device; and
a control unit that, after receiving an incoming call from a network, sends, by using the transmitter-receiver unit, an incoming call notification signal to the radio communication device; and transfers to the caller a message to be sent to the caller, the message being received from the radio communication device by the transmitter-receiver unit.

27. A mobile telephone of claim 26 that intermittently conducts a communication with the radio communication device and, when the operating mode of the mobile telephone is shifted, sends to the radio communication device an operating mode shifting information that tells the operating mode of the mobile telephone after shifting.

28. A mobile telephone comprising:
a transmitter-receiver unit that can carries out local and bidirectional communication with a radio communication device; and
a control unit that, when the mobile telephone receives an incoming call, sends to the radio communication device an incoming call signal by using the transmitter-receiver unit, and when the mobile telephone receives a change order by using the transmitter-receiver unit, request to the network to change the connection from between the mobile telephone and the caller's device to between a device on the network and the caller's device.

29. A method for controlling a radio communication device with a transmitter-receiver unit that carries out local and bidirectional communication with a mobile telephone, the method comprising:
carrying out a notification when the transmitter-receiver unit receives an incoming call notification signal that indicates that there is an incoming call to the mobile telephone;
sending, by using the transmitter-receiver unit, an instruction signal that makes the mobile telephone respond to the caller by using voice in response to the incoming call; and
establishing synchronization of transmitting-receiving operation by making intermittent communication with the mobile telephone by using the transmitter-receiver unit.

30. A control method for a radio communication device with a transmitter-receiver unit that is able to carry out local and bidirectional radio communication with a mobile telephone, the method comprising:
notifying, when the transmitter-receiver unit receives an incoming call signal, of incoming signal by using a notification unit; and
sending a message to be sent to the caller and an instruction signal that makes the mobile telephone respond to the caller by using the message.

31. A control method for answering an incoming call to a mobile telephone in a system that has the mobile telephone that can carries out local and bidirectional communication with a radio communication device, the method comprising:
transmitting an incoming call notification signal by the mobile telephone to the radio communication device when the mobile telephone receives an incoming call;
receiving the incoming call notification signal by the radio communication device;
notifying the incoming call by the radio communication device;
sending an instruction signal that make the mobile telephone respond to the caller by using voice; and
establishing synchronization of transmitting-receiving operation between the mobile telephone and the radio communication device by making intermittent communication between them.

32. A control method for answering an incoming call to a mobile telephone in a system with the mobile telephone that can carry out local and bidirectional communication with a radio communication device, the method comprising:
transmitting an incoming call notification signal by the mobile telephone to the radio communication device when the mobile telephone receives an incoming call;
receiving the incoming call notification signal by the radio communication device;
notifying the incoming call by the radio communication device; and
sending a message to be sent to the caller and an instruction signal that makes the mobile telephone respond to the caller by using the message.

33. A program for controlling a radio communication device that can carry out local and bidirectional radio communication with a mobile telephone, the program comprising:
a program that makes a control unit of the radio communication device conduct controlling for an incoming call notification when a transmitter-receiver unit of the radio communication device receives an incoming call notification signal that tells the mobile telephone receives an incoming call;
a program that makes the control unit of the radio communication device send an instruction signal that makes the mobile telephone respond to the caller by using voice; and
a program that makes the control unit of the radio communication device establish synchronization of transmitting-receiving operation by making intermittent communication with the mobile telephone by using the transmitter-receiver unit.

34. A program for controlling a radio communication device that is able to carry out local and bidirectional radio communication with a mobile telephone, the program comprising:

a program that makes a control unit of the radio communication device conduct controlling for an incoming call when a transmitter-receiver unit of the radio communication device receives an incoming call notification signal that indicates that the mobile telephone receives an incoming call; and a program that makes the control unit of the radio communication device send an instruction signal that makes the mobile telephone send a message to be sent to the caller and respond to the caller by using the message.

35. A control method for a mobile telephone that can carry out local and bidirectional radio communication with a radio communication device, the method comprising:

making a control unit of the mobile telephone conduct controlling to send to the radio communication device an incoming call notification signal when the mobile telephone receives an incoming call;

making the control unit of the mobile telephone respond to the caller by using voice based on the instruction signal received from the radio communication device; and making the control unit of the mobile telephone establish synchronization of transmitting-receiving operation by making intermittent communication with the radio communication device.

36. A control method for a mobile telephone that can carry out local and bidirectional communication with a radio communication device, the method comprising:

making, when the mobile telephone receives an incoming call, a control unit of the mobile telephone send an incoming call notification signal to the radio communication device; and making, when the mobile telephone receives, from the radio communication device, a message to be sent to the caller and an instruction signal that instructs the mobile telephone to forward the message, the control unit of the mobile telephone conduct processing for forwarding the message.

37. A program for controlling a mobile telephone that can carry out local and bidirectional radio communication with a radio communication device, the program comprising:

a program that makes a control unit of the mobile telephone conduct controlling to send to the radio communication device an incoming call notification signal when the mobile telephone receives an incoming call;

a program that makes the control unit of the mobile telephone respond to the caller by using voice based on the instruction signal received from the radio communication device; and a program that makes the control unit of the mobile telephone establish synchronization of transmitting-receiving operation by making intermittent communication with the radio communication device.

38. A control program for a mobile telephone that can carry out local and bidirectional communication with a radio communication device, the program comprising:

a program that, when the mobile telephone receives an incoming call, makes a control unit of the mobile telephone send an incoming call notification signal to the radio communication device; and a program that, when the mobile telephone receives, from the radio communication device, a message to be sent to the caller and an instruction signal that instructs the mobile telephone to forward the message, makes the control unit of the mobile telephone conduct processing for forwarding the message.

39. A computer readable storage media that stores a control program for a mobile telephone which can carry out local and bidirectional radio communication with a radio communication device, the control program comprising:

a program that, when the mobile telephone receives an incoming call, makes a control unit of the mobile telephone conduct a processing for sending an incoming call notification signal;

a program that, based on an instruction signal sent by the radio communication device, makes the control unit of the mobile telephone conduct processing for responding for the incoming call and for responding to the caller by using voice; and a program that makes the control unit of the mobile telephone establish synchronization of transmitting-receiving operation by making intermittent communication with the radio communication device.

40. A computer readable storage media that stores a control program for a mobile telephone which can carry out local and bidirectional radio communication with a radio communication device, the control program comprising:

a program that, when the mobile telephone receives an incoming call, makes a control unit of the mobile telephone conduct a processing for sending an incoming call notification signal; and a program that, when the mobile telephone receives from the radio communication device a message to be sent to the caller and an instruction signal that instructs to forward the message, makes the control unit of the mobile telephone conduct processing for responding to the incoming call and for forwarding the message to be sent to the caller.

41. A radio communication device comprising:

a transmitter-receiver unit that carries out local and bidirectional communication with another radio communication device;

a communication state judgement unit that measures and makes a judgement of state of the bidirectional communication; and a notification unit that sends information about the state of the bidirectional communication measured by the communication state judgement unit.

42. A radio communication device of claim 41, further comprising:

a notification requirement judgement unit that, based on the judgement of the state done by the communication state judgement unit, makes a judgement whether or not to tell a user of the radio communication device information about the state of the bidirectional communication;

wherein the notification unit, when the notification requirement judgement unit judges the user should be notified, sends information about the state of communication.

43. A method for controlling a radio communication device, the method comprising:

carrying out local and bidirectional radio communication with another radio communication device;

judging state of the bidirectional radio communication with the other communication device; and notifying the user of information about the state of the bidirectional radio communication.

44. A control program comprising:

a program that makes a control unit of a radio communication device carry out local and bidirectional radio communication between the radio communication device and a radio communication device;

a program that makes the control unit of the radio communication device judge state of bidirectional radio communication; and a program that makes the control unit of the radio communication device notify the user of information about the state of the bidirectional radio communication.

45. A computer readable storage medium that stores a control program, the control program comprising:

a program that makes a control unit of a radio communication device carry out local and bidirectional radio communication between the radio communication device and a radio communication device;

a program that makes the control unit of the radio communication device judge state of the bidirectional radio communication; and a program that makes the control unit of the radio communication device notify the user of information about the state of the bidirectional radio communication.

* * * * *

UNITED STATES PATENT AND TRADEMARK OFFICE
CERTIFICATE OF CORRECTION

PATENT NO. : 7,016,707 B2 Page 1 of 1
APPLICATION NO. : 10/049531
DATED : March 21, 2006
INVENTOR(S) : Teruhiko Fujisawa et al.

It is certified that error appears in the above-identified patent and that said Letters Patent is hereby corrected as shown below:

On title page
Please change "EP 0 634 859 1/2000" to --EP 0 634 859 1/1995--

Signed and Sealed this

Twenty-second Day of August, 2006

JON W. DUDAS
*Director of the United States Patent and Trademark Office*